US012698116B2

(12) United States Patent
Talda et al.

(10) Patent No.: US 12,698,116 B2
(45) Date of Patent: Aug. 4, 2026

(54) SYSTEM AND METHOD FOR AUTOMATICALLY PACKAGING AN ITEM

(71) Applicant: IOW, LLC, Renton, WA (US)

(72) Inventors: Timothy Alan Talda, Renton, WA (US); John Michael Moran, West Linn, OR (US); Donald Olson, Mora, MN (US); Paul Olson, Mora, MN (US); Eric Olson, Mora, MN (US)

(73) Assignee: IOW, LLC, Renton, WA (US)

( * ) Notice: Subject to any disclaimer, the term of this patent is extended or adjusted under 35 U.S.C. 154(b) by 0 days.

(21) Appl. No.: 18/913,486

(22) Filed: Oct. 11, 2024

(65) Prior Publication Data

US 2025/0033817 A1 Jan. 30, 2025

Related U.S. Application Data

(63) Continuation-in-part of application No. 17/941,544, filed on Sep. 9, 2022, now Pat. No. 12,304,680, which (Continued)

(51) Int. Cl.
*B65B 41/16* (2006.01)
*B31D 5/00* (2017.01)

(Continued)

(52) U.S. Cl.
CPC ............ *B65B 41/16* (2013.01); *B31D 5/0065* (2013.01); *B65B 9/02* (2013.01); *B65B 41/14* (2013.01);

(Continued)

(58) Field of Classification Search
CPC ... B65B 59/001; B65B 2210/04; B65B 41/14; B65B 41/16; B65B 9/2014; B65B 9/02;

(Continued)

(56) References Cited

U.S. PATENT DOCUMENTS

| | | | |
|---|---|---|---|
| 2,203,084 | A | 6/1940 | Evans |
| 2,728,479 | A | 12/1955 | Wheeler |

(Continued)

FOREIGN PATENT DOCUMENTS

| | | |
|---|---|---|
| JP | 2020164248 | 11/2020 |
| WO | 2019040624 | 2/2019 |

(Continued)

OTHER PUBLICATIONS

International Search Report, PCT/US2024/059537, mailed Feb. 19, 2025.

(Continued)

*Primary Examiner* — Joshua G Kotis
(74) *Attorney, Agent, or Firm* — Sand, Sebolt & Wernow Co., LPA

(57) ABSTRACT

A system, apparatus, and method for automatically packaging one or more articles as a set of items to be shipped is disclosed. The system, apparatus, and method processes packaging material based at least in part on a scan of the set of items to be shipped, and forms cushioning of two matched streams of packaging material, with height of each package automated to size for the set, yielding shipping-ready customized packages. The customized packages are configured to conform to each individual article's size. The packaging material preferably is fully recyclable and is made from paper which is selectively expandable to create a cushioning layer around the set.

21 Claims, 31 Drawing Sheets

Related U.S. Application Data is a continuation-in-part of application No. 17/514,005, filed on Oct. 29, 2021, now Pat. No. 11,931,985.

(60) Provisional application No. 63/255,535, filed on Oct. 14, 2021, provisional application No. 63/261,297, filed on Sep. 17, 2021, provisional application No. 63/153,918, filed on Feb. 25, 2021, provisional application No. 63/111,544, filed on Nov. 9, 2020.

(51) Int. Cl.

| | |
|---|---|
| ***B65B 9/02*** | (2006.01) |
| ***B65B 41/14*** | (2006.01) |
| ***B65B 43/06*** | (2006.01) |
| ***B65B 57/12*** | (2006.01) |
| ***B65B 59/00*** | (2006.01) |
| *B65B 59/02* | (2006.01) |

(52) U.S. Cl.
CPC ............ *B65B 57/12* (2013.01); *B65B 59/001* (2019.05); *B65B 43/06* (2013.01); *B65B 59/02* (2013.01); *B65B 2210/04* (2013.01)

(58) Field of Classification Search
CPC ......... B65B 9/08; B65B 43/06; B65B 43/267; B65B 39/007; B65B 39/12; B31D 5/0065; B31D 5/0039; B31D 1/0031; B31B 2170/10; B31B 2155/00; B31B 2150/002; B65H 2801/63
USPC ............................................. 53/381.5, 384.1
See application file for complete search history.

(56) References Cited

U.S. PATENT DOCUMENTS 3,330,090 A * 7/1967 Court ........................ B65B 9/06 53/553
3,359,703 A 12/1967 Quaadgras
3,501,887 A * 3/1970 Perry .................... B65B 35/243 53/551
3,544,419 A 12/1970 Gerard
3,796,021 A * 3/1974 Toss ........................ B65B 51/30 53/552
3,968,272 A 7/1976 Balk
4,169,345 A * 10/1979 Douwenga ............ B65B 43/267 53/384.1
4,236,652 A 12/1980 Beguhn
4,331,725 A 5/1982 Akao
4,550,046 A 10/1985 Miller
4,617,785 A 10/1986 Chikatani et al.
5,241,800 A * 9/1993 Steinke ................... B65B 25/06 53/503
5,487,470 A 1/1996 Pharo
5,519,982 A 5/1996 Herber et al.
5,538,778 A 7/1996 Hurwitz et al.
5,544,473 A 8/1996 Maida
5,688,578 A 11/1997 Goodrich
5,910,138 A 6/1999 Sperko et al.
6,058,681 A 5/2000 Recchia, Jr.
6,996,951 B2 2/2006 Smith et al.
9,315,354 B2 4/2016 Tommasi
10,226,907 B2 3/2019 Goodrich
10,442,574 B2 10/2019 Kuchar et al.
10,669,054 B1 6/2020 Hoffman
10,764,106 B2 9/2020 Nakayama
10,773,839 B1 9/2020 Talda et al.
10,850,891 B2 12/2020 Yan
10,981,712 B2 4/2021 Goodrich
11,130,620 B1 9/2021 Hoffman
11,260,615 B2 3/2022 Cheich et al.
11,351,750 B2 6/2022 Cheich et al.
11,572,225 B2 * 2/2023 Wehrmann ........... B31D 5/0073
11,702,261 B2 7/2023 Goodrich
11,718,435 B2 * 8/2023 Magnell .................. B65B 43/04 53/450
11,801,981 B2 10/2023 Wetsch
11,807,440 B2 11/2023 Jobe
11,931,985 B2 3/2024 Talda
12,017,820 B2 6/2024 Yan
12,168,334 B2 12/2024 Kuchar et al.
12,304,680 B2 5/2025 Talda et al.
2003/0089817 A1 * 5/2003 Hanson .............. B65H 19/1863 242/566
2003/0208988 A1 11/2003 Buckley
2004/0040262 A1 3/2004 Palumbo
2006/0169753 A1 8/2006 Piucci
2007/0175181 A1 8/2007 Harper
2009/0013655 A1 * 1/2009 Monti ..................... B65B 9/213 53/567
2009/0277140 A1 * 11/2009 Tsuruta ..................... B65B 9/20 53/551
2012/0222393 A1 9/2012 Vaccari
2015/0059290 A1 3/2015 Ewert et al.
2015/0239635 A1 8/2015 McDonald et al.
2015/0329230 A1 * 11/2015 Rasi .......................... B65B 5/06 53/147
2016/0067938 A1 3/2016 Goodrich
2016/0159510 A1 6/2016 Lau et al.
2017/0107017 A1 4/2017 Kuchar et al.
2017/0203866 A1 7/2017 Goodrich
2017/0225813 A1 * 8/2017 Wehrmann .............. B65B 55/20
2017/0313017 A1 11/2017 Cheich et al.
2018/0022493 A1 1/2018 Lamb et al.
2018/0086491 A1 3/2018 Campbell
2018/0118397 A1 5/2018 Blackford et al.
2018/0141686 A1 5/2018 Christman et al.
2018/0265228 A1 * 9/2018 Hagestedt ............... B31B 70/20
2018/0273226 A1 9/2018 Lancaster, III et al.
2018/0346166 A1 12/2018 Chang et al.
2019/0062028 A1 2/2019 Getty et al.
2019/0100369 A1 4/2019 Hoffman
2019/0276168 A1 9/2019 Gasparini et al.
2020/0198823 A1 6/2020 Bauer et al.
2020/0207500 A1 * 7/2020 Kalinowski ............... B65B 9/06
2020/0307866 A1 10/2020 Yan
2020/0307867 A1 10/2020 Yan
2020/0331648 A1 10/2020 Lees et al.
2020/0346793 A1 11/2020 Holmes
2020/0377278 A1 * 12/2020 Orsini ..................... B65B 55/20
2020/0385154 A1 12/2020 Campbell
2020/0407088 A1 * 12/2020 White ................... B65B 51/146
2021/0009291 A1 * 1/2021 Campbell ............... B65B 9/026
2021/0206535 A1 7/2021 Yan
2021/0229849 A1 * 7/2021 Sabato ...................... B65B 9/04
2021/0252821 A1 * 8/2021 Goodrich ................ B31B 70/16
2021/0253289 A1 8/2021 Hirohashi
2022/0002059 A1 1/2022 Asayama
2022/0002069 A1 * 1/2022 Wetsch ................... B65B 61/24
2022/0041312 A1 * 2/2022 Vilag ........................ B65B 9/08
2022/0119181 A1 4/2022 Goodrich
2022/0135308 A1 5/2022 Wetsch
2022/0219852 A1 * 7/2022 Matsuhisa ............... B65B 9/073
2023/0002096 A1 * 1/2023 Talda .................... B65B 51/146
2023/0322445 A1 10/2023 Yan
2023/0391040 A1 * 12/2023 Macgillivray ....... B31D 5/0065
2024/0051725 A1 2/2024 Starks et al.
2024/0100800 A1 * 3/2024 Wetsch ................... B31B 70/62
2024/0286372 A1 * 8/2024 Goodrich ............. B65H 16/005
2024/0300698 A1 9/2024 Yan
2024/0368839 A1 * 11/2024 Goodrich ............. B31D 5/0065
2024/0375824 A1 * 11/2024 Wetsch .............. B65D 75/5838

(56) References Cited

U.S. PATENT DOCUMENTS

2025/0063995 A1* 2/2025 De Jong ............... B65B 25/026
2025/0214731 A1* 7/2025 Shibata ..................... B65B 1/06

FOREIGN PATENT DOCUMENTS

WO 2022098599 5/2022
WO 2022128691 9/2022
WO 2022182691 A1 9/2022

OTHER PUBLICATIONS

International Search Report, PCT/US2024/059547, mailed Feb. 19, 2025.
International Search Report, PCT/US21/57550, mailed Jan. 31, 2022, 10 pages.
International Search Report, PCT/US22/43666, mailed Jan. 3, 2023, 17 pages.
Examination Report Under Section 18(3), PCT/US21/57550, dated May 21, 2024, 13 pages.
Extended European Search Report, PCT/US21/57550, dated Sep. 9, 2024, 8 pages.
International Search Report, PCT/US2025/049992, dated Dec. 4, 2025, 14 pages.
International Search Report, PCT/US2025/049967, dated Dec. 1, 2025, 8 pages.
International Search Report, PCT/US2024/049979, dated Dec. 4, 2025, 14 pages.

* cited by examiner

SYSTEM AND METHOD FOR AUTOMATICALLY PACKAGING AN ITEM

REFERENCE TO RELATED APPLICATIONS

This application is a Continuation-in-Part of, and claims benefit and priority to, U.S. patent application Ser. No. 17/941,544 filed Sep. 9, 2022. U.S. patent application Ser. No. 17/941,544 is a Continuation-in-Part of, and claims benefit to, U.S. patent application Ser. No. 17/514,005, filed Oct. 29, 2021. U.S. patent application Ser. No. 17/941,544 also claims benefit to U.S. Provisional Application Ser. No. 63/255,535 filed on Oct. 14, 2021, and U.S. Provisional Application Ser. No. 63/261,297 filed on Sep. 17, 2021. U.S. patent application Ser. No. 17/514,005 filed Oct. 29, 2021, claims the benefit of U.S. Provisional Application Ser. No. 63/153,918 filed on Feb. 25, 2021, and U.S. Provisional Application Ser. No. 63/111,544 filed on Nov. 9, 2020. The entire disclosures of the above-referenced patent applications are incorporated herein by reference.

TECHNICAL FIELD

This disclosure is directed to an apparatus and a method of packaging articles. More particularly, this disclosure is directed to an apparatus and a method of packaging articles which are to be shipped from a packaging and shipping facility, such as a large conventional fulfillment center or even a smaller non-conventional fulfillment center concerned with containing costs. Specifically, this disclosure is directed to an apparatus and a method of packaging one or more articles in which packaging materials are produced in real time by an automated packaging system that provides reduction in packaging materials for the facility and elimination of stock package sizes.

BACKGROUND

As the electronic commerce (ecommerce) industry continues to grow, so do the issues encountered by facilities, such as fulfillment centers, which are involved with packaging a large number of articles for shipment, particularly articles which are dissimilar in configuration. Typically, packaging systems in such facilities utilize standard packaging, such as cardboard boxes or envelopes, for packaging and shipping articles. The standard packaging is prefabricated in standard sizes. Typically, articles which are ordered online are picked for shipping by pickers at a picking station who place the picked article into a bin. The bin is moved by conveyors from the picking station to a packaging station. At the packaging station, a packer is notified via a computer terminal of the most appropriately-sized packaging for that particular article. The packer selects that appropriately-sized packaging from an array of standard sizes of packaging, assembles the packaging, removes the picked article from the bin, places the article in the assembled packaging, seals the packaging, and then places the packaging with the article inside it onto another conveyor which transfers the packaged article to a shipping station for shipment. Robots, or other forms of automation, are also being utilized in some facilities to package articles in custom-sized boxes. In other words, the robots select the most appropriately-sized box, will assemble the box, place the article to be shipped into the same, seal the box, and then send the packaged article to the shipping station for shipment to a customer.

The above-described situations can result in a relatively-small article being enclosed in a substantially much larger box, envelope, or other packaging than the article warrants. This occurs even though an algorithm informed the packer or the robot of the most-appropriately-sized box of the standard size boxes for use with respect to a particular article. Because the packaged article is surrounded by a lot of empty space, the article may become damaged during shipment unless filler materials are inserted into the box, envelope, or other package to surround the article. The unnecessarily larger packaging and the quantity of filler materials required to ship smaller articles is simply a waste of resources. The extra packaging also results in a larger than necessary volume of garbage being generated, even if that garbage is disposed of at locations remote from the packaging facility, i.e., at the end-customer's home or business. Shipping larger than necessary packaging takes up more space that necessary in shipping and delivery vehicles. This, in turn, requires that more shipping and delivery vehicles be utilized to deliver packages than would otherwise be needed if article-customized packaging was used instead of standard-sized packaging. Using larger than necessary packaging utilizes more space in each delivery vehicle than if article-customized packaging was used. Since more space is required in the vehicles to ship a fixed number of packages, more shipping and delivery vehicles are needed to deliver the fixed number of packages. This not only affects bottom lines but it is also bad for the environment to have an unnecessary number of vehicles leaving a carbon footprint. In more recent advances, single lines of packaging material, or single webs have been used to wrap simple items. This type of advance may reduce needs for a fixed number of package sizes, but does not address other possible improvements.

In addition to the above-mentioned issues, many conventionally-used packaging systems utilize packaging materials comprised of more than one material. The packaging materials are typically not fully recyclable or are expensive to separate and recycle. This is also bad for the bottom line and may be bad for the environment.

SUMMARY

In an embodiment, a system for custom packaging a set of items to be shipped has a roll section that provides support for a pair of rolls of prefabricated expandable packaging material that are unrolled into webs and matched into a web set and a package section that provides a form zone, a fill zone and a finish zone. The matched web set from the roll section is expanded in the form zone, receives a shipping item in the fill zone, and is finish-sealed and separated from the webs in the finish zone to comprise a finished package.

In another embodiment, the roll section has a pair of support rollers configured to support the pair of rolls of prefabricated expandable packaging material, a mating roller downstream of the pair of support rollers configured to match the webs into the matched web set; and a plurality of feed rollers downstream of the mating roller configured to feed the matched web set to the package section.

In another embodiment, a system also has a scan device configured to obtain data from the shipping item and a controller communicatively connected with the scan device, the roll section and the package section. The controller is configured to control a set of movements of the matched web set through the roll section and through the package section based at least in part on the data scanned from the shipping item and at least in part on a selected mode.

In yet another embodiment, a controller of a system provides alignment to the pair of rolls of prefabricated expandable packaging material and controls the matching of the webs into the web set by way of the mating roller.

In yet another embodiment a system has a second pair of support rollers in the roll section for a second pair of rolls of prefabricated expandable packaging material that are configured to enable a near zero down time with a changeover of feed of prefabricated expandable packaging material from the first pair of rolls to the second pair of rolls at a designated condition.

In yet still another embodiment, a package section of a system has a set of grippers that are communicatively connected with the controller. The set of grippers has at least one gripper that is configured to expand a determined amount of the web set in the form zone based at least in part on the data from the shipping item; and at least another gripper in addition to the at least one gripper that are configured to index the expanded amount of web set from the form zone to the fill zone.

In other embodiments, the determined amount of web set may also be based at least in part on maintaining an expanded web set throughout the fill zone upon index of the expanded amount of web set from the form zone to the fill zone, while other embodiments may also be, or solely or in combination be based at least in part on the data of the pair of rolls of prefabricated expandable packaging material.

In yet still another embodiment, a package section of a system has a labeler configured to label an outer side of a portion of the expanded matched web set in the fill zone, in addition to an insertion assistance set configured to assist in spreading the webs of the expanded matched web set for receiving the shipping item; and the controller is communicatively connected with the labeler and the insertion assistance set. In embodiments, the insertion assistance set may be made up of a spacer and a tab configured to transition into a spreader. The spacer is configured to protrude into the webs of the web set and the tab is configured to translate between the webs of the web set in the fill zone prior to the system receiving the shipping item in the fill zone. The insertion assistance set may be made up of a loading chute having a platform matingly sized to the spreader and a pair of sides. The loading chute and the tab are communicatively connected to the controller; and the controller provides control over insertion and withdrawal of the loading chute to provide the pair of sides to a depth between the webs of the web set in the fill zone prior to the system receiving the shipping item in the fill zone such that the pair of sides protect against a collision of the web set and the shipping item or of the web set and a user or both.

In another embodiment, a system has a quality/transport set that examines the package based on predetermined criteria including at least sealing and proper labeling. The controller is communicatively connected with the quality/transport set and the package is transported according to a result of the examination.

An embodiment for a system for custom packaging a set of items to be shipped has a roll section that provides support for a pair of rolls of prefabricated expandable packaging material that are unrolled into webs and matched into a web set; and a package section that provides a form zone, a fill zone and a finish zone. The matched web set from the roll section is expanded in the form zone, receives a shipping item in the fill zone, and is finish-sealed and separated from the webs in the finish zone to comprise a finished package. In a further embodiment, alignment of the pair of rolls of prefabricated expandable packaging material and matching of the webs into the web set is completed in the roll section.

In another embodiment, a roll section of the system has the pair of roll supports for the pair of rolls and a second pair of roll supports for a second pair of rolls configured to enable a near zero down time with a changeover of feed of prefabricated expandable packaging material from the pair of rolls to the second pair of rolls at a designated condition.

In yet another embodiment, a system has a set of grippers and at least one gripper of the set of grippers is configured to expand a determined amount of the web set in the form zone based at least in part on one or more of: a data from a scan of the shipping item; maintaining an expanded web set throughout the fill zone upon index of the expanded amount of web set from the form zone to the fill zone; or a second data of the pair of rolls of prefabricated expandable packaging material; and has at least another gripper of the set of grippers in addition to the at least one gripper that are configured to index the expanded amount of web set from the form zone to the fill zone.

In embodiments, a system has a back sealer configured to seal a back portion of the web set in the fill zone; and a labeler configured to label an outer side of a portion of the expanded matched web set in the fill zone.

In other embodiments, a system has an insertion assistance set configured to assist in spreading the webs of the expanded matched web set for receiving the shipping item. The insertion assistance set may have a spacer and a tab configured to transition into a spreader. The spacer is configured to protrude into the webs of the web set and the tab is configured to translate between the webs of the web set in the fill zone prior to the system receiving the shipping item in the fill zone; The insertion assistance set may have a loading chute configured to insert and withdraw between the webs of the web set in the fill zone having a pair of sides and a platform. The platform is matingly sized to the spreader; and the pair of sides is configured such that upon insertion of the loading chute and prior to the system receiving the shipping item in the fill zone, the pair of sides protects against a collision of the web set with the shipping item or of the web set with a user or both.

In other embodiments, a system may have a quality/transport set that examines the package based on predetermined criteria including at least sealing and proper labeling; and the package is transported according to a result of the examination.

In an embodiment, a system for custom packaging of one or more of a shipping item may have a controller provided with programming to control production of the custom packaging, a roll section that provides support for a pair of rolls of prefabricated expandable packaging material that are unrolled into webs and matched into a web set; and a package section that has a tension roller, a set of grippers of the package section positioned downstream of the tension roller and is communicatively connected with the controller; and a set of sealers positioned downstream of the tension roller and is communicatively connected with the controller. The programming determines a set of movements of the matched web set through the roll section and through the package section based at least in part on a data scanned from the shipping item.

Embodiments of the disclosure include a method for custom packaging a set of items to be shipped that include steps of supporting, in a roll section, a pair of rolls of prefabricated expandable packaging material; unrolling the pair of rolls of prefabricated expandable packaging material into webs; and matching the webs into a web set. The web set is transported from the roll section to a package section. The package section may provide a form zone, a fill zone and a finish zone. The method also includes expanding a determined amount of the web set in the form zone, receiving a shipping item in a controlled portion of the expanded amount of web set in the fill zone, and finish-sealing the controlled portion of the expanded amount of web set that has received the shipping item. The methods may conclude with separating the controlled portion from the webs in the finish zone to comprise a finished package.

In some embodiments, the step of matching the webs into the web set is by way of a mating roller downstream of the pair of support rollers configured to match the webs into the matched web set and the step of transporting the web set from the roll section to the package section may be by way of a plurality of feed rollers downstream of the mating roller.

Other embodiments may also include obtaining data, by a scan device, from the shipping item; and controlling, a set of movements of the matched web set through the roll section and through the package section based at least in part on the obtained data and at least in part on a selected mode. It is to be appreciated that the controller may be communicatively connected with the scan device, the roll section and the package section. It is also to be appreciated that the controller may provide alignment to the pair of rolls of prefabricated expandable packaging material and control the matching of the webs into the web set by way of the mating roller.

Still other embodiments may feature an enabling a near zero down time with a changeover of feed of prefabricated expandable packaging material from the pair of rolls of prefabricated expandable packaging material to a second pair of rolls of prefabricated expandable packaging material on a second pair of support rollers in the roll section for most any designated conditions as may be determined for operating efficiency.

In embodiments, the controller may be communicatively connected with a set of grippers of the package section. It is to be appreciated that the controller employs the step of expanding the determined amount of the web set in the form zone through at least one gripper of the set of grippers based at least in part on the data from the shipping item. It is also to be appreciated that the controller employs the step of indexing the expanded amount of the web set from the form zone to the fill zone through at least another gripper of the set of grippers and the at least one gripper.

In embodiments, the determined amount of web set is based at least in part on maintaining the expanded amount of the web set throughout the fill zone upon index of the expanded amount of web set from the form zone to the fill zone. In other embodiments, the determined amount of web set is based at least in part on another data of the pair of rolls of prefabricated expandable packaging material.

In several embodiments, the controller may also be communicatively connected to a labeler of the package section and may direct labeling, through the labeler, of an outer side of a portion of the expanded amount of web set in the fill zone.

Embodiments may also provide that a controller may be communicatively connected to an insertion assistance set, employing the insertion assistance set to spread the webs of the expanded amount of the web set for receiving the shipping item. Methods of employing the insertion assistance set may include protruding a spacer of the insertion assistance set between the webs of the expanded amount of the web set, translating a tab of the insertion assistance set between the webs of the expanded amount of the web set in the fill zone prior to the step of receiving the shipping item in the fill zone, controlling (by the controller), an insertion and a withdrawal of a loading chute of the insertion assistance set to provide a pair of sides of the loading chute to a depth between the webs of the expanded amount of the web set in the fill zone prior to the step of receiving the shipping item in the fill zone; and protecting, by the pair of sides of the loading chute, against a collision of the expanded amount of the web set and the shipping item, or of the expanded amount of the web set and a user, or both.

In other embodiments with a controller, the controller may be communicatively connected to a quality/transport set that examines the package based on predetermined criteria including at least sealing and proper labeling; and employs the quality/transport set to transport the package according to a result of the examination.

Embodiments of the disclosure include methods that provide alignment of the pair of rolls of prefabricated expandable packaging material, and that enable a near zero down time with a changeover of feed of prefabricated expandable packaging material from the pair of rolls of prefabricated expandable packaging material to a second pair of rolls of prefabricated expandable packaging material on a second pair of support rollers in the roll section for one or more designated conditions.

Embodiments also reflect a method of expanding a determined amount of a web set in a form zone (by at least one gripper of the set of grippers) based at least in part on the data from the shipping item; and further indexing (by at least another gripper of the set of grippers and the at least one gripper), the expanded amount of web set from the form zone to the fill zone. In embodiments, methods further include sealing, by a back sealer, a back portion of the web set in the fill zone; and labeling, by a labeler, an outer side of a portion of the expanded amount of web set in the fill zone. In some of these embodiments, the method may also include assisting in spreading the webs of the expanded amount of web set for receiving the shipping item by an insertion assistance set. This assistance may be by steps of protruding of a spacer of the insertion assistance set between the webs of the expanded amount of the web set; and translating of a tab of the insertion assistance set between the webs of the expanded amount of the web set in the fill zone prior to the step of receiving the shipping item in the fill zone. It is to be appreciated that the tab may be configured to transition into a spreader. In embodiments, assistance may include other steps of inserting a loading chute of the insertion assistance set between the webs of the expanded amount of the web set in the fill zone prior to a depth prior to the step of receiving the shipping item in the fill zone. It is to be appreciated that a loading chute may be configured to provide a pair of sides that protect against a collision of the expanded amount of the web set and the shipping item, or of the expanded amount of the web set and a user, or both. It is to be further appreciated that methods may include withdrawing the loading chute after the step of receiving the shipping item in the fill zone.

In some embodiments, methods may also include examining, by a quality/transport set, the package based on predetermined criteria including at least sealing and proper labeling that; and transporting the package according to a result of the examination. Embodiments of the disclosure include a method for custom packaging of one or more of a shipping item, with controlling production (with a controller provided with programming). The controlled production may include supporting a pair of rolls of prefabricated expandable packaging material and unrolling into webs and matching into a web set, in a roll section; transitioning a web set, at a tension roller, to a package section; positioning a set of grippers downstream of the tension roller and communicatively connecting the set of grippers with the controller; and positioning a set of sealers downstream of the tension roller and communicatively connecting the set of sealers with the controller. It is to be appreciated that programming for the controller may determine a set of movements of the matched web set through the roll section and through the package section based at least in part on a data scanned from the shipping item.

Disclosed embodiments include a method of making a packaging enclosure for an article that includes providing a pair of rolls of an expandable packaging material, unrolling a section of the expandable packaging material per each of the pair of rolls into webs, aligning the webs, matching the webs into a web set, providing the web set to a package section, expanding the expandable packaging material of the web set in a form zone of the package section, and forming the packaging enclosure from the web set after the expanding. It is to be understood that the expandable packaging material is configured to have a first layer that increases in length and a second layer that increases in thickness.

In an embodiment, at least the first layer of the expandable packaging material comprises a crepe paper, a crinkled paper, a crimped paper, or a corrugated paper and at least the second layer of the expandable packaging material comprises a paper having a plurality of slits formed therein. It is to be appreciated that expanding may be performed by subjecting the web set to tensioning in the form zone, and further appreciated that tensioning expands the first layer of the expandable packaging material in a first direction and expands the second layer of the expandable packaging material in the first direction and in a second direction orthogonal to the first direction. In embodiments, a first layer of the expandable packaging material decreases in thickness when expanding in the first direction. In embodiments, a second layer of the expandable packaging material decreases in width when expanding in the first direction and increases in thickness when expanding in the second direction.

In some embodiments of a disclosed method it is to be appreciated that forming the packaging enclosure includes sealing a posterior edge of the web set, gripping a lower portion of the web set, gripping an upper portion of the web set, and maintaining a separation between webs of the web set at an anterior edge of the web set. The first layer of the expandable packaging material may form an exterior surface of the packaging enclosure.

Embodiments of a disclosed method may further include applying a label to the exterior surface of the packaging enclosure. Other embodiments may further include creating a pouch bounded and defined by the webs of the web set that are sealed by the posterior edge of the web set and gripped by the lower portion and the upper portion. These embodiments may include moving the gripping of the upper portion towards the lower portion and spreading the webs of the web set apart from each other, widening the separation thereby creating an entrance to the pouch. It is to be appreciated that the spreading may include inserting a spreader set between the separated webs of the web set or inserting a loading chute between the separated webs of the web set, or both.

In another embodiment, a method may also include inserting an article into the pouch, withdrawing the loading chute, withdrawing the spreader set, and moving the gripping of the upper portion away from the lower portion. It is to be appreciated that this moving away from the lower portion assists in securing the anterior edge of the web set such that the packaging enclosure surrounds the article.

In another embodiment, a method may also include indexing the packaging enclosure to a finish zone of the package section, sealing the upper portion of the web set, sealing the anterior edge of the web set, and separating the packaging enclosure from the web above the sealing of the upper portion of the web set.

In other embodiments, methods disclose a step of sealing that may include providing an adhesive coating on a surface of one of the first layer of the expandable packaging material and the second layer of the expandable packaging material, activating the adhesive coating after expanding the web set, and bonding the webs of the web set to one another with the activated adhesive coating. It is to be appreciated that activating an adhesive coating may include subjecting the section of the packaging material to one of heat, pressure, moisture, or combinations of the same after expanding the section of the packaging material.

In an embodiment for a disclosed packaging enclosure for an item, the packaging may include packaging material that includes a first layer, a second layer, and a third layer. The second layer is interposed between the first layer and the third layer, and at least one attachment point is provided between at least the first layer and the second layer. The first layer, the second layer, and the third layer together are rolled onto a roll of a pair of rolls in an unexpanded condition and together are of a first thickness. In this embodiment, a section of the packaging material unrolled from each of the rolls of the pair of rolls are matched and form a web set. The web set is moved to an expanded condition configured to be of a second thickness that is greater than the first thickness. The web set is controlled such that an anterior portion has a separation maintained between a respective section of the packaging material from each of the rolls of the pair of rolls and the web set forms a front and a back of the packaging enclosure while in the expanded condition. Edges of the web set are secured to one another such that a pouch is bounded and defined by the front and the back, and the pouch is adapted to receive the item therein.

In embodiments, packaging material for a packaging enclosure may have a first layer and a third layer that includes one or more undulations therein that flatten when a section of the packaging material is moved to an expanded condition. The first layer and the third layer may include at least one of a crepe paper, a crinkled paper, a crimped paper, and a corrugated paper. A second layer may include a sheet of paper having a plurality of slits formed therein. The plurality of slits expands to form honeycomb openings in the second layer when the section of the packaging material is moved to the expanded condition.

In embodiments, as disclosed, edges of the web set being secured may include the edges of the web set temporarily being gripped together, or edges of the web set being sealed together, or the edges of the web set temporarily being gripped together being sealed together. It is to be appreciated that the sealing provides an adhesive coating having been applied on a surface of one of the first layer of the expandable packaging material and the second layer of the expandable packaging material, an activation of the adhesive coating after the web set has been moved to the expanded condition; and a bonding of the webs of the web set to one another with the activated adhesive coating. It is to be further appreciated that activation of the adhesive coating may include subjecting the web set to one of heat, pressure, moisture, or combinations of the same after the web set has been moved to the expanded condition.

Embodiments of the disclosure provide for a system for custom packaging a set of items to be shipped in that the system includes a roll section that provides support for a pair of rolls of prefabricated packaging material that are unrolled into webs and matched into a web set; and a package section that provides a fill zone and a finish zone. It is to be appreciated that in some instances, the prefabricated packaging material may be any of simple paper (such as a single layer per roll that does not expand), or most any type of poly film, fiber, or other material that may be fabricated in one or more layers and that may not stretch or may have a spectrum of stretch capability. It is to be appreciated that as described herein, data for the packaging material is contemplated to include the composition and stretch characteristics.

It is to be appreciated that the matched web set from the roll section is treated in the fill zone, receives a shipping item in the fill zone, and is finish-sealed and separated from the webs in the finish zone to comprise a finished package. In some of these embodiments, the roll section further may include a pair of support rollers configured to support the pair of rolls of prefabricated packaging material, a mating roller downstream of the pair of support rollers configured to match the webs into the matched web set, and a plurality of feed rollers downstream of the mating roller configured to feed the matched web set to the package section. In some of these embodiments the system may include a scan device configured to obtain data from the shipping item; and a controller communicatively connected with the scan device, the roll section and the package section, wherein the controller is configured to control a set of movements of the matched web set through the roll section and through the package section based at least in part on the data scanned from the shipping item and at least in part on a selected mode. It is to be appreciated that the controller may be configured for various system controls including providing alignment to the pair of rolls of prefabricated packaging material and controlling the matching of the webs into the web set by way of the mating roller. The controller may also be communicatively connected to such system components as labelers, insertion assistance sets and quality/transport sets. In embodiments, the package section contains a labeler configured to label an outer side of a portion of the expanded matched web set in the fill zone. In embodiments, the package section contains an insertion assistance set configured to treat the matched web set by spreading the webs of the matched web set for receiving the shipping item. In embodiments, the package section contains a quality/transport set that examines the package based on predetermined criteria including at least sealing and proper labeling and the package is transported according to a result of the examination. It is to be appreciated that embodiments of the insertion assistance set may be provided with one or more of a spacer and a tab configured to transition into a spreader, and a loading chute. The spacer may be configured to protrude into the webs of the web set and the tab may be configured to translate between the webs of the web set in the fill zone prior to the system receiving the shipping item in the fill zone. The loading chute may be configured to have a platform matingly sized to the spreader as well as a pair of sides. In embodiments, the controller provides control over insertion and withdrawal of the loading chute to provide the pair of sides to a depth between the webs of the web set in the fill zone prior to the system receiving the shipping item in the fill zone such that the pair of sides protect against a collision of the web set and the shipping item or of the web set and a user or both.

Some embodiments of the disclosure provide a system that includes a second pair of support rollers in the roll section for a second pair of rolls of prefabricated packaging material that are configured to enable a near zero down time with a changeover of feed of prefabricated packaging material from the first pair of rolls to the second pair of rolls at one or more designated conditions.

Other system embodiments disclosed include systems that have an alignment of a pair of rolls of prefabricated packaging material and a matching of webs into a web set being completed in a roll section of the system. These other system embodiments may include a back sealer configured to seal a back portion of the web set in a fill zone; and a labeler configured to label an outer side of a portion of the matched web set in the fill zone. These other system embodiments may include an insertion assistance set configured to treat the matched web set by spreading the webs of the matched web set for receiving the shipping item.

Embodiments of the insertion assistance set may include a spacer and a tab (configured to transition into a spreader), and a loading chute configured to having a pair of sides and a platform. The spacer may be configured to protrude into the webs of the web set and the tab may be configured to translate between the webs of the web set in the fill zone prior to the system receiving the shipping item in the fill zone. The platform of the loading chute may be matingly sized to the spreader; and the pair of sides of the loading chute may be configured such that upon insertion of the loading chute and prior to the system receiving the shipping item in the fill zone, the pair of sides protects against a collision of the web set with the shipping item or of the web set with a user or both.

These other system embodiments may include a set of grippers that are configured to index the matched web set from the fill zone to a finish zone after placement of the shipping item between the spread webs of the matched web set. These other system embodiments may also include a quality/transport set that examines the package based on predetermined criteria including at least sealing and proper labeling and transports the package according to a result of the examination.

In some of these systems, the pair of roll supports for the pair of rolls and a second pair of roll supports for a second pair of rolls may be configured to enable a near zero down time with a changeover of feed of prefabricated packaging material from the pair of rolls to the second pair of rolls at a designated condition.

Disclosed embodiments include an update kit for a system for custom packaging a set of items. Such an update kit may include a set of grippers and a controller programming update. It is to be appreciated that the set of grippers may include a subset of grippers that would be configured to be communicatively connected with a controller that is configured to receive the controller programming update, and that once upgraded, a form zone is adapted to be placed in a package zone of the system. Further, a pair of rolls of prefabricated packaging material of the system would be a pair of rolls of a prefabricated expandable packaging material, and the subset of grippers would be configured to contain at least one gripper that is configured to expand a determined amount of a web set of the prefabricated expandable packaging material in the form zone based at least in part on a data from a shipping item of the set of items; and contain at least another gripper of the set of grippers that along with the at least one gripper of the subset of grippers is configured to index the expanded amount of web set from the form zone to a fill zone. In some embodiments, an update kit would provide that the determined amount of web set would be based at least in part on maintaining a portion of the web set throughout the fill zone upon index of the expanded amount of web set from the form zone to the fill zone, and at least in part on a data of the pair of rolls of prefabricated expandable packaging material.

Disclosed embodiments include a retrofit kit for a system that provides custom packaging of one or more of a shipping item. Such a retrofit kit may include a set of rollers configured to provide support for a pair of rolls of a prefabricated expandable packaging material, and that unroll the prefabricated expandable packaging material into webs, and that match the webs creating a web set. The embodiment of the retrofit kit may also include a set of grippers configured to provide a form zone of a package section and configured to expand a determined amount of the web set in the form zone based at least in part on a data from a shipping item of the one or more of the shipping item. The embodiment of the retrofit kit may also include a controller programming update configured to provide a controller to control the set of rollers and the set of grippers. It is to be appreciated that embodiments of retrofit kits would provide that once retrofitted, the set of rollers feeds the web set to the form zone of the package section; and the package section further provides a fill zone and a finish zone; wherein the matched web set (from the set of rollers and expanded in the form zone) receives the shipping item of the one or more of the shipping item in the fill zone, and is finish-sealed and separated from the webs in the finish zone to comprise a finished package.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims. It should be noted that the figures do not necessarily represent the component parts of system 10 to scale. Additionally, many component parts of system 10 are not illustrated in the attached figures for clarity of illustration but a person of ordinary skill in the art will realize that these non-illustrated or omitted components may be present to actuate and operate system 10. For example, wiring and drive which power the various components may be only partially illustrated in the drawings or may be completely omitted from the drawings.

FIG. 5

Similar numbers refer to similar parts throughout the drawings.

DETAILED DESCRIPTION

Figure 1:
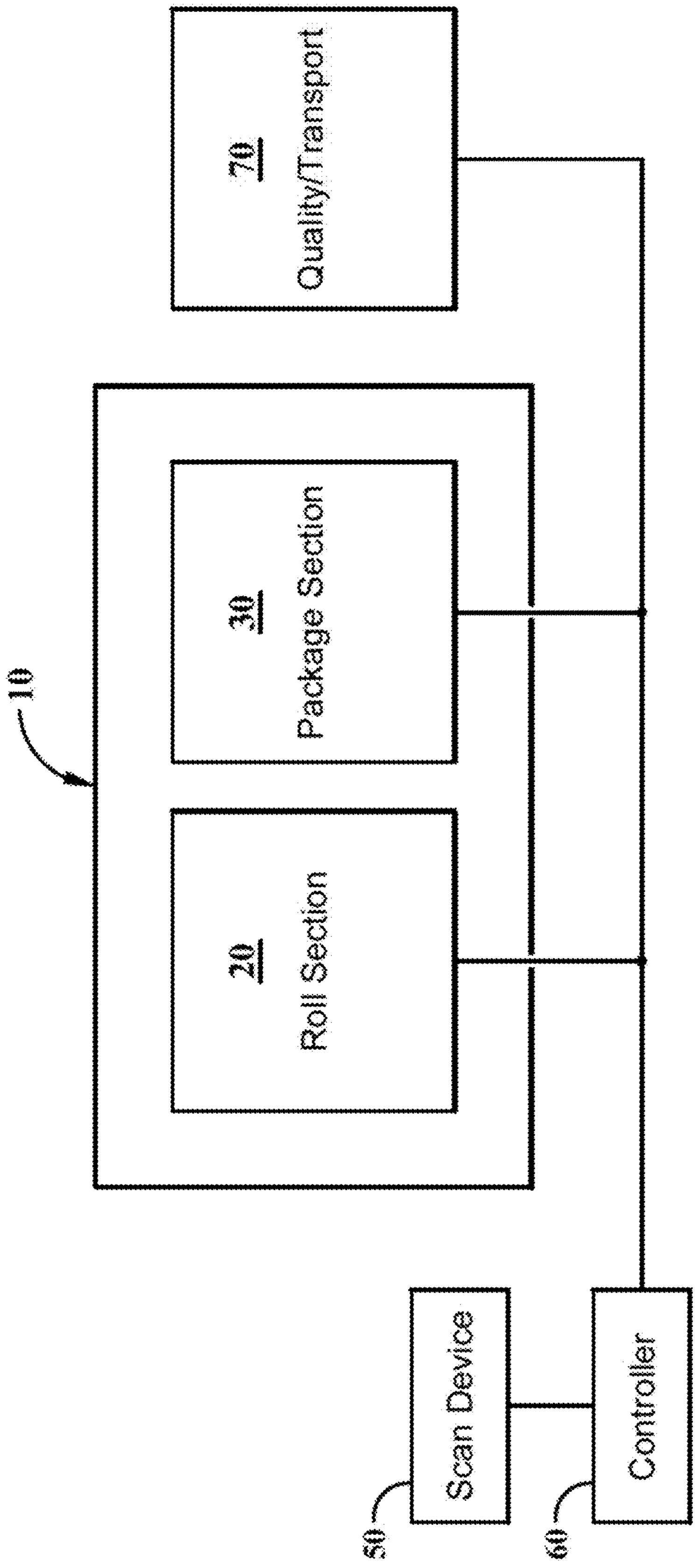
FIG. 1 provides a diagrammatic block diagram representing various embodiments of system 10 regarding build out and communicative control of system 10 according to aspects of the innovation.

Referring to FIG. 1 through FIG. 12H, there is shown a system 10 for automated packaging of differently shaped and sized articles in customized packaging (see FIG. 13) for shipment to customers. In one embodiment, the packaging material utilized to produce the customized packaging is fully recyclable. In other embodiments, the packaging material utilized to produce the customized packaging is partially recyclable. In yet other embodiments, the packaging material utilized to produce the customized packaging is not recyclable.

In particular, the disclosed system (for example, system 10) and methods (for example methods 100, 200A, and 200B) are useful for packaging a variety of dissimilar articles in settings such as online retail fulfillment centers and other packaging and shipping facilities. It will be understood that system 10 and methods 100, 200A, and 200B may also be used for packaging substantially identical articles, should that be desired. It is also to be appreciated that "item" may not explicitly be a singular item and may include a group of singular items grouped together in some manner and for which data to be scanned is indicative of the grouped items. In this sense, "item" as may be used in the disclosure is understood to include a specific group of items, and the singular is to be understood to include the plural. It is to be appreciated that shipping item 12 may be a singular item in a series of shipping items $\mathbf{12}_M$, $\mathbf{12}_{M+1}$, . . . $\mathbf{12}_{M+N}$, where M and N are integers. Similarly, a package, such as package 14, may be a singular package in a series of packages $\mathbf{14}_M$, $\mathbf{14}_{M+1}$, . . . $\mathbf{14}_{M+N}$, where M and N are integers. For ease of explanation, shipping item 12 and package 14 may be used without subscripts and the meaning will be clear from the provided context.

It should be noted that the figures do not necessarily represent the component parts of system 10 to scale. Additionally, many component parts of system 10 are not illustrated in the attached figures for clarify of illustration but a person of ordinary skill in the art will realize that these non-illustrated or omitted components are needed to actuate and operate system 10. For example, wiring and drive which power the various components may be only partially illustrated in the drawings or may be completely omitted from the drawings. As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Figure 2:
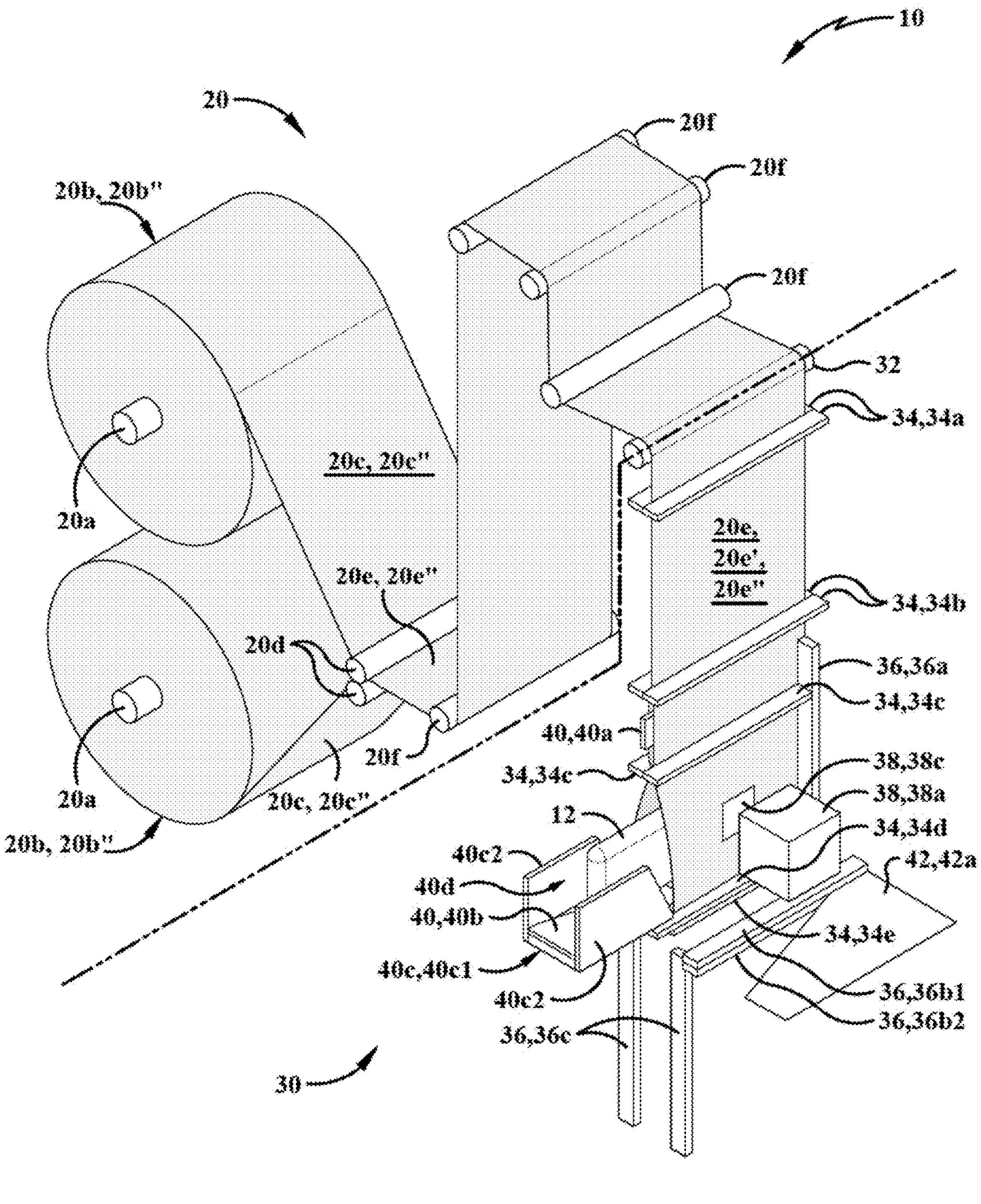
FIG. 2 is a diagrammatic, front, right side, isometric perspective view of a system according to aspects of the innovation.
Figure 3:
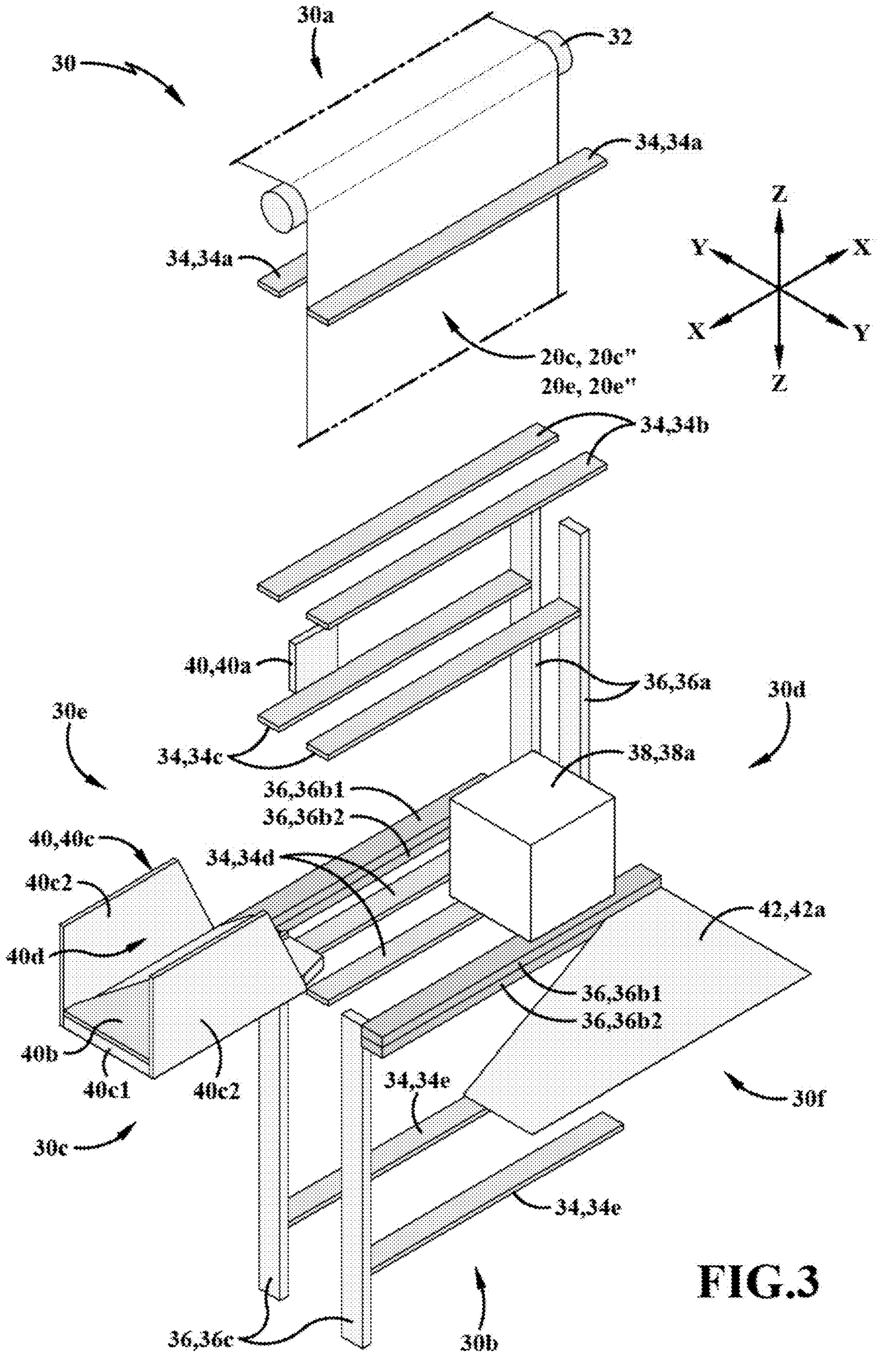
FIG. 3 is an exploded diagrammatic, front, right side, isometric perspective view of a package section of the system according to aspects of the innovation.

Turning now to FIG. 1 through FIG. 3, an embodiment of system 10 is presented in accordance with the present disclosure. FIG. 1 provides a diagrammatic block diagram representing an exemplary embodiment of system 10 regarding build out and communicative control of system 10. In the embodiment pictured, communicative or electrical communication may connect controller 60 with scan device 50 and quality/transport set 70 as well as to system 10 elements roll section 20 and package section 30. In other embodiments, system 10 may comprise a roll section 20, a package section 30, a scan device 50, a controller 60, and/or a quality/transport set 70 (not shown). A further embodiment may omit portions of quality/transport set 70 (not shown for clarity) or quality/transport set 70 may be considered to be a portion of package section 30 (not shown). FIG. 2 provides a diagrammatic front, right side, isometric perspective view of an embodiment generally indicated as system 10. System 10 may feature a roll section 20 and a package section 30. It is to be appreciated that roll section 20 provides for loading and alignment of input package material and that package section 30 provides for near continuous package fabrication at least in part as a function of a scan-by-scan basis, and at least in part as a function of a chosen mode. Such configuration of system 10 ultimately reduces waste of packaging material, at the same time, eliminates most all need for inventory of a family of pre-set package sizes, while also providing for cushioned packaging fit to size of a shipping item 12 involved. In embodiments, cushioned packaging may not be utilized while other aspects of the innovation may be emphasized. As will be appreciated, shipping item 12 when processed through system 10 yield savings in shipping material, processing time, and package size and weight, which provide truck load savings as well.

Roll section 20 may feature a pair of supports 20*a* for supporting or maintaining a pair of prefabricated rolls 20*b*. It is to be appreciated that rolls 20*b* may provide package material or webs 20*c* as disclosed and described in U.S. Pat. No. 11,931,985 or the like. For example, similar package material with crepe configuration rather than folds is contemplated. The packaging material, the manufacture of the packaging material, and a system for packaging articles therewith are the subject of U.S. Provisional Patent Application Ser. No. 63/111,544, filed Nov. 9, 2020 entitled "Paper-Based Packaging System", U.S. Provisional Patent Application Ser. No. 63/153,918, filed Feb. 25, 2021 entitled "Packaging Material with Expanding Layer"; and U.S. application Ser. No. 17/514,005 filed Oct. 29, 2021 entitled "Packaging Material With Expanding Layer And Packaging Final package Formed Therewith". The entire disclosures of these patent applications are incorporated herein by reference. It is also to be appreciated that in certain embodiments, packaging material may be used that is simple paper (such as a single layer per roll that does not expand), or most any type of poly film, fiber, or other material that may be fabricated in one or more layers and that may not stretch or may have a spectrum of stretch capability. It is to be appreciated that as described herein, data for the packaging material is contemplated to include the composition and stretch characteristics. Embodiments are contemplated for the aspects of stretching or expanding or the like, and in some embodiments, stretching or expanding of the rolls of packaging material may not be necessary or undertaken. In certain aspects, it will be clear from context that 20*b* includes this option, and in other aspects, a context of using 20*b*" may be used (likewise for 20*c* and 20*c*" and 20*e* and 20*e*"). Example embodiments may include dedicated sets of upgrade kits or retrofit kits that may convert one embodiment into another embodiment.

It is to be appreciated that supports 20*a* may include alignment mechanisms (not shown for clarity) that provide alignment of rolls 20*b* and that feed webs 20*c* of roll material in a controlled manner. It is contemplated that, in certain embodiments, the width of rolls 20*b* (and hence webs 20*c*) makes up the width dimension of the end-product package and may be provided in a number of predetermined dimensions per roll 20*b* (with data on roll 20*b* that in some embodiments may be scannable or otherwise entered into a controller). An exemplary width may be twenty inches. Other embodiments (not shown) may provide for altering a final width at a portion of the process.

Web 20*c* of each of a pair of rolls 20*b* proceed matchingly through mating rollers 20*d* to create a web set 20*e* and are transferred along a plurality of feed rollers 20*f* of the roll section 20. For simplicity, web 20*c* may be referred to in the singular, but it is to be understood that reference may also apply to the pair of matched webs. It is to be appreciated that plurality of feed rollers 20*f* may orient the web set 20*e* along vertical, horizontal, or angular directions, and may orient feeding of the webs 20*c* to most any predetermined orientation. For simplicity, FIG. 2 shows an embodiment in which the plurality of feed rollers 20*f* move the web set 20*e*, horizontally and vertically. It is also to be appreciated that the feed of webs 20*c* may include a controller that controls tension and indexing of web set 20*e* (of webs 20*c* of rolls 20*b*) during one or more portions of transit. It is also to be appreciated that indexing of rolls 20*b* may occur to provide most any amount of feed of webs 20*c* for web set 20*e* as may be desired during one or more index actions. Web set 20*e* is continuously provided to the package section 30 of system 10. As noted herein, it is also to be appreciated that in certain embodiments, packaging material may be used that is simple paper or the like and to which aspects of stretching, or expanding, or the like may not be necessary or undertaken. In certain aspects it will be clear from context that 20*e* includes this option, and in other aspects, a context of using 20*e*" may be used.

It is further appreciated that in embodiments, the provision of a matched web set 20*e* that traverses through system 10 at a same or similar rate, provides a benefit of less system down time as each roll 20*b* of prefabricated packaging material may be depleted at or near the same time, and one replacement downtime for multiple roll replacement may allow better system utilization. In other embodiments (not shown), multiple pairs of rolls on multiple pairs of supports may feed system 10, with a synchronized switch-over from one set of rolls 20*b*1 to another set 20*b*2 thereby providing near zero down time as a pair of depleted rolls may be replaced with new rolls 20*b*3 while the second set of rolls 20*b* are switched over to. It is to be appreciated that for clarity, support 20*a* and roll 20*b* may be referenced in the singular in several embodiments, and in each of these embodiments, an embodiment of multiple pairs is contemplated.

FIG. 3 shows an exploded diagrammatic, front, right side, isometric perspective view of package section 30 of system 10. In the embodiment pictured, package section 30 has a top 30*a* signified as the position that accepts feed of web sets 20*e* from roll section 20. A portion opposite top 30*a* signified as bottom 30*b* in the embodiment pictured and is considered the end of package section 30 of system 10. It is to be appreciated that while the embodiment portrays top 30*a* and bottom 30*b* to be opposing ends along a vertical axis (Z), it is contemplated that other orientations of the components are within the scope of the disclosure (for example, top 30*a* and bottom 30*b* may be aligned with a horizontal axis (Y). In the present embodiment a path of web set 20*e* of web 20*c* through package section 30 may be primarily vertical extending from a first end of top 30*a* to a second end of bottom 30*b*. Package section 30 also has front 30*c* and an opposing rear 30*d*. Front 30*c* is the portion of package section 30 from which an operator (or automated loader) may insert a shipping item 12 into a pouch of the web set 20*e* in fill zone 30*h*, as will be described herein. Front 30*c* may also be referred to as anterior, as in an item within package section 30 that has an anterior feature would have that feature closer to front 30*c*. Likewise, rear 30*d* may also be referred to as posterior, as in an item within package section 30 that has a posterior feature would have that feature closer to rear 30*d*. In this embodiment, width of web 20*c* is measured along axis X. As viewed from a positive X towards the origin, package section 30 has a left side 30*e* and an opposing right side 30*f*. It is to be appreciated that in embodiments, items presented on a left side or a right side of the path of web set 20*e* of web 20*c* may be on either other side and different from the embodiment pictured.

Figure 4:
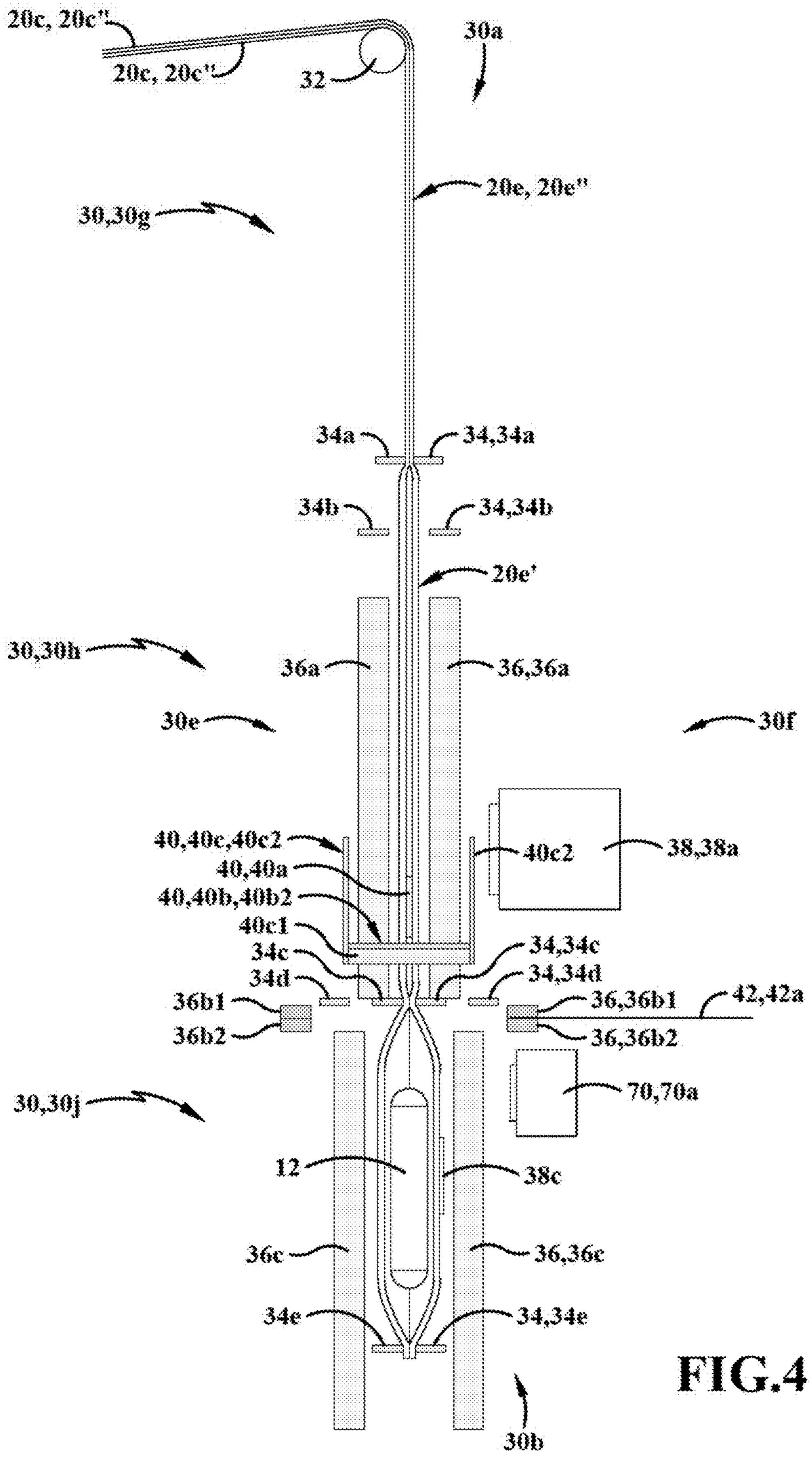
FIG. 4 is a diagrammatic side elevation view of several exemplary zones of the package section, namely a form zone, a fill zone and a finish zone of the system according to aspects of the innovation.

FIG. 4 shows a diagrammatic side elevation view of several exemplary zones or portions of package section 30 of system 10 including form zone 30*g*, fill zone 30*h* and finish zone 30*j*. It is to be appreciated that one or more zones may overlap one another (e.g., form zone 30*g* shown overlapping fill zone 30*h* in FIG. 4). The path of web set 20*e* of web 20*c* through package section 30 may be through form zone 30*g*, then through fill zone 30*h*, and then through finish zone 30*j*. It is to be appreciated that the two streams of web 20*c* that make up web set 20*e* may be viewed as designating a largely mirror arrangement along a centerline between the two webs in the respective form zone 30*g*, fill zone 30*h*, and finish zone 30*j* of package section 30, discussed herein below.

At top 30*a* of package section 30, a tension of web set 20*e* of web 20*c* may be maintained with a tension roller 32 that is a part of the package section 30. It is to be appreciated that tension roller 32 may be a singular roller or a nip roller and is configured to be able to pivot and translate so that tension may be maintained as other components move (for example, as first gripper 34*a* moves to stretch web set 20*e* of web 20*c* into an extended or stretched condition, as discussed herein below). In some embodiments, tension roller 32 may be omitted.

Package section 30 of system 10 is characterized by a set of grippers 34 and a set of sealers 36. As discussed in greater detail below, each gripper of the set of grippers 34 may open and close (horizontally as pictured in the present embodiment). Additionally, selective grippers of the set of grippers 34 may traverse vertically along a portion of the package section 30, towards each of top 30*a* and bottom 30*b* in selective movements. Set of grippers 34 are configured to have jaws (not shown) that may line the edges of the bars (shown), and that may assist grip and release when grippers open and close to hold together portions of the web set 20*e* of web 20*c*. It is to be appreciated that jaws are perpendicular to the web 20*c* and may be centered, as well as may span the entire width of web 20*c* or portions thereof. It is to be further appreciated that nip bars in some embodiments may be smaller pads than the aforementioned jaws and may concentrate a stretch or grip or both on a desired portion of web 20*c*. A set of sealers 36 may act at selected points of operation to operate individually or in unison to selectively seal portions of web set 20*e* of web 20*c*, thereby forming at least a side of a pouch, as will be discussed herein. It is to be appreciated that the pouch so constructed may provide protection to the enclosed shipping item 12 by the extension action in the form zone 30*g* for the web set 20*e* of web 20*c*, as will be discussed herein. Package section 30 of system 10 may be further characterized by a labeler 38, and an insertion assistance set 40, that may contain spacer 40*a*, a bag opener 40*b*, and a loading chute 40*c*. These items will be discussed herein below. Additionally, package section 30 of system 10 may be characterized by a separator set 42. In some embodiments package section 30 of system 10 may be further characterized by a quality/transport set 70, as will be discussed herein below.

Discussing the set of grippers 34 in more detail, grippers of the set of grippers 34 include a first gripper 34*a* that may stretch or expand or extend or form material of web set 20*e* between first gripper 34*a* and a clamped second area (to be discussed herein below). In some embodiments, first gripper 34*a* may be programmed to not perform a stretch or expand operation. It is to be appreciated that a stretch or expand operation may provide force to a selected packaging material with one or more expanding layers (in the matched web set 20*e*, thereby forming 20*e*'), and in embodiments, may do so as to effect two or more separate mechanisms of stretch. For example, a layer of web 20*c* (not shown) may stretch or expand by way of a layer being configured with slits that when subjected to a stretching force become a honeycomb structure, while a different layer of web 20*c* (not shown) when subjected to a stretching force may stretch or expand by way of undulations in the different layer (such as, for example, those that may be present in packaging material of crepe paper, crinkled paper, crimped paper, corrugated paper or like paper or other material) that become unwrinkled or otherwise flatten. It is to be further appreciated that these layers stretch or expand in these different mechanisms by way of the provided force being applied in one direction, either concurrently or sequentially. In one operation, first gripper 34*a* may move orthogonal to web 20*c* to open and close (parallel to the Y axis in the embodiment pictured), closing when gripping a portion of the web set 20*e* of web 20*c* or opening when releasing said portion of the web set 20*e* of web 20*c*. In an operation, first gripper 34*a* may also move parallel (in an open state) to a path of web 20*c* (towards top 30*a*) when the first gripper 34*a* is aligning with a desired position in relation to a portion of the web 20*c* prior to an operation of stretching and/or forming of web set 20*e* of web 20*c*. Movement in the same direction (towards top 30*a*) while in a closed state may enact the stretch operation of web set 20*e* (creating a stretched or expanded state of web set 20*e*'). In another operations, first gripper 34*a* may also move parallel (in a closed state) to index stretched web set 20*e* (and web 20*c*), generally towards bottom 30*b*. It is to be appreciated that for an option mode, such as C), in which no stretch is contemplated, the reference to stretched web set 20*e* may be considered to be a non-stretched web set 20*e*'', and those steps of stretching (and related componentry) may be omitted or not used. It is further contemplated that in embodiments, an upgrade kit or a retrofit kit (not shown) may be provided to enable a change from one embodiment to another embodiment, or to retrofit a prior art packaging machine into embodiments of system 10.

Grippers of the set of grippers 34 also includes a second gripper 34*b* that is positioned vertically below first gripper 34*a* in package section 30. In an operation, second gripper 34*b* may maintain tension on freshly stretched portion of web set 20*e* of web 20*c* at a position that is vertically below first gripper 34*a* in form zone 30*g*. Second gripper 34*b* may be stationary (in relation to web 20*c* traversing along its path through package section 30, while being able to open and close orthogonally to the path of web 20*c* (parallel to the Y axis in the embodiment pictured). In one operation, second gripper 34*b* may be set to a closed or clamped position that holds web 20*c* together permitting a third gripper 34*c* (described below) of the set of grippers 34 to release and traverse parallel to the Y axis (towards each of top 30*a* and bottom 30*b*). Such gripping performed by second gripper 34*b* maintains tension on a freshly stretched portion of web 20*e* prior to web set 20*e* of web 20*c* indexing down into fill zone 30*h* while third gripper 34*c* is in release mode. In another operation, second gripper 34*b* releases (opens) when third gripper 34*c* has relocated and closed (clamped). It is to be appreciated that in embodiments in which a stretch or expansion of prefabricated packaging material is not desired, second gripper 34*b* may be omitted, not used, and/or may be supplied in an embodiment of an upgrade kit or retrofit kit.

As noted, the set of grippers 34 also includes a third gripper 34*c* that is positioned vertically below the first gripper 34*a* and the second gripper 34*b* in package section 30. In one operation, third gripper 34*c* provides a clamp force while also being able to move with selected grippers to provide an indexing of web set 20*e* of web 20*c* through a portion of package section 30 (towards bottom 30*b*). It is to be appreciated that indexing may move another section of web 20*c* (after that section has been formed in form zone 30*g*), into fill zone 30*h*, while maintaining a desired tension on the portion of web 20*c* between third gripper 34*c* and first gripper 34*a*. As will be discussed herein below, in an operation, the state of third gripper 34*c* being clamped or closed provides an upper barrier to a formed pouch in fill zone 30*h* such that shipping item 12 being placed into the pouch of the web 20*c* has an upward ceiling. This ensures that a later applied seal at the top of the pouch will be fully effective with shipping item 12 not intruding into the area to be sealed. In other words, the set of grippers contribute to forming a controlled portion of the expanded (or non-expanded) web set.

Grippers of the set of grippers 34 also includes a fourth gripper 34*d* that is positioned vertically below the third gripper 34*c* in package section 30. The fourth gripper 34*d* is stationary (relative to the path of web set 20*e* of web 20*c* traversing through package section 30), while being able to open and close orthogonally to the path of web 20*c* (parallel to the Y axis in the embodiment pictured). In one operation, fourth gripper 34*d* may be set to a closed or clamped position that holds web 20*c* together permitting a fifth gripper 34_e_ (described below) of the set of grippers 34 to release and traverse opposite a direction of the path of web 20_c_ (generally towards top 30_a_). In an operation, fourth gripper 34_d_ may maintain a portion (stub, not shown) of web 20_c_ below (towards bottom 30_b_) the fourth gripper 34_d_, as discussed herein below.

Grippers of the set of grippers 34 also includes a fifth gripper 34_e_ that is positioned vertically below the fourth gripper 34_d_ in package section 30. As briefly noted above, fifth gripper 34_e_ works in conjunction with fourth gripper 34_d_ in which fifth gripper 34_e_ traverses towards top 30_a_ in an open mode and closes (clamps) on the stub of web 20_c_. This prepares for an operation of traversing towards bottom 30_b_ while in closed mode in order to index, as discussed herein. Index may move a shipping item 12 in a pouch of web set 20_e_ from fill zone 30_h_ to finish zone 30_j_. In another operation, fifth gripper 34_e_ may remain clamped, and provide for holding web set 20_e_ of web 20_c_ in place for application of seals and/or in an alternative embodiment, application of quality/transport set 70 (as disclosed herein below).

Figure 13:
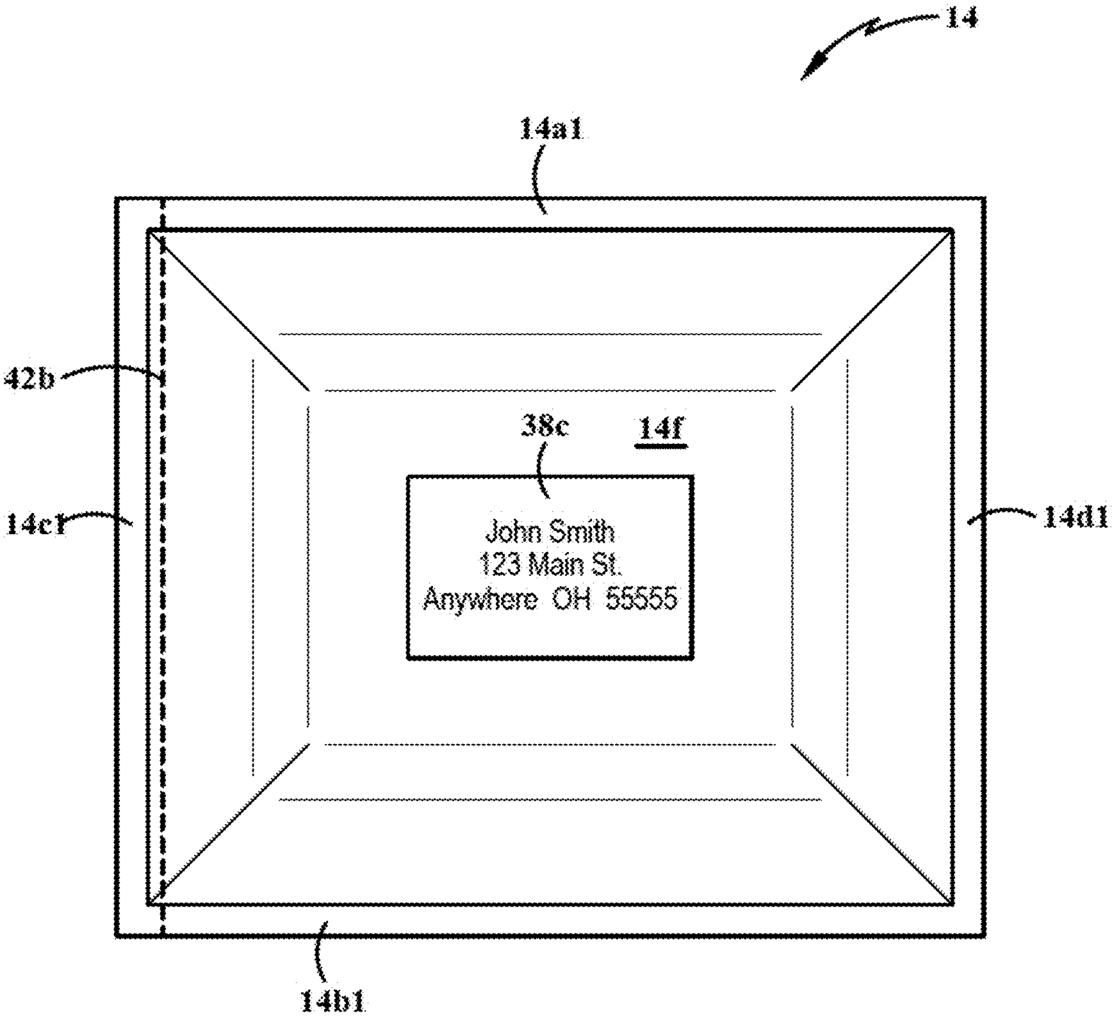
FIG. 13 is a diagrammatic side elevation view of finished package according to aspects of the innovation.

Discussing the set of sealers 36 in more detail, the set of sealers 36 includes a first or back sealer 36_a_ located at the rear 30_d_ of package section 30 (along the distal or rear edge of the width of web 20_c_). Seal bars of the back sealer 36_a_ are parallel to the Z axis in the embodiment shown and are on opposing outer sides of web set 20_e_ of web 20_c_, one each towards left side 30_e_ and right side 30_f_. Back sealer 36_a_ is operable to bind a rear edge of a web set 20_e_ of web 20_c_ together (parallel to the Z axis). In operation, seal bars of the back sealer 36_a_ open and close orthogonally to the path of web 20_c_ (parallel to the Y axis in the embodiment pictured) in order to create the rear seal 14_b_1 of the package 14, which is discussed in greater detail below. It is to be appreciated that sealing the rear edge of a web set 20_e_ of web 20_c_ assists in creating a controlled portion of the expanded web set in the fill zone. In other words, the back seal sets a sealed portion of a pouch into which a shipping item 12 will be placed, and being sealed, provides that the placement can be made in a most secure manner towards rear 30_d_ of fill zone 30_h_ of package section 30. It is to be appreciated that in embodiments, seal bars of back sealer 36_a_ are longer than a tallest package to be processed, as this insures a continuous seal along the rear 30_d_ of the width of web 20_c_. It is to be further appreciated that sealing performed by back sealer 36_a_ may be made over a preexisting sealed portion of web set 20_e_ depending on the variability of indexing that may occur. As best seen in FIG. 13, package 14 has a distal seal 14_d_1.

The set of sealers 36 also includes a second or top/bottom sealer 36_b_ that places both a top seal and a bottom seal during processing of a package 14 for shipping item 12 (as best seen in FIG. 13, package 14 has a top seal 14_a_1 and an opposing bottom seal 14_b_1). Seal bars of top/bottom sealer 36_b_ are perpendicular to the path of web 20_c_ from top 30_a_ to bottom 30_b_ of package section 30 and are located directly below fourth gripper 34_d_. Configuration of an embodiment provides four individual top/bottom seal bars, with an upper set of seal bars 36_b_1 spaced above a lower set of seal bars 36_b_2. Each of the upper set of seal bars 36_b_1 and the lower set of seal bars 36_b_2 has a bar to either side of the web set 20_e_ of web 20_c_ (one on the outer left side 30_e_ and one on the outer right side 30_f_). It is to be appreciated that with a double set of sealing bars, a single operation of sealing provides both a top seal (by way of lower set of seal bars 36_b_2) to a pouch of web set 20_e_ of a package that has been filled with shipping item 12 and indexed down to finish zone 30_j_, and a bottom seal to a next pouch of web set 20_e_ (the web set 20_e_ that is above upper set of seal bars 36_b_1). In other words, the upper set of seal bars (36_b_1) of top/bottom sealer 36_b_ puts a bottom seal in the package being fabricated (the pouch) before a scanned shipping item 12 is placed in the fill area of the pouch.

The set of sealers 36 also includes a third or front sealer 36_c_ that places a front seal during processing of a package 14 for shipping item 12. As best seen in FIG. 13, package 14 has a front seal 14_c_1. Front sealer 36_c_ is located at front 30_c_ of package section 30, along a (proximal to user or automated loader) edge of the width of web 20_c_. Seal bars of the front sealer 36_c_ are parallel to the path taken by web set 20_e_ of web 20_c_ through package section 30 and are on opposing outer sides of web 20_c_, one each towards left side 30_e_ and right side 30_f_. Front sealer 36_c_ is operable to bind a front edge of a web set 20_e_ of web 20_c_ together (parallel to the Z axis). In operation, seal bars of the front sealer 36_c_ open and close orthogonally to the path of web 20_c_ (parallel to the Y axis in the embodiment pictured) in order to create seal 14_c_1 of the package 14, which is discussed in greater detail below. It is to be appreciated that in embodiments, seal bars of front sealer 36_c_ are longer than a tallest package to be processed, as this insures a continuous seal along the front 30_c_ of the width of web 20_c_.

It is to be appreciated that fifth gripper 34_e_ may be located below (towards bottom 30_b_) the top/bottom sealer 36_b_ and may traverse posterior to front sealer 36_c_ parallel to the Z axis such that the anterior portion of fifth gripper 34_e_ is proximal to the rear of front seal bars of front sealer 36_c_.

It is to be further appreciated that a small area around a top seal (application discussed herein) may have a small gap in seal at a topmost edge of the seal as bars of front sealer 36_c_ are placed directly below and are perpendicular to the lower set of seal bars 36_b_2. In a similar manner, a small area around the bottom seal may have a small gap in seal at a bottommost edge as bars of back sealer 36_a_ are placed directly above and are perpendicular to the upper set of seal bars 36_b_1.

It is to be appreciated that sealing with back sealer 36_a_, top/bottom sealer 36_b_ and front sealer 36_c_ may be of chemical, heat, compression or combinations thereof as may be known in the art. Discussions of various sealing mechanisms should be understood to reflect the context of their use and location of the respective seal to be effected but otherwise may reflect a general physics of operation. The sealing action may be of pressure to a preset adhesive area or may involve delivery of an adhesive along with heat or mechanical force to effect a seal. In other embodiments, sealing may affect a physical seal between web set 20_e_. It is contemplated that the seal provided may meet predetermined shipping standards and may be configured to apply variable force based on other considerations such as for example, scan data indicating a weight or subject matter of a shipping item 12.

Embodiments of system 10 may further be configured with a labeler 38. Labeler 38 may be as known in the art (for example, CTM 3600YT servo labeler manufactured by CTM Labeling Systems). Labeler 38 may constitute a label printer 38_a_ and a label applicator 38_b_ that affixes label 38_c_ on a side of a pouch of web set 20_e_ of web 20_c_. While the embodiment pictured portrays the labeler 38 to be in fill zone 30_h_, and oriented to place a label on right side 30_f_, in other embodiments labeler 38 may be located in another zone of package section 30 or on left side 30_e_. In a preferred embodiment, labeler 38 applies label 38_c_ after a web set 20_e_ has been indexed from the form zone 30_g_ to the fill zone 30_h_ and back sealer 36_a_ has applied a back seal to the web set 20*e*, and the first and third grippers 34*a*, 34*c* maintain tension on web set 20*e*. It is to be appreciated that this provides a benefit of an easier label application as web 20*c* is nearly planar. It is to be further appreciated that application of a back seal by back sealer 36*a* and application of label 38*c* by labeler 38 may occur at other portions of processing through system 10. Application of labeler 38 is discussed herein below.

Package section 30 of system 10 also includes an insertion assistance set 40 that may provide assistance in opening the formed web set 20*e* (or expanded 20*e*' or unexpanded 20*e*") of web 20*c* that has been indexed from form zone 30*g* to fill zone 30*h*. As noted, portions of zones may overlap, and it is expected that the meaning of terms will be clear in the context provided. Insertion assistance set 40 is contemplated to assist a user (or automated inserter) in inserting a shipping item 12 into a partially formed pouch of web set 20*e* of web 20*c*. This assistance may be reflected by, but not necessarily limited to, a spacer 40*a*. It is contemplated that spacer 40*a* may be placed in one or more locations. Spacer 40*a* may be a portion of a support of second gripper 34*b*. In other embodiments, spacer 40*a* may be configured to be a portion of supports for first gripper 34*a*. In still other configurations, spacer 40*a* may be positioned in relation to third gripper 34*c*. Spacer 40*a* is positioned or configured to have a portion to be located between web set 20*e* to a depth towards rear 30*d* of D1 within a portion of the web path that web 20*c* traverses through package section 30. Specifically, spacer 40*a* may separate web set 20*e* with one portion of web 20*c* to the left side 30*e* and one portion to the right side 30*f*. It is contemplated that in some embodiments, spacer 40*a* may move parallel to the Z axis, but not move in relation to the X axis. In other embodiments, spacer 40*a* may be configured to move along two or three axis. Intrusion into the space between web set 20*e* to a depth towards rear 30*d* of D1 may preferably be from front 30*c*. It is to be appreciated that spacer 40*a* serves to keep a portion of the front edge of web set 20*e* open and apart from each web 20*c* of the web set 20*e* in a preferred location. As noted herein, aspects of embodiments provide context for such items as 20*b*, 20*c*, and 20*e* being understood to be 20*b*, 20*b*", 20*c*, 20*c*', 20', 20*e*, 20*e*', or 20*e*".

In addition to (or in some embodiments instead of) spacer 40*a*, bag opener 40*b* may be utilized. As best seen in FIG. 7A through FIG. 7E, Bag opener 40*b* may be located near the bottom of fill zone 30*h*, proximal to front 30*c*. It is contemplated that bag opener 40*b* may be configured to have a portion formed to be a thin tab 40*b*1. Tab 40*b*1 may be configured similarly to spacer 40*a* such that tab 40*b*1 is located between web set 20*e* extending towards rear 30*d* to a depth D2 within a portion of the web path that web 20*c* traverses through package section 30. Specifically, tab 40*b*1 may separate web set 20*e* with one portion of web 20*c* to the left side 30*e* and one portion to the right side 30*f*. It is to be appreciated that tab 40*b*1 serves to keep a portion of the front edge of web set 20*e* open. It is contemplated that tab 40*b*1 may not move parallel to the Z axis but may move in relation to the X axis. The movement in relation to the X axis may be limited such that tab 40*b*1 does not move out from between the web 20*c* of web set 20*e*, maintaining a minimum depth of D2.

It is to be appreciated that the intrusion depth D1 of spacer 40*a* and/or the initial or minimal depth D2 of tab 40*b*1 may be predetermined and is preferably a dimension parallel to the X axis equal to or greater than a dimension selected for a front seal that is provided in a finish zone 30*j* as discussed herein.

Figure 10A:
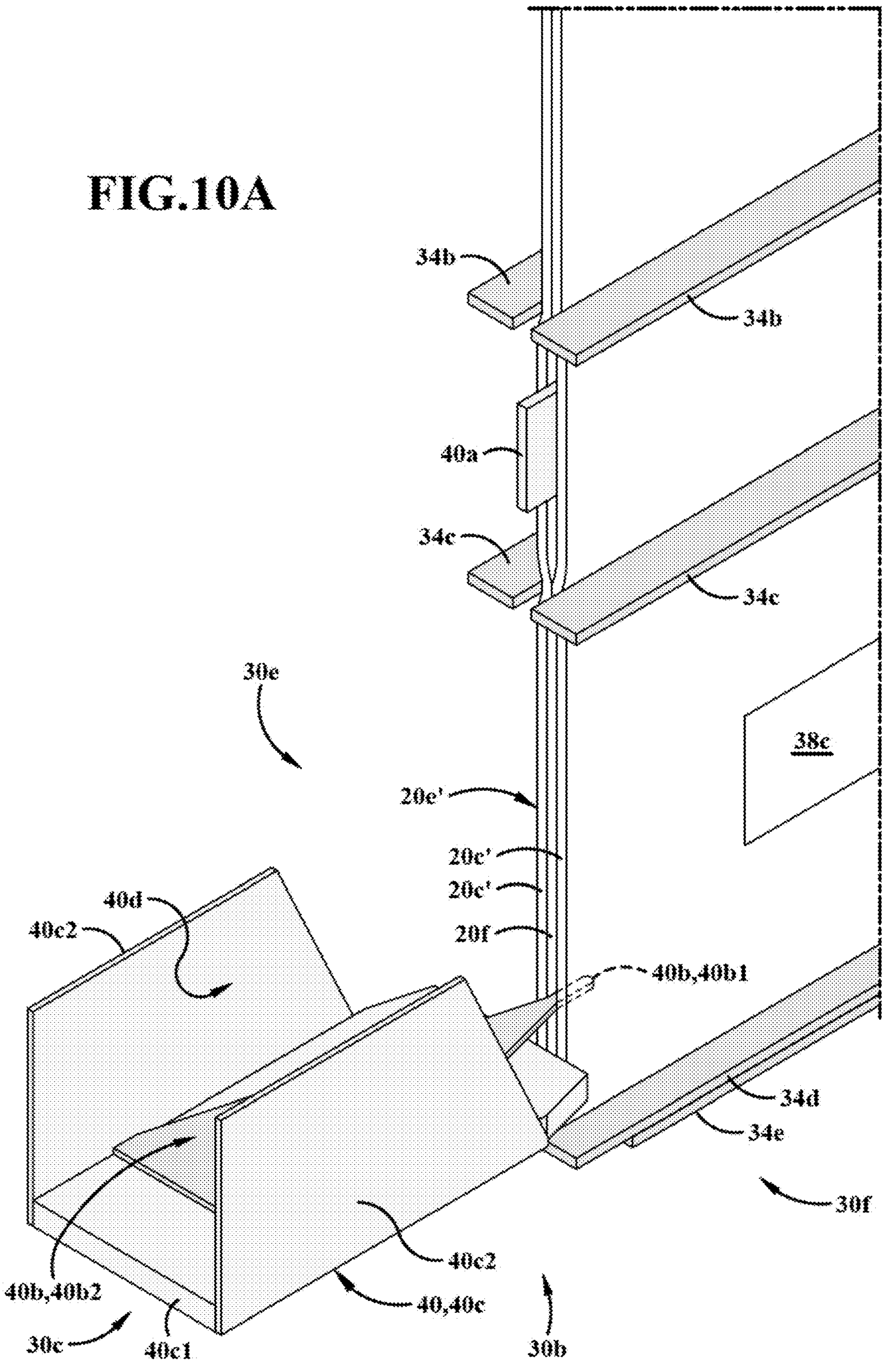
FIG. 10A is a diagrammatic, front, right side, isometric perspective view of the fill zone with items of an insertion assistance set present within the web set according to aspects of the innovation.
Figure 10B:
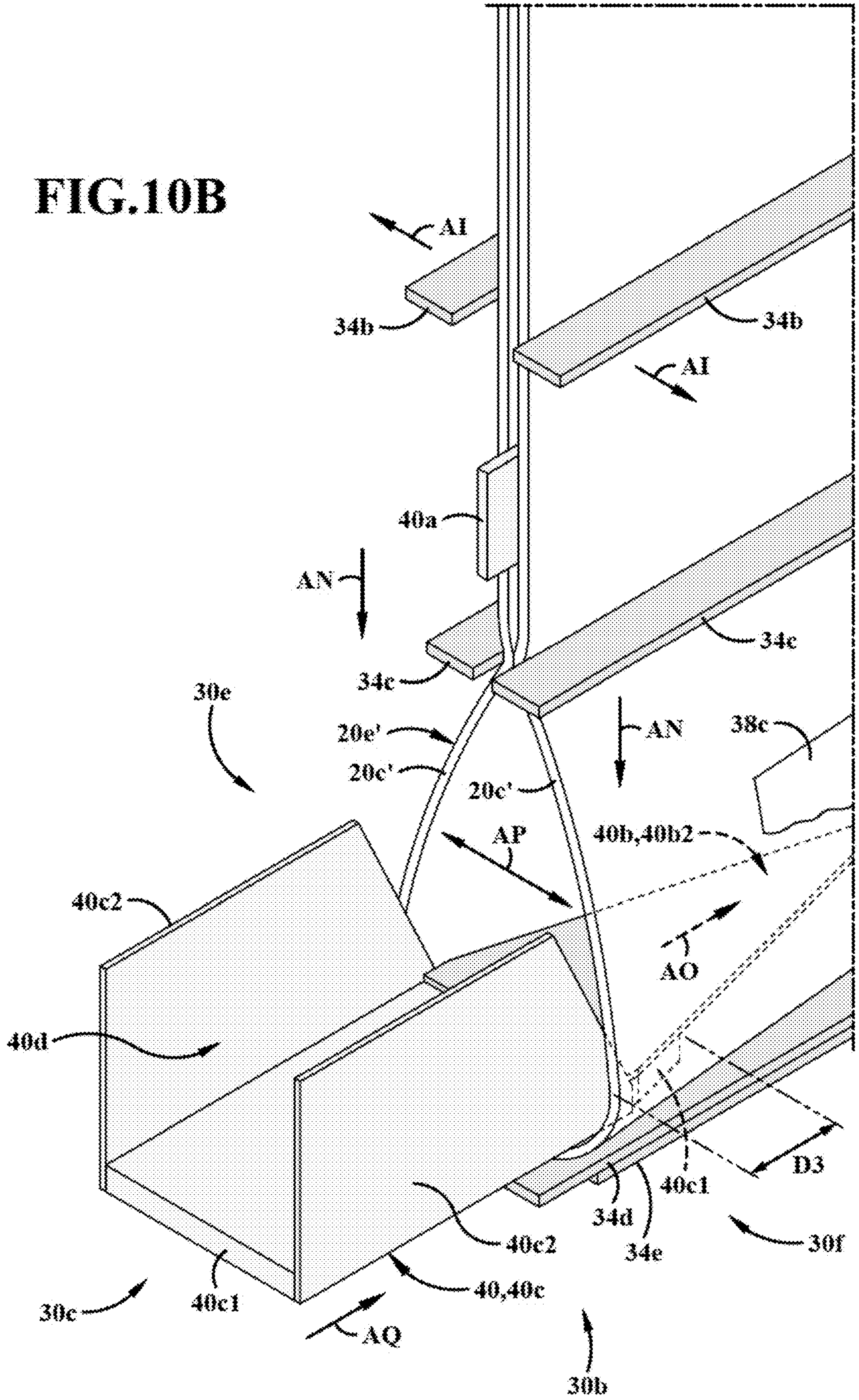
FIG. 10B is a diagrammatic, front, right side, isometric perspective view of the fill zone with items of the insertion assistance set and one of the grippers in motion according to aspects of the innovation.

As best seen in FIG. 10B, tab 40*b*1 of bag opener 40*b* transitions to a widening spreader 40*b*2. Spreader 40*b*2 is configured to transition from a selected width of tab 40*b*1 to a predetermined second width. Bag opener 40*b* operates to translate from a starting position and move from front 30*c* towards rear 30*d*, spreading web 20*c* of web set 20*e* apart, widening a pouch between web set 20*e* of web 20*c*. Bag opener 40*b* thus is contemplated to widen to a predetermined width, and in embodiments, may stop widening at a predetermined distance D3 from tip of tab 40*b*1.

Insertion assistance set 40 may also include loading chute 40*c*. Loading chute 40*c* may be located near the bottom of fill zone 30*h*, proximal to front 30*c*. It is to be appreciated that loading chute 40*c* may be located above or below bag opener 40*b*. Loading chute 40*c* may translate parallel to the X axis and is contemplated to not translate relative to the Z axis. As best seen in FIG. 10A through FIG. 10E, loading chute 40*c* may be configured to have a platform 40*c*1 and a pair of sides 40*c*2. It is contemplated that a leading edge of platform 40*c*1 (proximal to rear 30*d*) may be configured to have a narrowing sweep (or wedge configuration) and may substantially match the narrowing sweep of spreader 40*b*2 of bag opener 40*b* when spreader 40*b*2 is at its maximum intrusion depth between web set 20*e*. In embodiments, platform 40*c*1 may also have a width matching a maximum width of spreader 40*b*2. It is contemplated that in embodiments in which spreader 40*b*2 is above loading chute 40*c*, that spreader 40*b*2 would substantially fit between the pair of sides 40*c*2 of loading chute 40*c*. In embodiments, portions of sides 40*c*2 that are proximal to rear 30*d* would have their leading edges tapering back towards front 30*c* as the height of sides 40*c*2 progress towards top 30*a*. As best seen in FIG. 7B, translation of loading chute 40*c* is preferably from front 30*c* towards rear 30*d* such that at least a portion of the top of sides 40*c*2 are between web set 20*e* to a distance D4. This may provide the advantage of preventing an inadvertent snag of shipping item 12 with the edge of web set 20*e* during placement of shipping item 12 into the pouch of the formed web set 20*e*. An additional benefit is for safety of a user as action of placing shipping item 12 into the pouch does not present the edges of web set 20*e* to cut the user's hands.

It is to be appreciated that a maximum width of both spreader 40*b*2 and platform 40*c*1 may be determined by design choice for expected maximum width of shipping items that may be used with system 10. It is to be further appreciated that presence of tab 40*b*1 and/or spacer 40*a* provides for an efficient opening of the web set 20*e* to allow insertion of shipping item 12. In a preferred embodiment, application of label 38*c* occurs prior to translation of bag opener 40*b* or loading chute 40*c* from front 30*c* towards rear 30*d*. In this manner, the area of web set 20*e* to which label 38*c* will affix to is most nearly flat, enabling label application more efficiently.

In embodiments, tab 40*b*1 may additionally serve to create a 'drop-off' effect for the placement of shipping item 12 into the pouch of web set 20*e*. This has the advantage of providing a physical sense to a user that a shipping item has been properly secured within the pouch that will make up final package 14. Depths D1, D2, D3, and D4 may be predetermined and for example may be chosen to be as related to a sealing dimension as provided by front sealer 36*c*.

Embodiments of system 10 may also be configured with separator set 42. Separator set 42 is positioned in relation to fourth gripper 34*d* and top/bottom sealer 36*b*. Embodiments of separator set 42 may be a knife, configured to slice completely through web set 20*e* of web 20*c* after top/bottom sealer 36*b* has effected sealing of web set 20*e* of web 20*c*. Separator set 42 approximately bisects the seal area provided by top/bottom sealer 36*b*. Other embodiments that effect a separation approximately bisecting the seal area provided by top/bottom sealer 36*b* are contemplated, such as for example and without limitation, a laser. As will discussed herein below, it is contemplated that in embodiments, separator set 42 may additionally provide for a perforation pattern in the web set. Once a customer has the sealed final package 14 delivered to them, they may utilize the line(s) of perforations provided by separator set 42 to tear a section of the package away from the rest of the package so that the interior of the final package 14 may be accessed and the shipping item 12 may be removed therefrom.

After front sealer 36*c* has provided a front seal (as described herein), and top/bottom sealer 36*b* has provided a top seal to complete package $\mathbf{14}_M$ with shipping item 12 (M) enclosed, while simultaneously providing a bottom seal to a next package $\mathbf{14}_{M+1}$ (which in part provides for the ability to form a pouch into which a next shipping item $\mathbf{12}_{(M+1)}$ is to be placed), separator set 42 operates between the each of upper set of seal bars 36*b*1 and lower set of seal bars 36*b*2 to separate web set 20*e* of web 20*c*. In other words, operation of separator set 42 in conjunction with other elements of system 10 finishes package 14 in finish zone 30*j* as well as sets a bottom seal in web 20*c* for processing of a next shipping item $\mathbf{12}_{(M+1)}$. Placement of fourth gripper 34*d* in relation to the seal provided by upper set of seal bars 36*b*1 and placement of the separation provided by separator set 42 provides a stub of web 20*c* below fourth gripper 34*d* as top/bottom sealer 36*b* opens after separator set 42 has separated finished package 14 from web 20*c*. This stub may be clamped onto by fifth gripper 34*e* which while open translates from bottom 30*b* towards top 30*a* (in between the open top/bottom sealers 36*b*). Once clamped, and in conjunction with first gripper 34*a* and third gripper 34*c*, fifth gripper 34*e* can index a next web set 20*e* of web 20*c* from fill zone 30*h* to finish zone 30*j* (simultaneously indexing a newly stretched or expanded web set 20*e* from form zone 30*g* to fill zone 30*h*).

In embodiments, system 10 may also feature items such as scan device 50, controller 60 and quality/transport set 70 as discussed herein. System 10 may further include a scan device 50 which would scan shipping item 12 (or any of shipping items $\mathbf{12}_M$ to $\mathbf{12}_{M+N}$). Scan device 50 detects and obtains data/information about the scanned shipping item. Data/information may include one or more of measurements, weight, and identification of shipping item 12. Measurements may be one or more of a length, width, and height of shipping item 12. It is to be appreciated that measurements and weight may provide most any pertinent information about the shipping item 12 which will enable system 10 to form customized packaging which will most closely conform to the specific shape and size of shipping item 12 to be correctly and adequately packaged by system 10. Identification data/information may include item identification, shipping identification, return identification and the like. One exemplary scan device 50 for aspects of the innovation of system 10 is a COGNEX® In-sight Laser Profiler. (COGNEX® is a registered trademark of COGNEX CORPORATION of Natick Massachusetts). The COGNEX® Profiler is capable of taking around 20 measurements per minute.

Controller 60 may be most any computing device designed to include a processor, a computer-readable medium, and a communication interface. A processor within controller 60 may include any suitable processing logic which interprets and executes instructions, such as, for example, one or more processors, microprocessors, or the like. The computer-readable medium may be any suitable physical and/or logical memory device, such as, for example, a dynamic storage device, a static storage device, or the like. The communication interface of controller 60 may be any suitable communication interface allowing communication between controller 60, other components of the system 10, and in embodiments remote computing resources such as a cloud computing environment, a fog computing environment, or the like via a network (not shown). The network may be any suitable network, such as, for example, a wired network (e.g., a bus network) and/or a wireless network (e.g., the Internet). Programming or software for controlling operation of system 10 and controlling the method of forming a final package is uploaded to the one or more processors of controller 60 or is installed on the remote computing resources to which controller 60 is communicatively connected.

It is to be appreciated that most other components of system 10 are operatively engaged with controller 60 and may be controlled thereby. This may include scan device 50. This may also include rollers, roll support, roll alignment, roll switchover (in suitable embodiments) and information processing of roll material of roll section 20. This also includes tensioning, gripper set 34, sealing set 36, labeler 38, insertion assistance set 40 and separator set 42 of package section 30, as well as indexing throughout. In embodiments, this may include quality/transport set 70 as discussed herein. It is to be appreciated that controller 60 may control the described components and methods based at least in part on predetermined design considerations, shipping item data, and/or roll material data. In embodiments, movement of set of grippers 34 in form zone 30*g* are calculated based in part on scan data or operation mode to provide a calculated stretch to web set 20*e* that is indexed into form zone 30*g*. It is to be appreciated that movement of set of grippers 34 in form zone 30*g* may also or alternatively be calculate by roll material properties as may be obtained by a scan of roll material (or alternatively, predetermined and input into controller by most any input means, such as for example and without limitation, by keyboard, by scan, by registration, and/or by electronic exchange with a network).

It is contemplated that controller 60 controls mode change as discussed herein below, including transitory or prescribed timeframes and other control parameters. Controller 60 may also control various system indicators such as end-of-roll conditions in roll section 20.

In other words, if shipping item 12 is detected to be relatively small then a relatively small length of web 20*c* will be required to be formed in form zone 30*g* so as to be indexed into fill zone 30*h* so that fill zone 30*h* is maintained with web set 20*e* of web 20*c* that is in a stretched condition throughout fill zone 30*h*. If shipping item 12 is detected to be relatively large, then a relatively long length of web 20*c* will be required to be processed in form zone 30*g* as described herein so as to be indexed into fill zone 30*h* to maintain the condition as described. In other embodiments, stretching or expanding may not be provided and components may be omitted or may be programmed to operate reflecting a specific mode.

It is to be appreciated that another ancillary item for system 10 may be quality/transport set 70. In embodiments, quality/transport set 70 may provide one or more scanners or quality sensors 70*a* and may be utilized to check the sealing areas of web set 20*e* as provided by back sealer 36*a*, top/bottom sealer 36*b* and front sealer 36*c*. Checking may also include information and/or calculations as obtained by controller 60 in view of known shipping package endurance, seam strength, or crush resistance metrics. These may be considered to be a portion of predetermined quality parameters 70*b*. It is to be appreciated that system 10 (as herein described) provides built-in sealing quality aspects such as having a prior bottom seal (by top/bottom sealer 36*b*) and a back seal provided by back sealer 36*a* prior to insertion of shipping item 12, a gripper of the set of grippers 34 clamped closed during insertion of shipping item 12 (to clear for a subsequent upper seal by top/bottom sealer 36*b*, and a 'drop-in' feature that provides indication that a subsequent front seal by front sealer 36*c* will be effective and not have interference with shipping item 12. In other words, system 10 operates such that shipping item 12 is not obstructing or otherwise interfering with the sealing areas of package 14. Quality/transport set 70 may additionally or alternatively include transport 70*c* (as best seen in FIG. 12G). For simplicity's sake, transport along transport 70*c* is portrayed in one direction, but it is to be appreciated that other directions (based on disclosures herein) are contemplated. For example, dedicated discharge conveyors to move the packaged articles to a shipping station (not shown) of the packaging and shipping facility are contemplated.

Further contemplated are embodiments more directly tuned to a mode C) including use of packaging material that has different stretch or expansion characteristics as discussed herein, and to which retrofit kits may be made available to provide from operating at a mode C) to operate in a mode A), mode B) or both.

Figure 5:
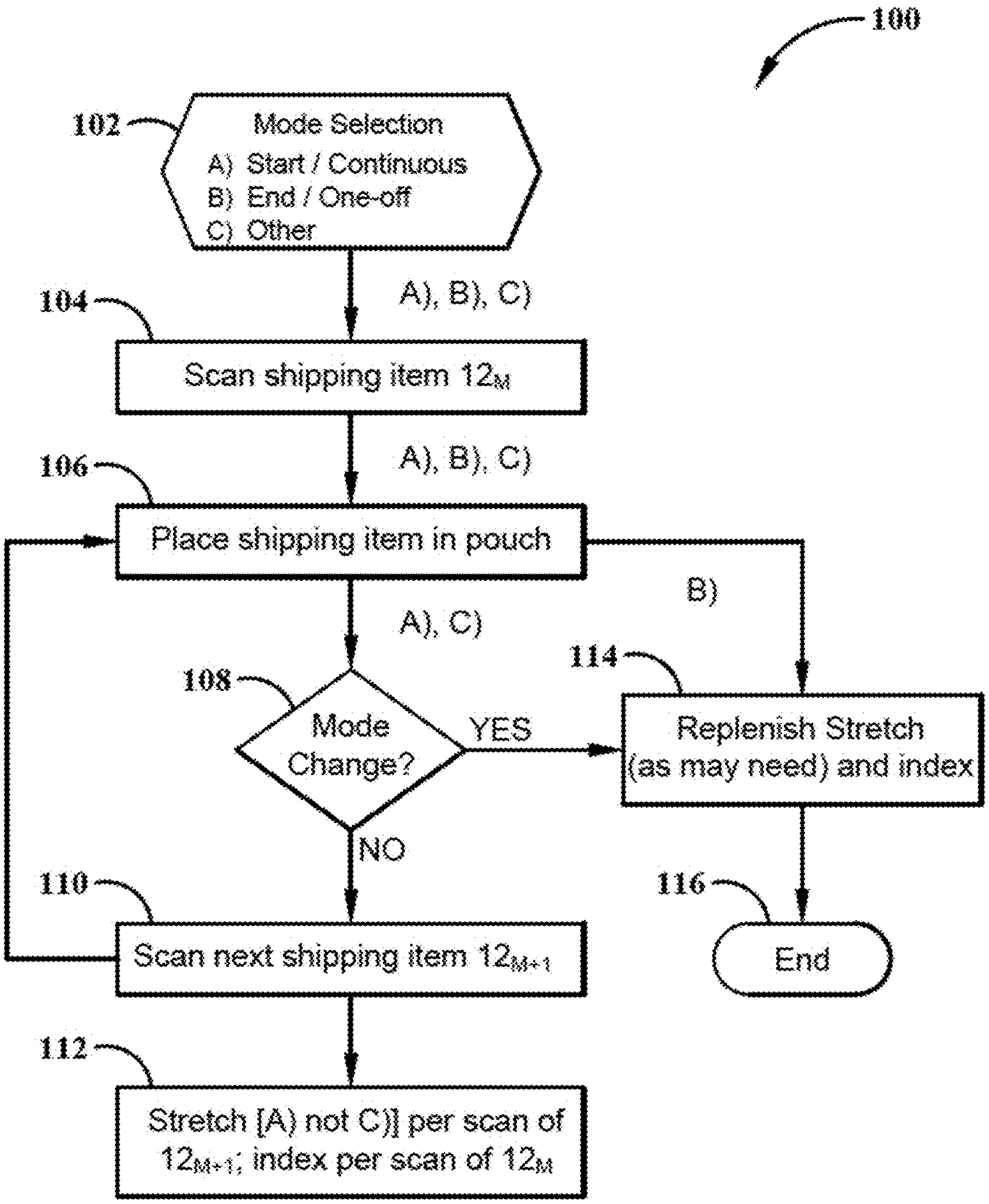
FIG. 5 is a flowchart method of a user's perspective of a use of the system according to aspects of the innovation.

Turning now to FIG. 5, method 100 is shown in flowchart form. FIG. 5 is a flowchart method of a user's perspective of a use of the system according to aspects of the innovation. Method 100 is a process for using system 10 from a user's perspective and it is to be appreciated that steps of method 100 will be reflected in a discussion of methods 200A and 200B (both from a machine perspective) as will be discussed herein below. For simplicity a 'user' is used in the description, but it is contemplated that a robot or other automated mechanism can be the user, and it is to be appreciated that such would act as a user as is described. It is to be further appreciated that method 100 is informed by system 10 and the disclosure herein.

Method 100 starts with mode selection at 102. Mode selection 102 reflects different aspects of use of system 10 that are expected to occur in a manufacturing environment, including modes A) Start/Continuous and B) End/One-off. Other modes as may be known in the art may be applicable and are contemplated to be covered by the teachings of this disclosure. For example, a mode of running a packaging system may be based at least in part on the type of item to be scanned, and a different type of packaging material. In one embodiment, flexibility to run a set of items that may not require packaging to be cushioned, and still avail oneself of the speed and coordination of other aspects of the system is contemplated. It is to be appreciated that mode A) Start/Continuous is expected to be a primary mode, as once a machine is started, most processing will be under a continuous process environment, while mode B) End/One-off may be expected on a more infrequent basis, such as for example, an end of processing run with no "next-scan" item to prompt certain steps as disclosed herein. Other situations are also contemplated, for example and without limitation, situations in which a "next-item" is not expected to be forthcoming in a timely matter of finishing packaging of a prior shipping item, or a "roll-out condition" in which rolls of packaging material (for example, rolls 20*b*) may have been depleted and need to be replaced for continued operation. Other circumstances may arise in which a one-off packaging mode may be desired. It is to be appreciated that a start within a A) Start/Continuous mode may have a few alternative actions, as will be evident from the context of the discussion (for example, starting up after a replenishment of rolls of packaging material may include operations from a machine perspective that do not effect a user perspective). C) Other is listed for other types of use of system 10 in various embodiments, including, for example, a mode in which data of the pre-fabricated packaging material does not stretch or expand, or is not contemplated to use that aspect.

Upon mode selection at 102, method 100 proceeds to scan 104: a user scanning a shipping item, for example, shipping 12. As noted herein, shipping item 12 may be a singular item or may be a batched set and contain a plurality of items. It is contemplated that a scan at 104 (either of a singular item or a plurality of items batched together) provides the data that system 10 will use in the rest of the processing under any of the selected modes (as will be discussed herein in relation to operation of system 10 from a machine perspective, a determined amount of web is treated and indexed by system 10 after the user has scanned the shipping item). It is to be appreciated that with C) Other, the determined amount of web to be treated may effectively be no web (or treatment thereof) at all, for example, in the case in which no cushioning is required and the roll data may verify that rolls of simple paper (or the like as described herein) have been placed on support rolls 20*a*.

After scanning at 104, the user is presented with a pouch in a web set 20*e* of web 20*c* and places the shipping item into the pouch at 106. In some embodiments, a loading chute 40*c* presents to the user a path to place the shipping item into the pouch at step 106. In some embodiments, the presented pouch will contain a "drop-off" envelope that provides the user with an affirmative indicator that the item has been properly placed into the pouch. With or without a "drop-off" envelope, as will also be described herein from the machine perspective, the pouch at this point will have a back and bottom seal provided and will be clamped at an upper portion thereby providing an upper restraint. It is to be appreciated that the pouch as presented to the user allows the user confidence that placing the shipping item securely into the pouch will result in a package that is ready to send on its way without defects such as shipping item 12 extending beyond an unsealed edge and thereby creating an improper seal.

In real world applications, adaptability can provide significant advantages, and it with this in mind that several embodiments contemplate an availability of engaging a mode change 108. For example, after a shipping item is placed in a pouch, there may be a number of reasons or real-life situations in which a "next scan" may not be timely completed, and that options including mode B) Stop/One-off may be of value. Conversely, situations may arise that have value in switching from a mode of B) Stop/One-off to a mode of A) Start/Continuous is valuable. It is contemplated that this latter change may be of a nature of being a transitory option (in that, if no choice is made within a prescribed timeframe, or another action such as an additional scan of a next shipping item is made, mode may automatically be set to A) Start/Continuous. It is further contemplated that the transitory period may be adjusted and may range from a time of a few milliseconds to a few seconds as well as that in the case of a system indicator (such as for example, an end-of-roll indication), a mode change 108 may be automatically initiated. It is still further contemplated that in most instances, a mode change at 108 will follow a "NO" path from a user's perspective and the process will follow at 110: scan a next shipping item. The speed and simplicity of method 100 from a user's perspective can be seen by the user scanning an item, placing the item in the pouch, and repeating. Furthermore, a mode of switching to a different type of packaging material may be contemplated for a duration or a set of items to be shipped that may not require packaging to be cushioned, but the speed and coordination of other aspects of the system may still be desired.

For a path of a "YES" to a mode change, as may occur for a variety of reasons, most all associated with discontinuing a continuous mode of operations, method 100 follows the same path to step 114 that would occur after step 106 were the mode to have been B) Stop/One-off. With step 114, no next item is scanned, and system 10 indexes down a designated minimum index for a minimum (or least waste) processing of the current shipping item that had been placed in the pouch at 106, indexing the pouch with shipping item 12 into a finish zone 30*j* as disclosed herein and proceeds to end at 114. It is to be appreciated that for an option mode such as C) in which no stretch or expansion of packaging material is contemplated, the steps of stretching (and related componentry) may be omitted or not used in the steps of 112 and 114.

Figure 6:
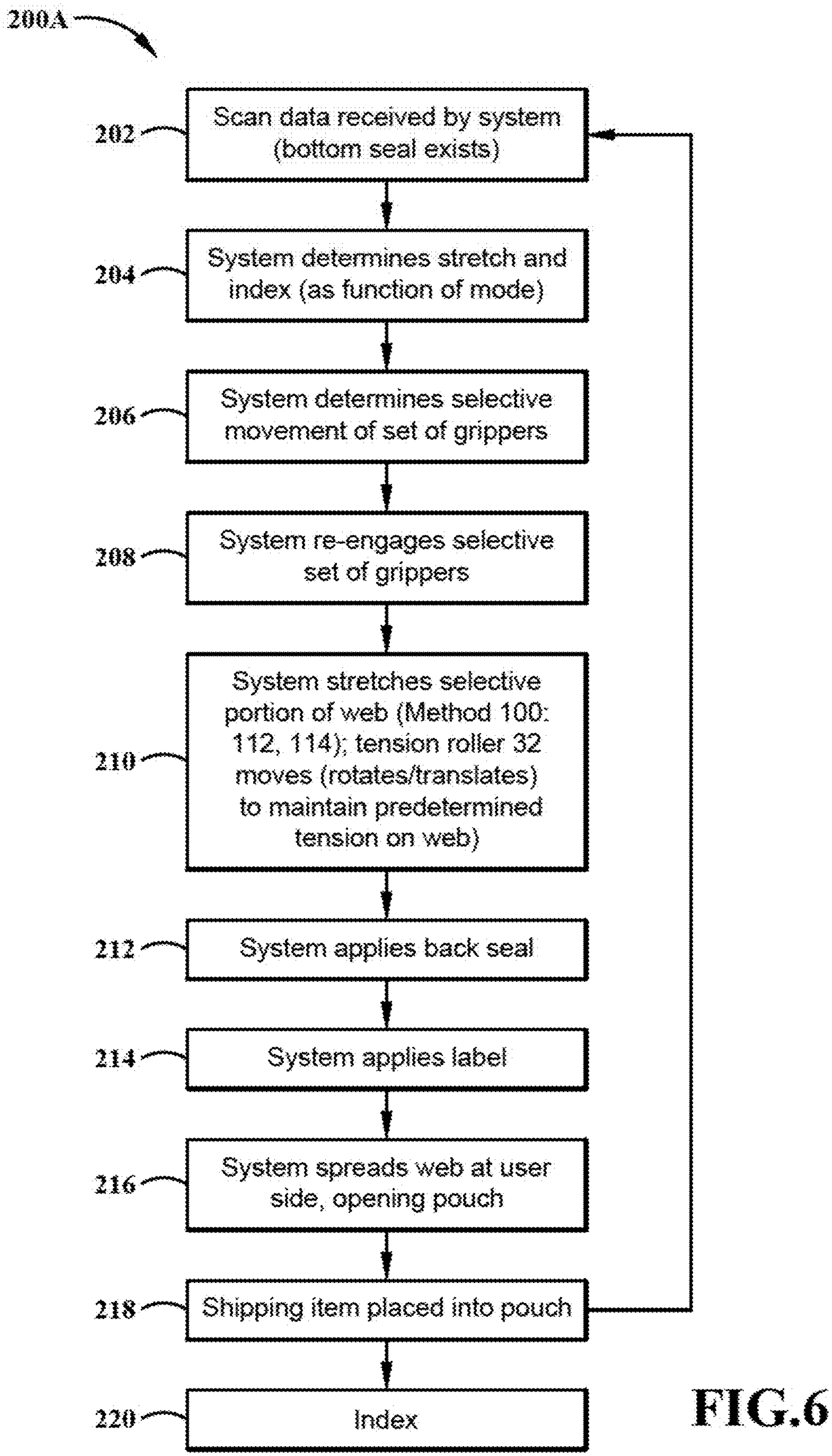
FIG. 6 is a flowchart method of a system perspective of the use of the system from 'start' to a shipping item being placed in a web set according to aspects of the innovation.

FIG. 6 is a flowchart method 200A of a system perspective of the use of the system from 'start' to a shipping item being placed in a web set according to aspects of the innovation. In embodiments, FIG. 6 provides method 200A in a flowchart orientation with perspective of operating from a system standpoint (for example, system 10), that focuses on form zone 30*g* and fill zone 30*h* as described herein.

In conjunction with step 104 (and step 110) of FIG. 5, step 202 of method 200A as shown in FIG. 6 reflects receiving scan data of a shipping item 12 that has been scanned. As has been noted, shipping item 12 may be a singular item in a series of shipping items $\mathbf{12}_M$, $\mathbf{12}_{M+1}$, . . . $\mathbf{12}_{M+N}$, where M and N are integers. For ease of explanation, shipping item 12 may be used without subscripts and the meaning will be clear from the provided context.

It is to be appreciated that in modes A) Start/Continuous and B) End/One-Off, prior processing may have provided a bottom seal in web 20*c* at a portion of package section 30 of system 10, as well as having web set 20*e* being stretched throughout fill zone 30*h*. It is contemplated that initial set-up of the process, which may include feed of web 20*c* from rolls 20*b* through mating rollers 20*d* and plurality of feed rollers 20*f* will include feeding over tension roller 32 and provide that web 20*c* has been processed to the point that a top/bottom sealer 36*b* can provide a bottom seal with a tab of web 20*c* below the bottom seal. This processing is not shown as a part of method 200A and may be presumed to be a starting condition for system 10 under normal operating conditions.

At step 204, stretch or index or both may be determined if a change in mode signal (for example, method 200A step 108) is received in order to accommodate a change in series of items $\mathbf{12}_M$ through $\mathbf{12}_{M+N}$. Method 200A determines a set of designated stretch parameters based at least in part on data from scan at step 202. It is to be appreciated that stretch parameters may also be determined based at least in part with a scan of packaging materials loaded as rolls 20*b*. It is to be further appreciated that stretch parameters may also be determined at least in part by mode selection (for example, if mode B) End/One-off is active, a stretch parameter after the making of a pouch may automatically provide for a next minimum index, resulting in minimal waste of packaging material and maintaining a stretched web set 20*e* throughout fill zone 30*h*.

Method 200A at step 206 determines a selective movement of a set of grippers. Specific embodiments are discussed herein below. In general, step 206 is to prime for forming extensions in web set 20*e* that provide cushion for shipping item 12. The selective movements may be referenced as an index and may include a prior item being indexed from fill zone 30*h* to finish zone 30*j*, which is described in method 200B herein below. At step 208 of method 200A, re-engagement of a selective set of grippers in preparation for step 210 of method 200A occurs. It is to be appreciated that this re-engagement for at least first gripper 34*a* is at a determined distance to engage at a specific length of web set 20*e* of web 20*c* in accord with data from scan at step 202. At step 210 of method 200A, the system 10, in form zone 30*g*, stretches a selective portion of web set 20*e* of web 20*c* with movement of first gripper 34*a* in a direction opposite of the direction of indexing of web 20*c* in a portion of package section 30 of system 10. In other words, first gripper 34*a* is a closed or clamped mode traverse from 30*f* towards 30*e* in the opposite direction of the path of web 20*c*. It is to be appreciated that for an option mode such as C) in which no stretch is contemplated, the steps of stretching (and related componentry) may be omitted or not used in the steps of 206 through 210. It is to be appreciated that tension roller 32 may pivot or translate or both to maintain a selected tension in web 20*c*.

At step 212 of method 200A, sealing of the edge of web set 20*e* proximal to rear 30*d* is completed, for example by way of back sealer 36*a*. The seal creating a join between the two webs of web set 20*e* is at the edge proximal to rear 30*d*. It is contemplated that the join may be by heat, chemical, or other processes as may be known in the art and may provide a seam having a predetermined strength of bond. At step 214 of method 200A, application of a label (for example, label 38*c*) occurs on either left side 30*e* or right side 30*f* of the stretched web set 20*e*. It is to be appreciated that web set 20*e* is largely in tension between selective grippers, and the application of the label at this point has the benefit of the web set 20*e* being generally planar. It is to be appreciated that the application of the label is in conjunction with data obtained from the scan at step 202, thereby confirming that shipping item 12 and any shipping data printed on the label as may be desired will properly match. It is also to be appreciated that, as is known in the art, application of the label 38*c* by labeler 38 provides that the label 38*c* is adhered 38*d* with minimal force and does not disturb the stretched web set 20*e*.

At step 216, a second portion of insertion assistance set 40 may operate. It is to be appreciated that in certain embodiments, a first portion of insertion assistance set 40 may be in place during steps 204 through 214 as will be discussed herein below. First portion may include spacer 40*a* and tab 40*b*1 of separator 40*b*, and that it is contemplated that at rest, these items will intrude into web set 20*e* on the edge proximal to front 30*c* of package section 30. Second portion may include bag opener 40*b* (including tab 40*b*1 and spreader 40*b*2) as well as loading chute 40*c* (including platform 40*c*1 and sides 40*c*2) as will be discussed herein below.

At step 218, shipping item 12 is placed in the pouch of web set 20*e* in fill zone 30*h*. It is to be appreciated that at this point in mode A) Start and Continuous a user (or automatic loader) may obtain a next shipping item (for example $\mathbf{12}_{M+1)}$ and start method 200A again at step 202. At step 220 of method 200A, indexing of the portion of stretched web set 20*e* of 20*c* occurs, and the stretched web set 20*e* moves from form zone 30*g* down into fill zone 30*h*, and from fill zone 30*h* into finish zone 30*j*. This may be achieved by way of selective movement of grippers (as discussed herein). In mode B) Stop/One-Off, a user (or automatic loader) would need not perform another step while for the system perspective, method 200B (herein below) may be performed; step 220 proceeding directly from step 218. It is to be appreciated that for an option mode such as C) in which no stretch or expansion is contemplated, the reference to stretched web set 20*e* may be considered to be a non-stretched web set, and that steps of stretching (and related componentry) may be omitted or not used in the steps of 112 and 114.

At this point, clarity may be provided by referencing methods 100 and 200A in relation to figures that have hardware embodiments. Hardware embodiments are presented in FIG. 4 highlighting zones of package section 30, form zone 30*g*, fill zone 30*h*, and finish zone 30*j* as noted herein above; FIG. 7A through FIG. 7F that are diagrammatic front elevation views and regard forming of an extended condition for web set 20*e* of web 20*c* with focus on form zone 30*g*; FIG. 9A through FIG. 9E that are diagrammatic front elevation views and regard partial sealing and label application for web set 20*e* of web 20*c* with focus on fill zone 30*h*; and FIG. 10A through FIG. 10E that are diagrammatic, front, right side, isometric perspective views and regard application of insertion assistance set 40 for web set 20*e* of web 20*c* with focus on fill zone 30*h*. The front elevation views of FIG. 4, FIG. 7A through FIG. 7F, and FIG. 9A through FIG. 7E may be understood to be a view of system 10 from a perspective of a user or automated loading mechanism (viewing package section 30 from front 30*c* towards rear 30*d*). FIG. 10A through FIG. 10E are front right isometric views providing a similar vantage perspective (front 30*c* towards rear 30*d* as discussed herein above). It is to be appreciated that in the multiple modes of operation, the disclosure may provide for components having different actions at different points in time, and for an ease of explanation, the immediate embodiment being presented is presented in the mode of A) Start/Continuous. It is further to be appreciated that in reference to processes occurring in package section 30, discussion herein focuses on processing that occurs after material (for example, web 20*c*) exits the roll section 20 of system 10 and enters the package section 30 of system 10, specifically entering form zone 30*g* over tension roller 32 as best seen in FIG. 4.

In reference to a user perspective, specifically step mode selection 102 of method 100, a shipping item (for example, shipping item 12) is scanned. In reference to step 101 of method 200A, scan data is received by system 10. It is to be appreciated that the scan provides (at least in part) data so that movement of components in package section 30 are controlled. As noted herein, prior scan or other entry of package material data in addition to a chosen mode may each be used by controller 60 in part to control movement of components as discussed herein. From a user's perspective, the following discussion follows what happens after the user scans shipping item $\mathbf{12}_M$ to the user being presented with an open pouch (through loading chute 40*c*).

Figure 7A:
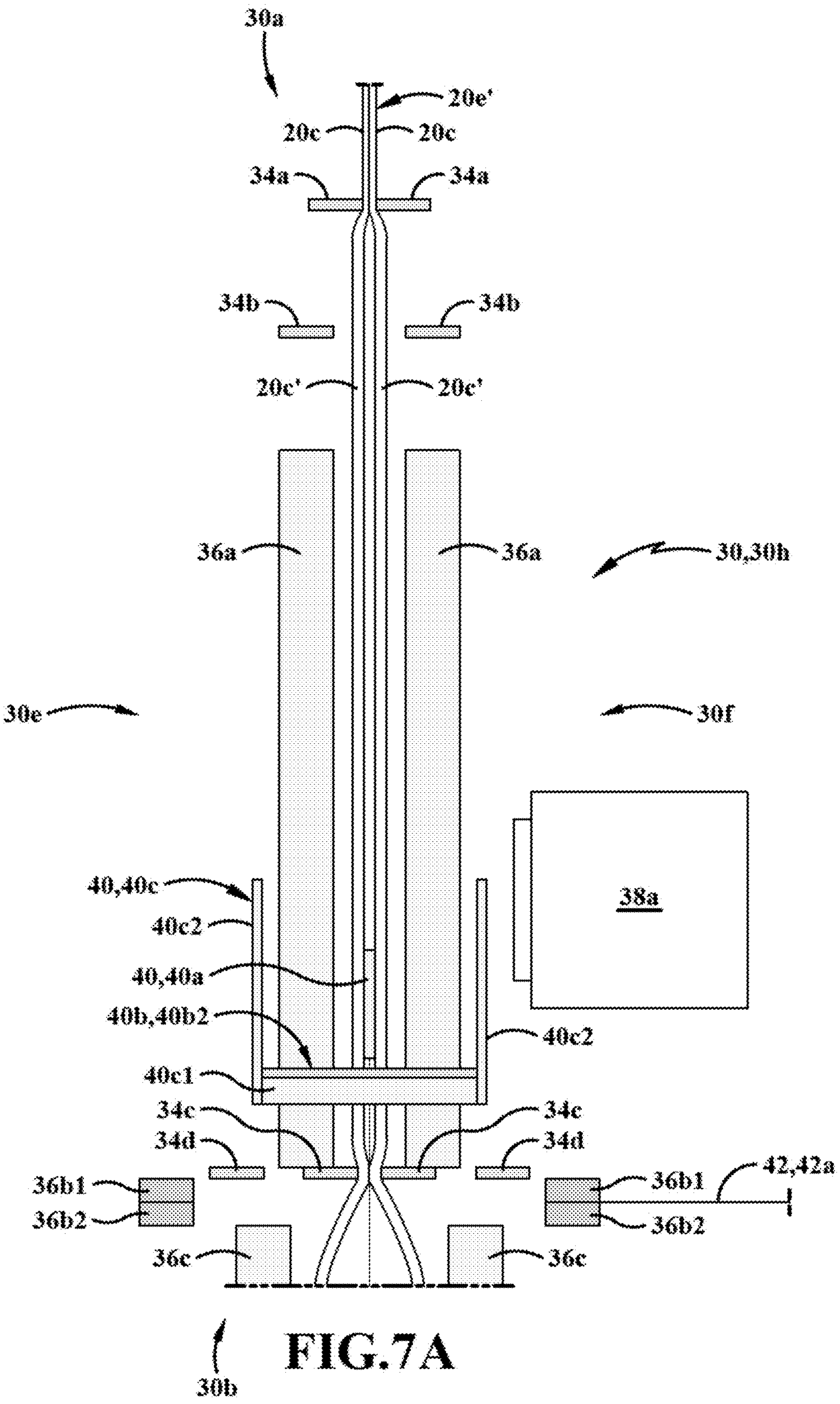
FIG. 7A is a diagrammatic front elevation view of the form zone according to aspects of the innovation.
Figure 7B:
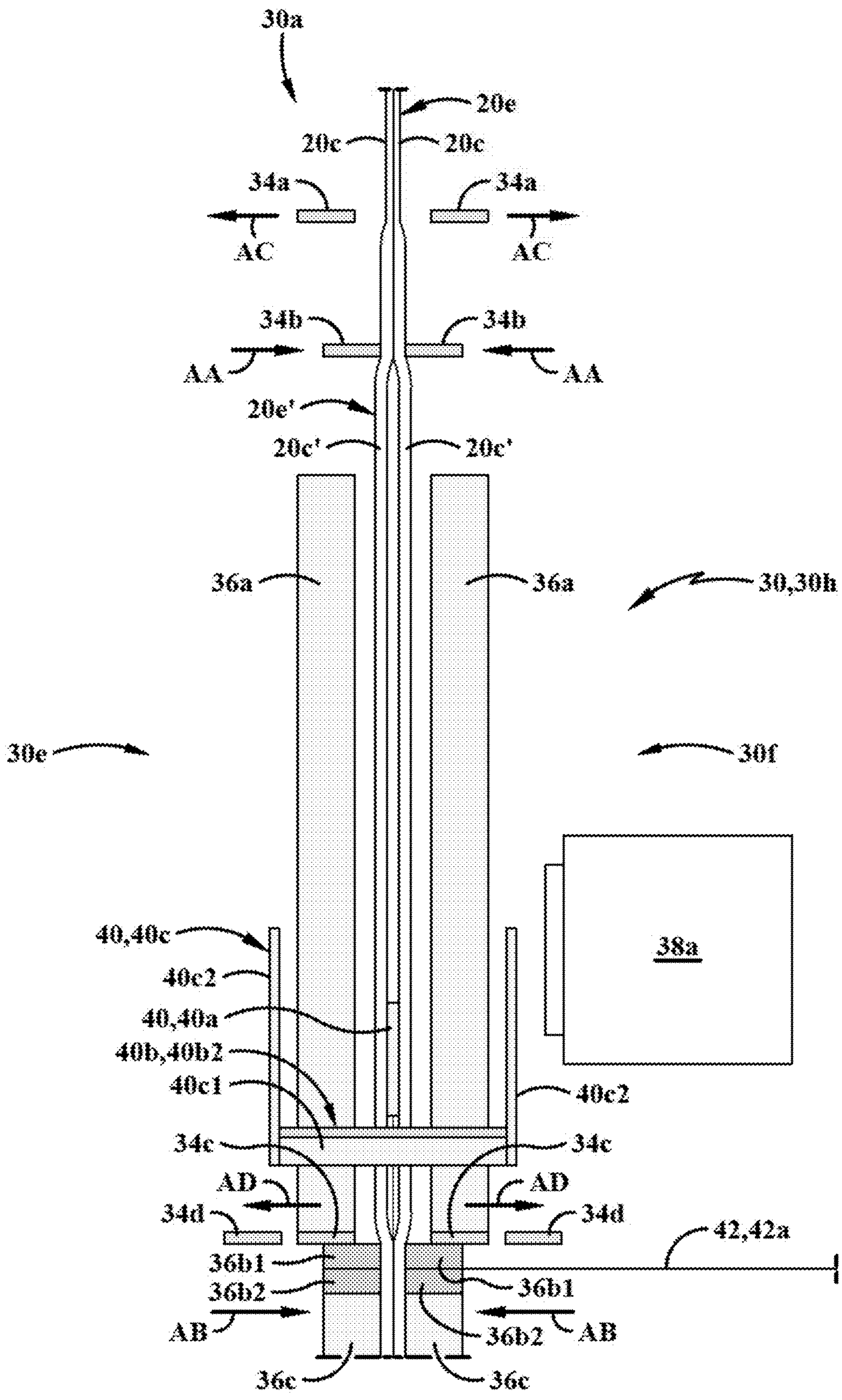
FIG. 7B is a diagrammatic front elevation view of the form zone with stationary grippers clamped in preparation for moving grippers to move according to aspects of the innovation.

FIG. 7A is a diagrammatic front elevation view of the form zone according to aspects of the innovation and shows a typical 'start' position prior to a scan. First gripper 34*a* is closed, second gripper 34*b* is open, spacer 40*a* intrudes between web set 20*e*, back sealer 36*a* is open, third gripper 34*c* is closed, fourth gripper 34*d* is open, top/bottom sealer 36*b*, front sealer 36*c* and separator set 42 are shown but are not of concern at this point. Method 200A step 204 determines index parameters. Method 200A step 206 determines selective movement of set of grippers 34.

Figure 7C:
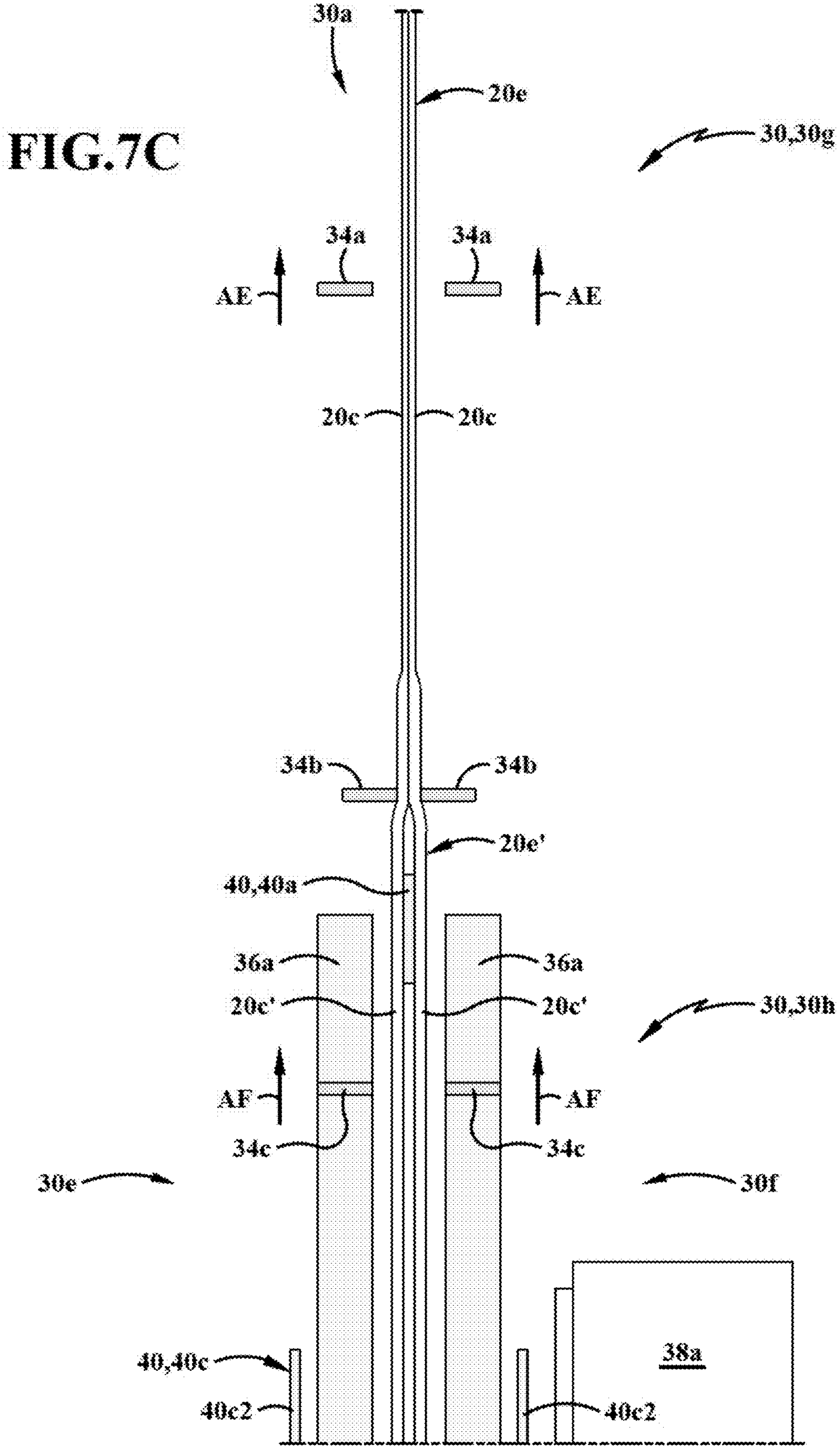
FIG. 7C is a diagrammatic front elevation view of the form zone with moving grippers moving according to aspects of the innovation.
Figure 7D:
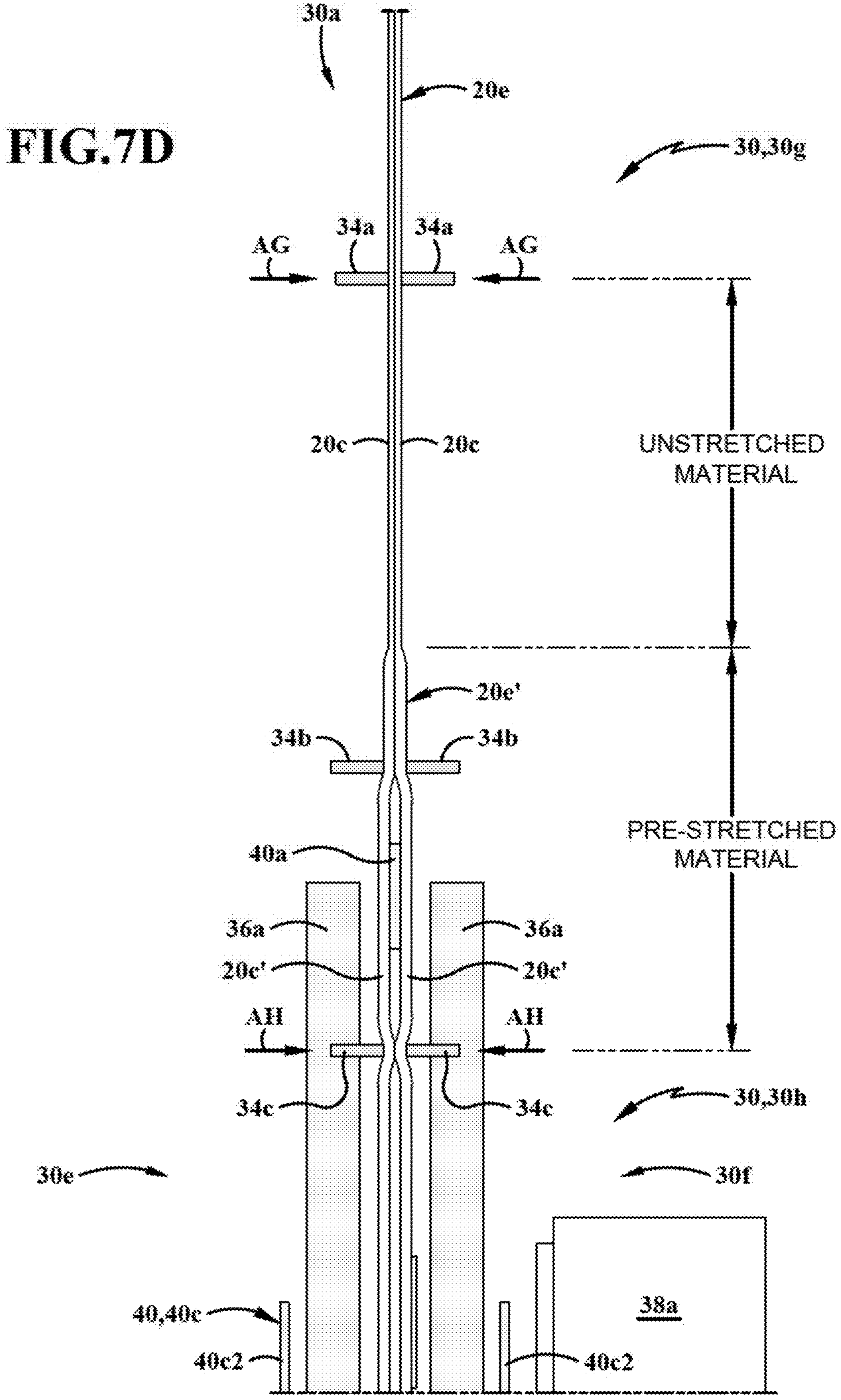
FIG. 7D is a diagrammatic front elevation view of the form zone with unstretched and stretched states according to aspects of the innovation.
Figure 7E:
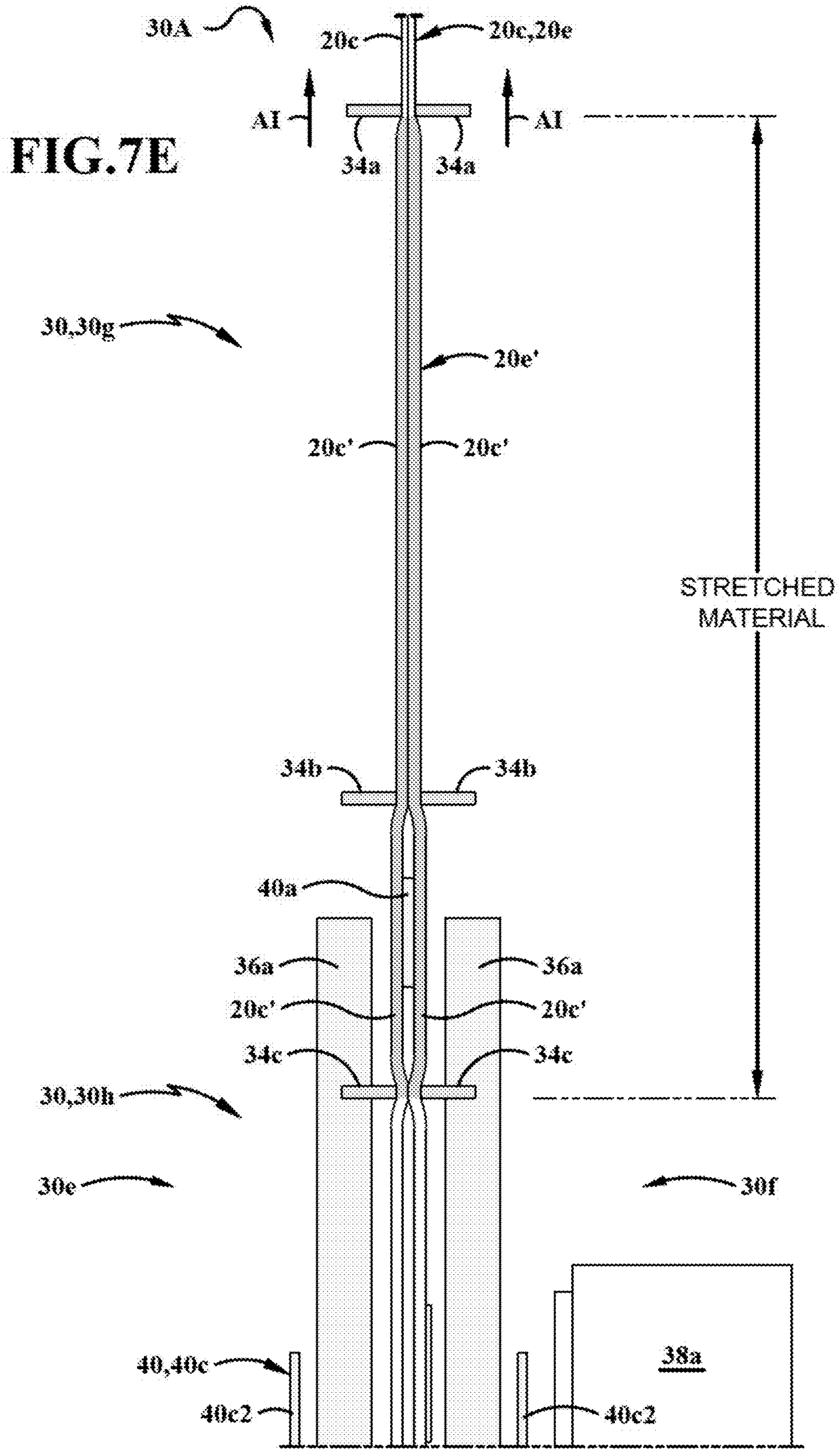
FIG. 7E is a diagrammatic front elevation view of the form zone with the completed new stretched state according to aspects of the innovation.

FIG. 7B is a diagrammatic front elevation view of the form zone with stationary grippers clamped in preparation for moving grippers to move according to aspects of the innovation and shows second gripper 34*b* closing (arrow AA). This provides for maintaining tension on web 20*c*. Fourth gripper 34*d* also closes (arrow AB). Then, first gripper 34*a* and third gripper 34*c* open (arrows AC and AD respectively). This is in preparation for each of these first and third grippers (34*a*, 34*c*) to translate towards top 30*a*, as shown in FIG. 7C (arrows AE and AF respectively) which is a diagrammatic front elevation view of the form zone with moving grippers moving according to aspects of the innovation. Step 208 of method 200A is reflected in FIG. 7D, a diagrammatic front elevation view of the form zone with unstretched and stretched states according to aspects of the innovation, with first gripper 34*a* and third gripper 34*c* have reached their computed pre-stretch locations (based at least in part on scan data and based at least in part on roll data) and have re-engaged by closing (arrows AG and AH). In form zone 30*g*, the scan data includes at least a designated height of package 14 for shipping item 12. It is to be appreciated that the width of a package for shipping item 12 is preselected and in most embodiments a package width may be pre-determined to be a suitable width of the web 20*c*. FIG. 7E is a diagrammatic front elevation view of the form zone with the completed new stretched state according to aspects of the innovation and reflects step 210 of method 200*a*. With third gripper 34*c* closed and stationary, first gripper 34*a* translates towards top 30*a* of package section 30 while stretching web set 20*e* (arrow Al). It is to be appreciated that tension on web 20*c* above first gripper 34*a* is maintained by rotation, translation or a combination thereof of tension roller 32 (not shown). It is contemplated that calculation of an amount of pulling force applied by first gripper 34*a* is at least by the data of the scanned shipping item 12, and in some embodiments, may also be at least by the data of rolls 20*b* of system 10, that is, prefabricated packaging material data indicative of expandable, stretchable or non-expandable material properties.

In other words, and in selected embodiments, a calculation of unrolled and unstretched web set 20*e* of web 20*c* is made and grippers engage at this length prior to closing and then stretching to a second calculated dimension (towards top 30*a* of package section 30) to stretch web set 20*e* of web 20*c*. While one of at least second gripper 34*b* and third gripper 34*c* are in a closed or clamped position, first gripper 34*a* is moved to a calculated unstretched height and closed (clamped). First gripper 34*a* then translates towards top 30*a* of package section 30 (against the general path of web 20*c* as it moves through at least a portion of form zone 30*g* of package section 30 of system 10). Once this stretch occurs, second gripper 34*b* may open. It is to be appreciated that some height of web 20*c* above second gripper 34*b* may already be stretched and thus all further stretching may be attributable to the unstretched portion of web set 20*e* of web 20*c* below the closed first gripper 34*a* and above the at least closed second gripper 34*b* and closed third gripper 34*c*. As this material has been stretched, it will not stretch appreciably further, and the system takes this into consideration in computing the stretch parameters. It is also to be appreciated that spacer 40*a* maintains a separation within web set 20*e* in web 20*c* as disclosed herein.

It is to be appreciated that the scan for shipping item 12 in part drives the control of how much material is grabbed and how much is stretched, and the calculated portion for highly increased efficient use of packaging material is metered out per scan and that all web set 20*e* indexing out of form zone 30*g* has been stretched or expanded. It is to be further appreciated that calculations by controller 60 take into account a selected mode. For example, in a mode B), with no next scan (in an expected timeframe), the index of shipping item $\mathbf{12}_M$ from fill zone 30*h* to finish zone 30*j* indicates a minimum stretch movement in form zone 30*g* such that the forming (expanding) of web set 20*e* in form zone 30*g* provides treated material such that the index maintains a fill zone 30*h* having fully treated (stretched) web set 20*e*. As noted herein, it is contemplated that for certain uses that may be included in mode C), no amount of webs 20*c*" or web set 20*e*" need be stretched or expanded, and the elements described herein may be omitted or not used in selected embodiments.

Figure 7F:
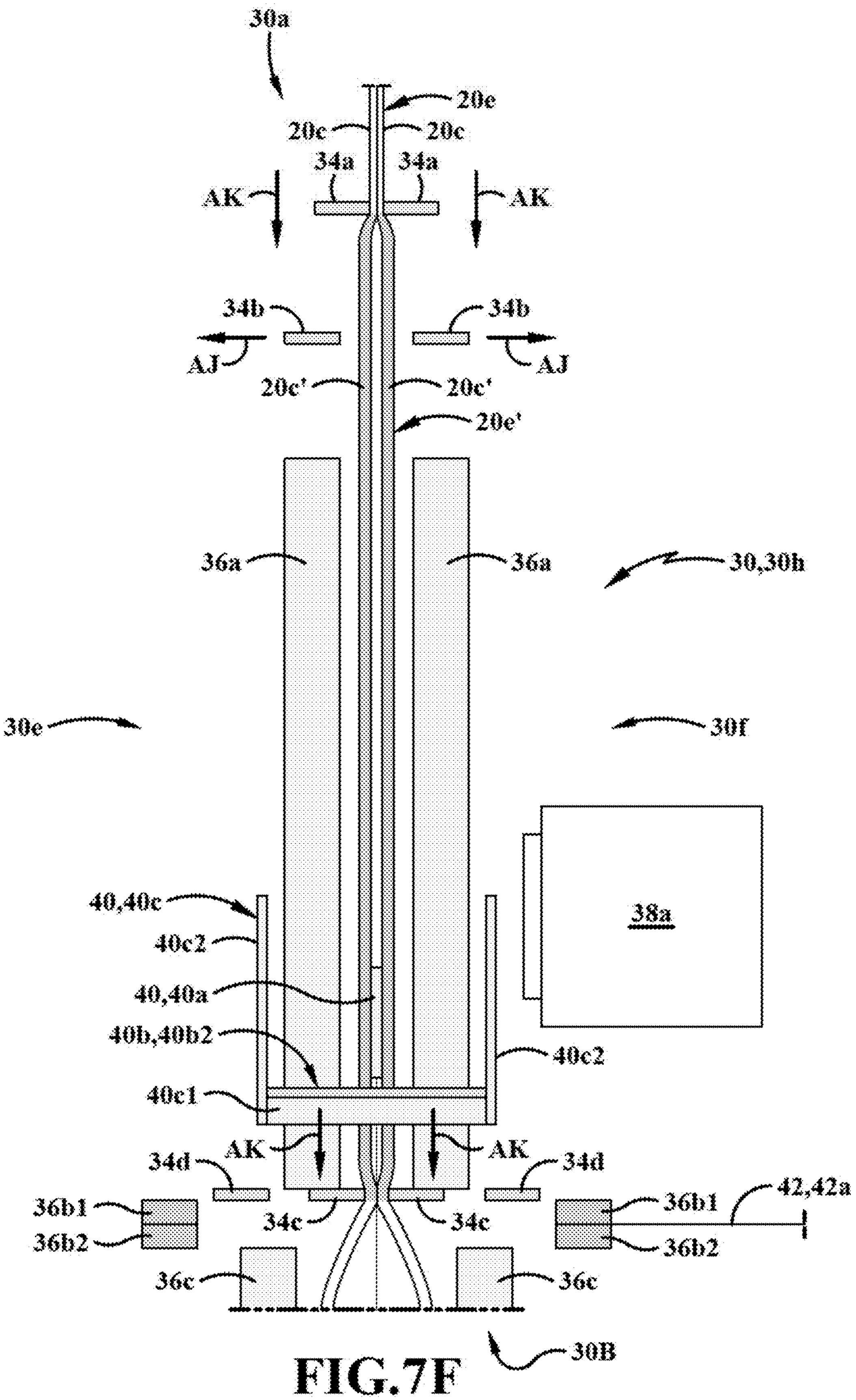
FIG. 7F is a diagrammatic front elevation view of the form zone with an index of stretched material from the form zone to the fill zone according to aspects of the innovation.

FIG. 7F is a diagrammatic front elevation view of the form zone with an index of stretched material from the form zone to the fill zone according to aspects of the innovation and reflects step 212 of method 200*a*. At this point, the form zone 30*g* has completed its task and an index may be executed. First gripper 34*a* and third gripper 34*c*, both closed, move in unison (arrow AK) to provide the height of stretched web set 20*e* from the form zone 30*g* into the fill zone 30*h* such that fill zone 30*h* maintains the condition of web set 20*e* of being treated (stretched). It is to be appreciated that the calculated amount of stretched web set 20*e* may include prior stretched material above second gripper 34*b*, as variability in height of shipping items $\mathbf{12}_M$ to $\mathbf{12}_{M+N}$ might not index all treated web set 20*e* into fill zone 30*h*, especially as mode A) and mode B) may be mixed in operation.

Figure 8:
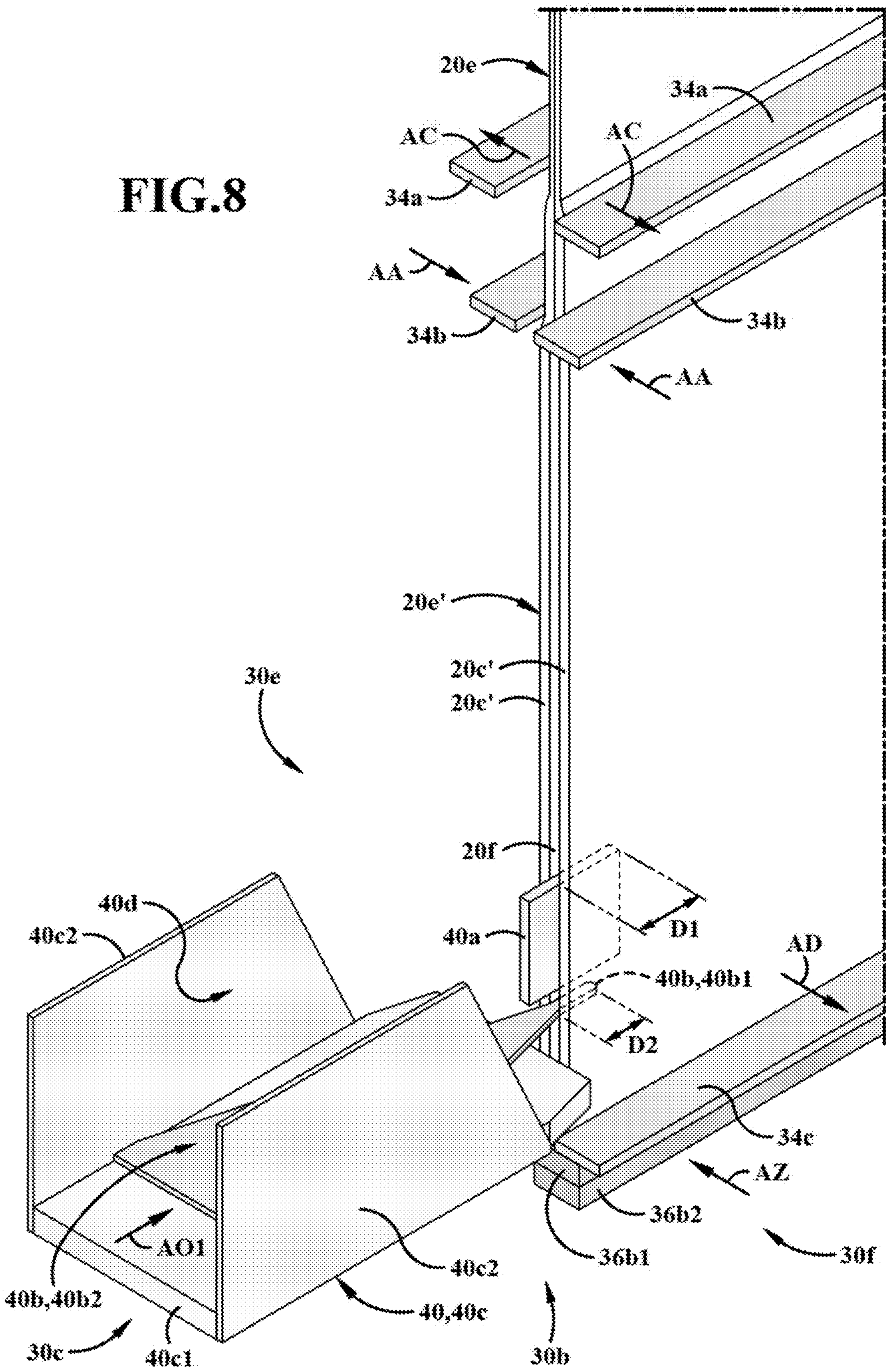
FIG. 8, a diagrammatic, front, right side, isometric perspective view of the fill zone is shown with items of an insertion assistance set 40 present within the web set according to aspects of the innovation.

Turning briefly to FIG. 8, a diagrammatic, front, right side, isometric perspective view of the fill zone is shown with items of an insertion assistance set 40 present within the web set according to aspects of the innovation and that illustrates an aspect of system 10 as step 212 of method 200A. From the perspective of user side (proximal to beginning of width of web 20*c*), spacer 40*a* and tab 40*b*1 of bag opener 40*b* are portrayed. As an index occurs, it is contemplated that at least a portion of the items of insertion assistance set 40 operate as the stretched web set 20*e* of web 20*c* from form zone 30*g* traverses into fill zone 30*h*. It is contemplated that in embodiments, spacer 40*a* and tab 40*b*1 of bag opener 40*b* are configured to be partially inserted into the stream of the traversal path of web set 20*e* as an index occurs, thus maintaining a separation within the web set 20*e* at the edge close to front 30*c*. Spacer 40*a* is shown intruding a distance D1 into web set 20*e*. Tab 40*b*1 is shown inserted a distance D2 into web set 20*e*. It is contemplated that an advantage to embodiments so configured is a provision of relative ease for further processing the creation of a pouch as insertion of items as discussed herein need not on their own attempt to separate each web 20*c* of web set 20*e*.

It is to be further appreciated that the orientations of the set of grippers 34 have completed their actions for the present scan and are in position as described in FIG. 5A and that depending on mode, will be ready to be employed per a next scan (per mode A) or to be employed for a minimal stretch and index (per mode B).

Figure 9A:
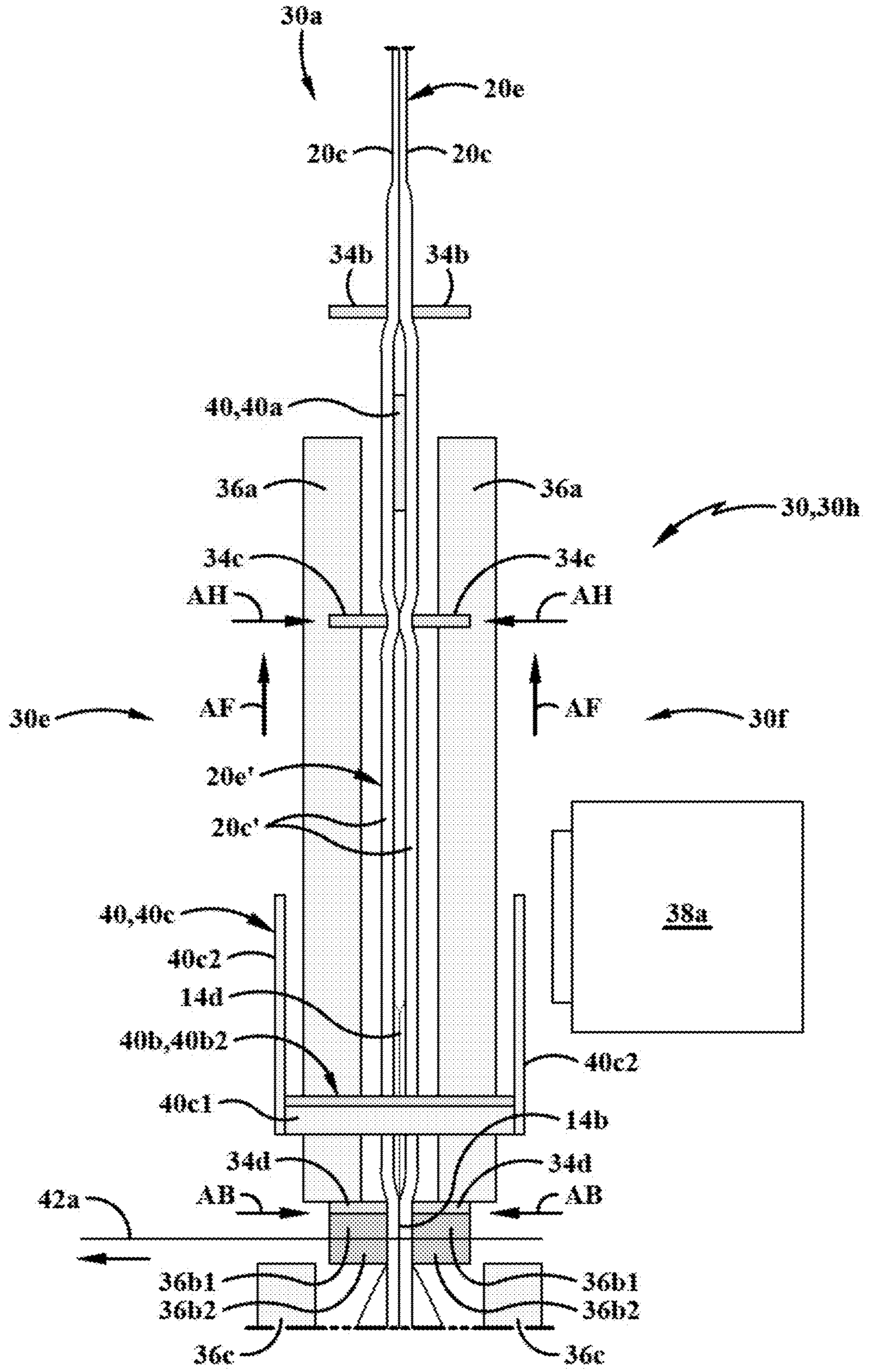
FIG. 9A is a diagrammatic front elevation view of the fill zone post-index with stationary grippers and moving grippers according to aspects of the innovation.
Figure 9B:
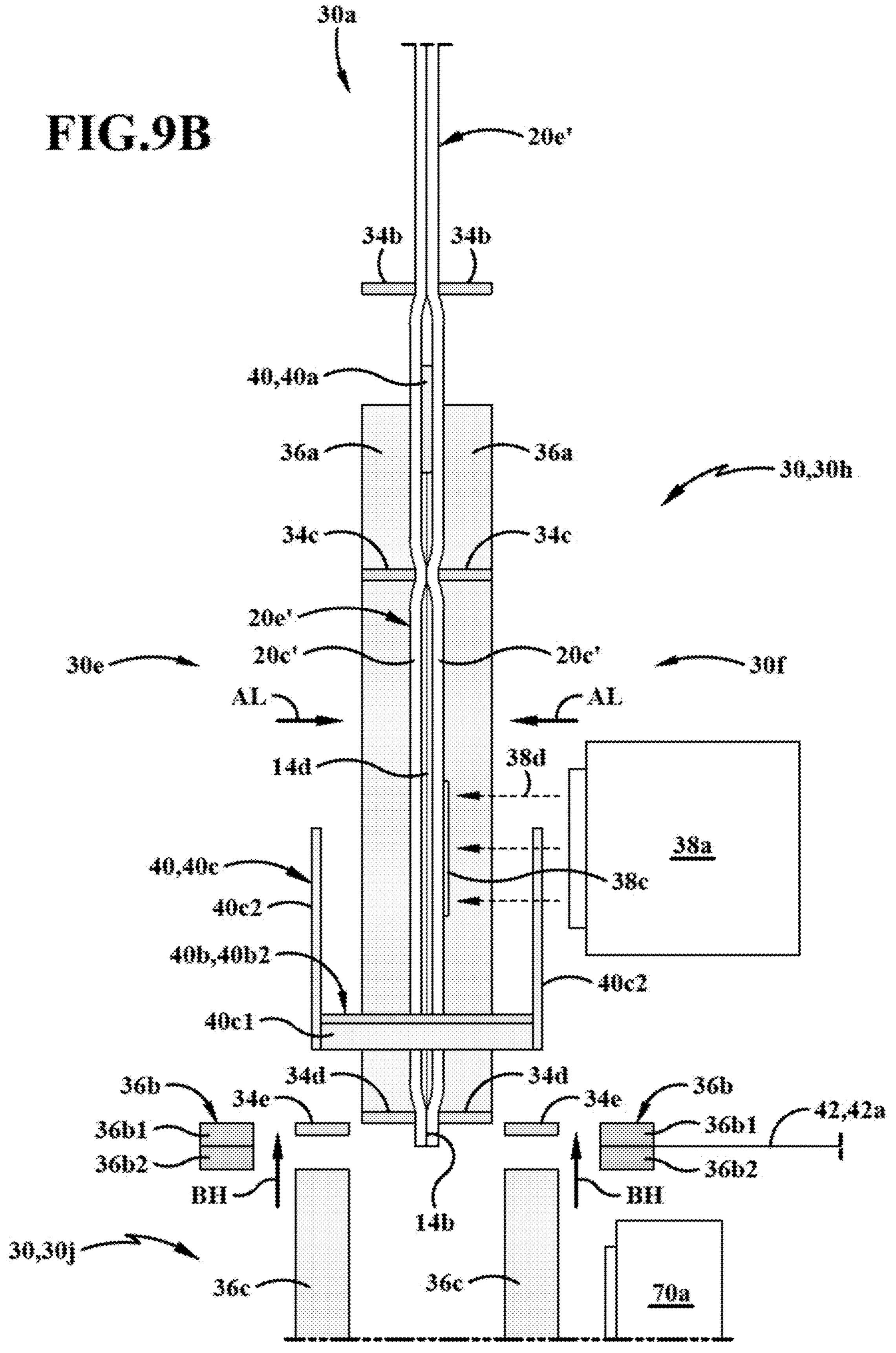
FIG. 9B is a diagrammatic front elevation view of the fill zone with a back sealer and labeler according to aspects of the innovation.
Figure 9C:
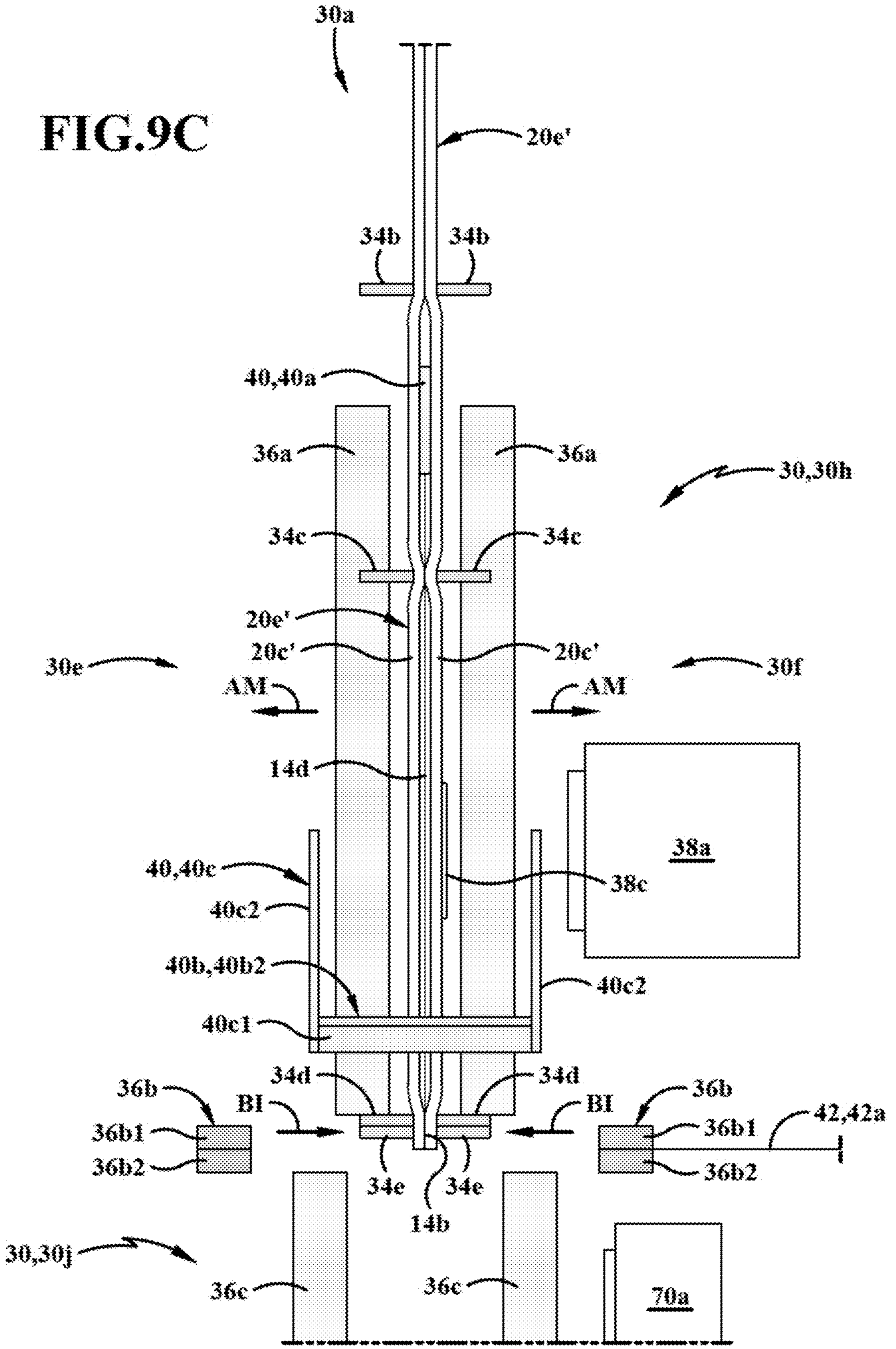
FIG. 9C is a diagrammatic front elevation view of the fill zone with the back sealer releasing according to aspects of the innovation.

Prior to step 106 of method 100 (from a user's perspective) and in relation to steps 214 and 216 of method 200A, FIG. 9A through FIG. 9C present aspects of embodiments of system 10, particularly package section 30, and more particularly fill zone 30*h* of package section 30. It is to be appreciated that while method 200A provided that step 214 precedes step 216, the steps may occur in any order and may occur simultaneously. In a preferred embodiment, steps 214 and 216 occur prior to step 218.

FIG. 9A is a diagrammatic front elevation view of the fill zone post-index with stationary grippers and moving grippers according to aspects of the innovation, and indicates that after an index, second and fourth grippers (34*b*, 34*d*) close (arrows AA and AB). This allows first and third gripper (34*a*, 34*c*) to open, and to translate towards top 30*a* of package section 30 (arrows AE and AF). It is to be appreciated that first gripper 34*a* is not shown so that detail of fill zone 30*h* may be illustrated. It is to be further appreciated that the distance that third gripper 34*c* travels is directly related to scan data as received at step 202 of method 200A and obtained at step 104 of method 100. At the calculated distance, third gripper 34*c* closes on web set 20*e* (arrow AH), which then allows second gripper 34*b* to release web set 20*e* (arrow AJ). FIG. 9B is a diagrammatic front elevation view of the fill zone with a back sealer and labeler according to aspects of the innovation and shows step 214 and step 216 being enacted as back sealer 36*a* closes to provide a back seal (arrow AL) while labeler 38 provides label 38*c* (arrows 38*d*) unto side of web set 20*e* facing (in this embodiment) 30*f*. FIG. 9C is a diagrammatic front elevation view of the fill zone 30*h* with the back sealer 36*a* releasing according to aspects of the innovation, and shows back sealer 36*a* opening (arrow AM) while label 38*c* is shown affixed. It is to be appreciated that back sealer 36*a* spans a maximum distance from top 30*a* towards bottom 30*b* in the fill zone 30*h*, as it is expected to fill any size scanned shipping item per the maximum rated build of fill zone 30*h* of package section 30. It is contemplated that portions of web sets 20*e* may be sealed multiple times as the height of third gripper 34*c* is not expected to often reach the maximum height of the fill zone 30*h*. In other words, back sealer 36*a* operates to provide a seal at a distal portion (near rear 30*d*) of the width of web set 20*e* of web 20*c*, as tension on the web set 20*e* of web 20*c* is maintained (between third gripper 34*c* and fourth gripper 34*d*). It is to be appreciated that labeler 38 may be known in the art (for example, CTM 3600YT servo labeler manufactured by CTM Labeling Systems). Labeler 38 may work by way of a pressure differential outside of webs 20*c*, thereby providing a light touch of application of label 38*c* to the benefit of webs 20*c* most all not being affected by the action of applying a label with too much force. It is to be appreciated that label 38*c* will reflect scan data of shipping item 12, which is to be placed in the pouch to which label 38*c* has been affixed on its outer side (in this embodiment, side facing 30*f*).

Reflecting step 218 of method 200A, we turn to FIG. 10A through FIG. 10E. It is to be appreciated that while shown linearly in FIG. 6, steps 214, 216, 218 may overlap in order. As discussed herein above, a portion of step 218 may be enacted prior to either of steps 214 or 216 while another portion of step 218 may be enacted after steps 214 and 216. For clarity, we discuss an embodiment that reflects this. As noted above, FIG. 10A described a condition prior to steps 214 and 216. Turning to FIG. 10B, a diagrammatic, front, right side, isometric perspective view of the fill zone 30*h* with items of the insertion assistance set 40 and one of the grippers in motion according to aspects of the innovation that shows steps 214 and 216 have been completed (label 38*c* is portrayed). In some embodiments, third gripper 34*c* may be programmed to jog slightly towards bottom 30*b* of package section 30 (arrow AN) such that the opening of web set 20*e* towards the front 30*c* of package section 30 may pucker. Additionally step 218 may also see bag opener 40*b*

Figure 10C:
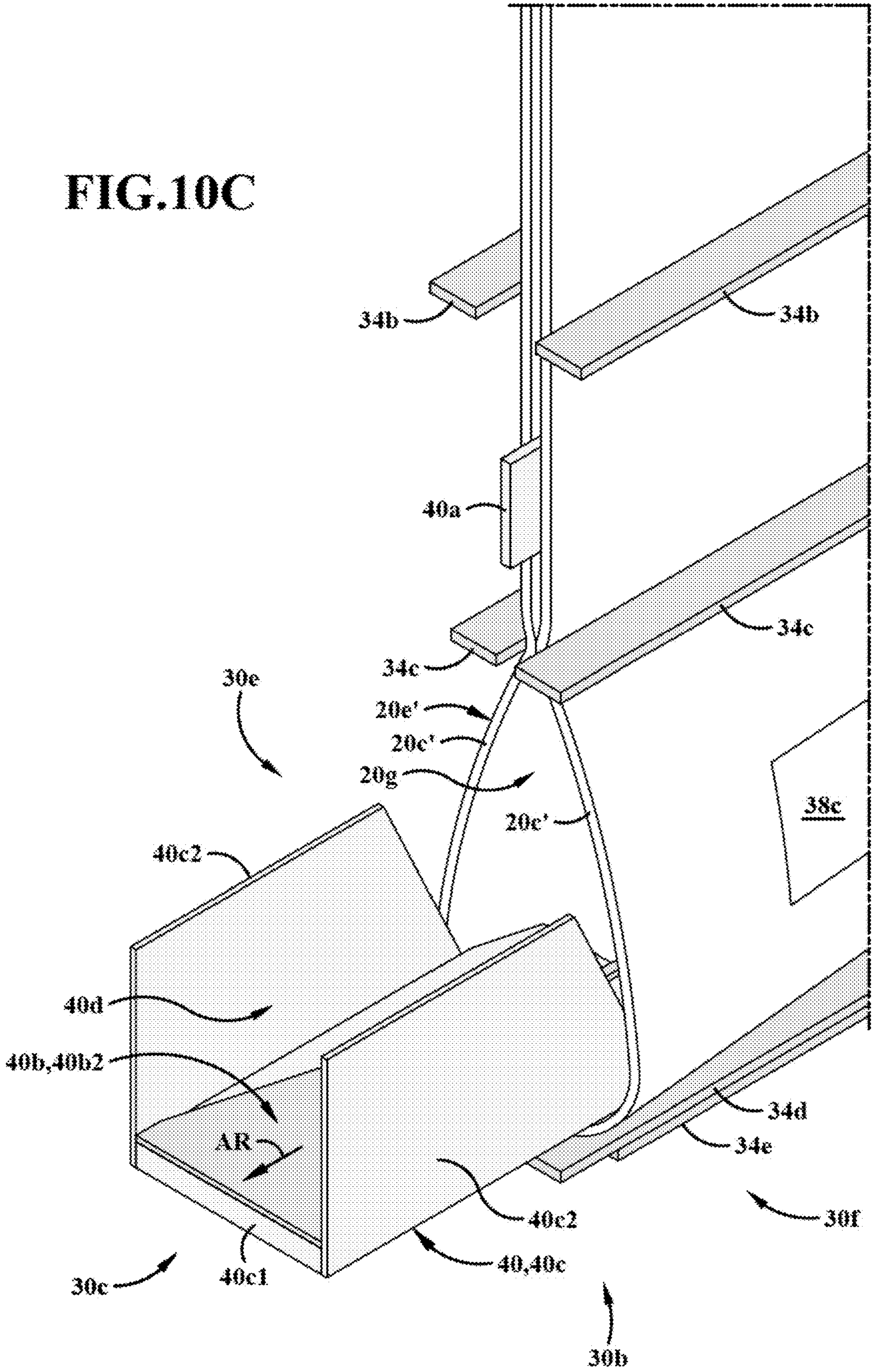
FIG. 10C is a diagrammatic, front, right side, isometric perspective view of the fill zone with items of the insertion assistance set in motion according to aspects of the innovation.
Figure 10D:
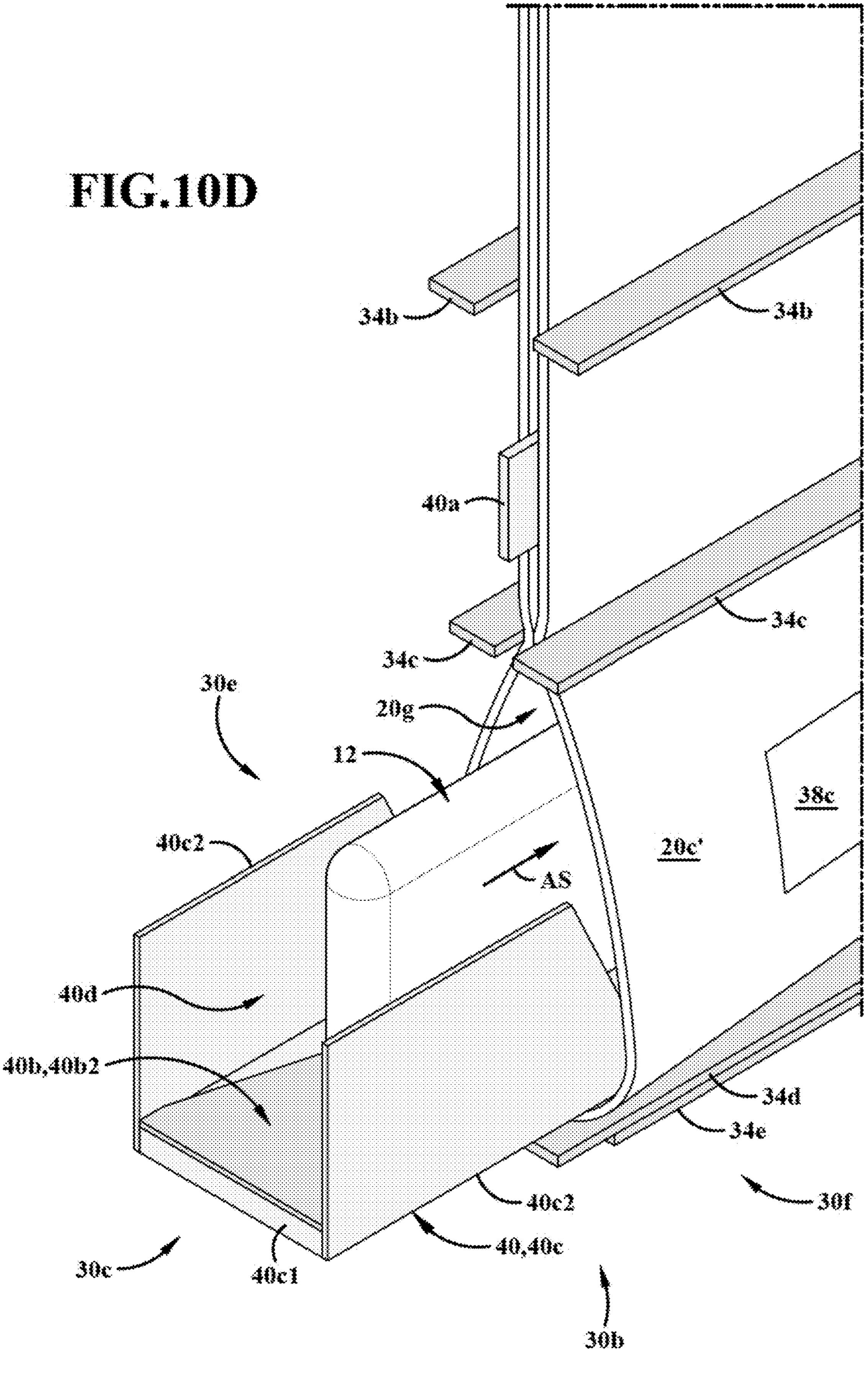
FIG. 10D is a diagrammatic, front, right side, isometric perspective view of the fill zone with the shipping item being inserted into a pouch of the stretched web set according to aspects of the innovation.

(to which tab 40_b_1 constitutes a leading edge) translate towards rear 30_d_ of package section 30 (arrow AO). As bag opener 40_b_ translates, spreader 40_b_2 spreads the web 20_c_ of web set 20_e_ apart (arrow AP). As bag opener 40_b_ reaches a designated maximum depth, loading chute 40_c_ intrudes towards rear 30_d_ of package section 30 (arrow AQ). FIG. 10C is a diagrammatic, front, right side, isometric perspective view of the fill zone with items of the insertion assistance set 40 in motion according to aspects of the innovation and portrays loading chute 40_c_ continuing to intrude to a depth D4. At D4, it is contemplated that sides 40_c_2 of loading chute 40_c_ will rest within web set 20_e_ at the leading edge of sides 40_c_2. At this point, bag opener 40_b_ may retract towards front 30_c_ of package section 30 (arrow AR). It is to be appreciated that bag opener 40_b_ translates towards front 30_c_ only to a point of leaving tab 40_b_1 intruding between web set 20_e_ to a depth D2. FIG. 10D, a diagrammatic, front, right side, isometric perspective view of the fill zone with the shipping item being inserted into a pouch of the stretched web set; and FIG. 10E, a diagrammatic, front, right side, isometric perspective view of the fill zone with the items of the insertion assistance set 40 at an initial state, and with the shipping item fully nested, each according to aspects of the innovation; show shipping item 12 being inserted into the formed pouch (arrow AS). It is to be appreciated that sides 40_c_2 having their leading edge within web set 20_e_ provides a benefit of protection for a user placing shipping item 12 into a pouch by preventing the user's hands from interacting with the edge of web set 20_e_ facing front 30_c_ of package section 30. Additional benefit of protection to web set 20_e_ is contemplated, as contact or impact (and subsequent damage) with a user's hand (or automated inserter-not shown) or shipping item 12 during insertion is avoided.

Figure 10E:
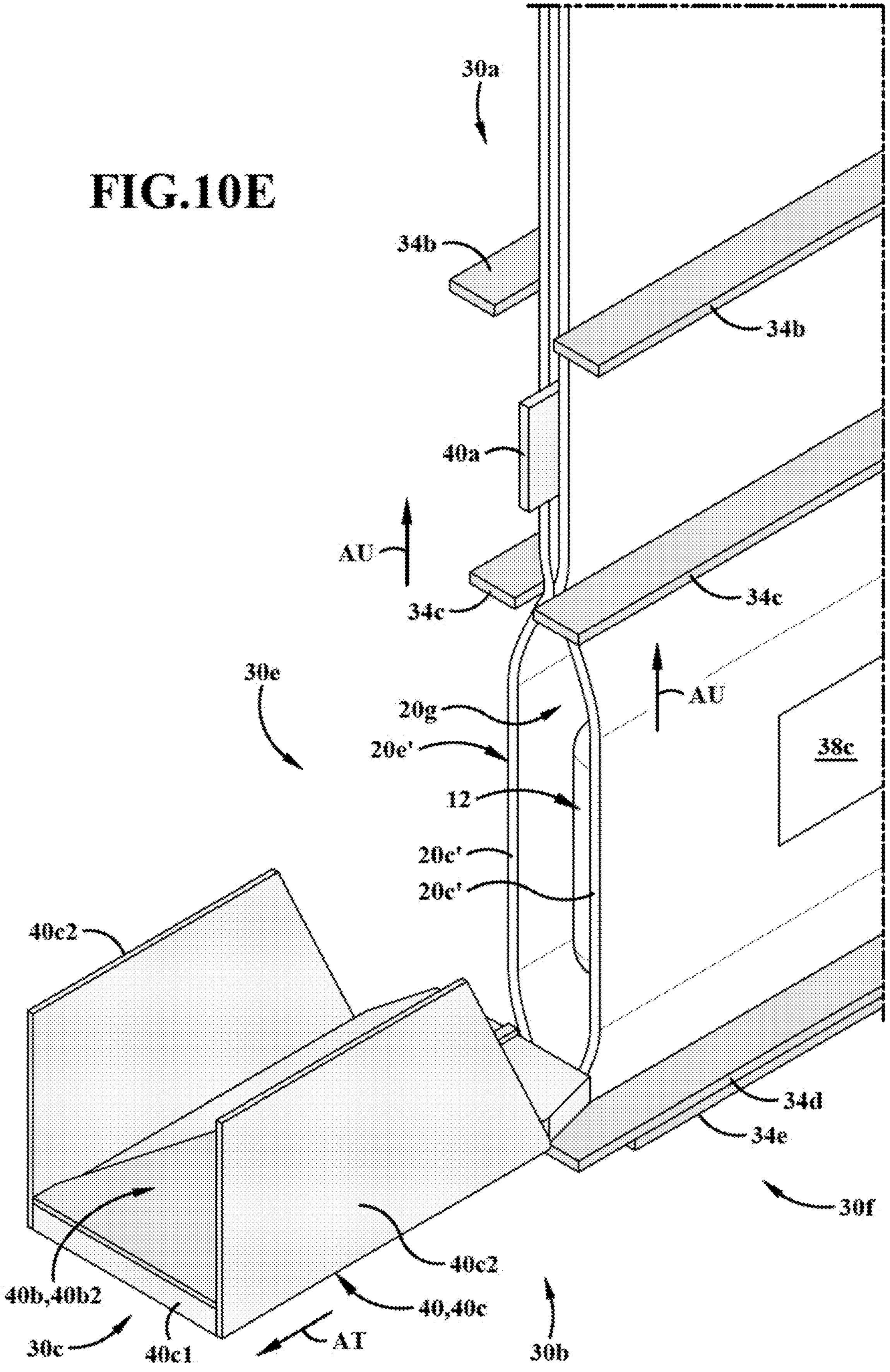
FIG. 10E is a diagrammatic, front, right side, isometric perspective view of the fill zone with the items of the insertion assistance set at an initial state, and with the shipping item fully nested according to aspects of the innovation.

In an embodiment as depicted in FIG. 10E, a user placing shipping item 12 into the pouch so created would place shipping item 12 as close to rear 30_d_ of package section 30, which provides that the item is to clear tab 40_b_1, and 'drop' slightly towards bottom 30_b_ of package section 30 providing a kinesthetic feel for shipping item 12 being securely placed. It is contemplated that this placement also provides a benefit that the front seal (not yet applied), will avoid any interaction with shipping item 12 and effect a full seal. FIG. 10E also shows that after shipping 12 has been secured in pouch, loading chute 40_c_ may retract (arrow AT) and third gripper 34_c_ may jog back to its prior position (arrow AU). It is contemplated that this may provide a benefit of a slight squeeze of web set 20_e_ on shipping item 12, in preparation for a next step.

Figure 11:
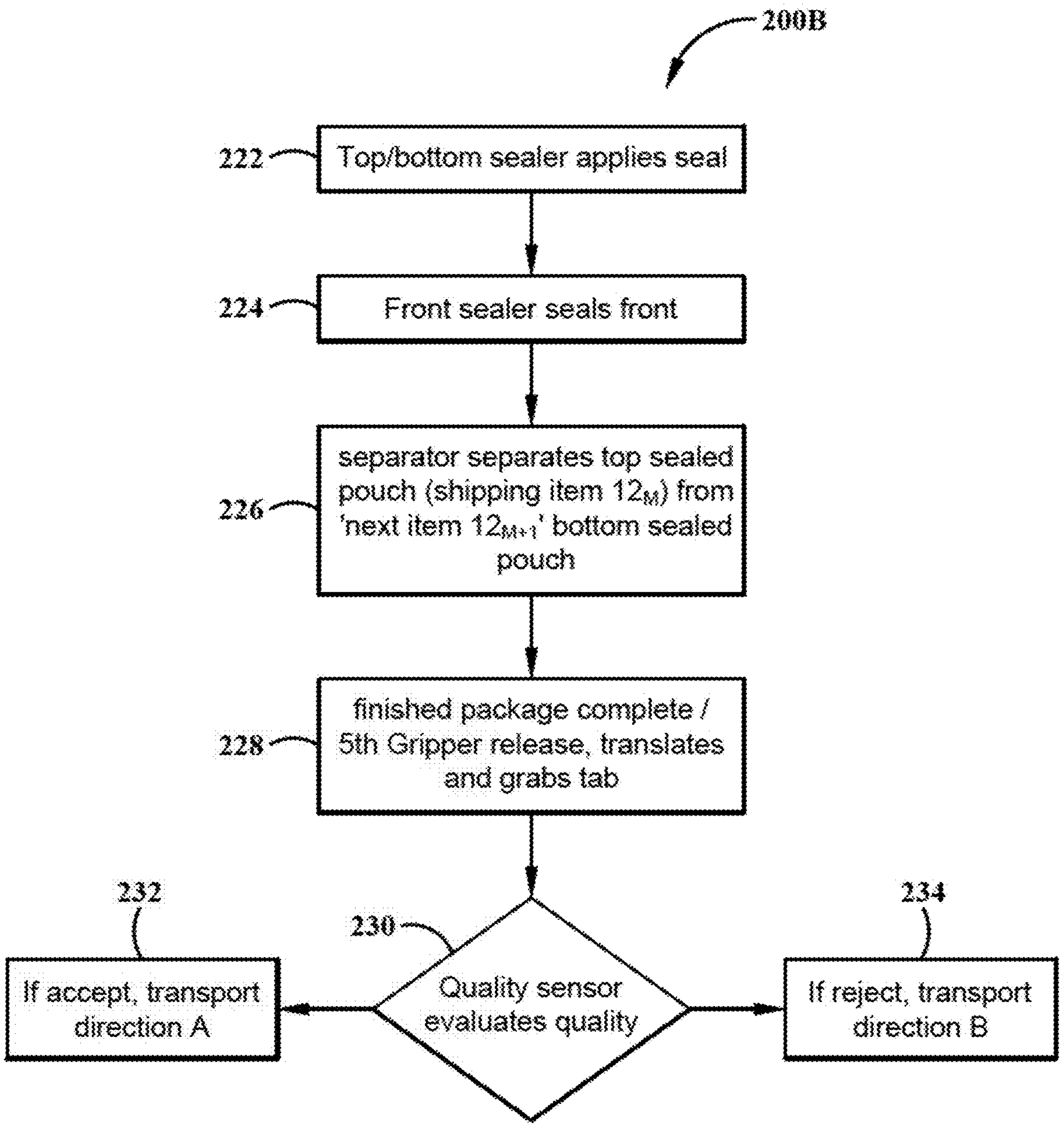
FIG. 11 is a flowchart method of the system perspective of the use of the system from the shipping item having been placed in the web set to indexing to the finish zone, including an exemplary quality/transport set, according to aspects of the innovation.

As with discussion of method 200A in FIG. 6 followed by discussions of FIG. 7A through FIG. 10E, an overall discussion of method 200B in FIG. 11 may provide clarity of a method for embodiments with perspective of operating from a system standpoint (for example, system 10) with a discussion of figures highlighting components providing actions being described from FIG. 12A through FIG. 12H. FIG. 11 is a flowchart method 200B of the system perspective of the use of the system from the shipping item having been placed in the web set to indexing to the finish zone, including an exemplary quality/transport set, according to aspects of the innovation. FIG. 12A through FIG. 12H provide various diagrammatic front elevation views of the fill zone and the finish zone. It is to be appreciated while the further discussion focuses on selected prefabricated packaging material with stretch or expansion characteristics, suitable processing as described herein may be provided with embodiments either without selected components, with different processing reflected in controller operation, or both.

FIG. 11 provides a flowchart that focuses on finish zone 30_j_ as described herein. It is contemplated that in preparing system 10 to operate in either of mode A) or mode B), web 20_c_ would be fed through system 10, creating web set 20_e_, and being stretched in form zone 30_g_ such that all of web 20_c_ in fill zone 30_h_ would be treated (or stretched). A last preparation would be to feed web 20_c_ into finish zone 30_j_ to at least use of top/bottom sealer 36_b_ to affect a bottom seal, as well as position fifth gripper 34_e_ to have clamped on a tab of material below fourth gripper 34_d_.

Turning now to operation for mode A), once shipping item $\mathbf{12}_M$ has been secured in a pouch as discussed herein above, a user would proceed to process a next shipping item (for example $\mathbf{12}_{M+1}$). This is reflected in step 110 of method 100 as discussed above. As seen in method 100, from a user's perspective, a process of using system 10 is quite simple: scan, load, scan, load, and so on. From a system perspective, a scan (or as contemplated, a timer that switches mode to A) Start/Continuous) initiates an index in step 212 as may be calculated to be needed. The index places the pouched shipping item 12 and its enveloping web set 20_e_ from the fill zone 30_h_ into the finish zone 30_j_.

It is to be appreciated that only as much shipping materials of web 20_c_ has been indexed down, which provides the benefit of extremely low waste of shipping material. This benefit is magnified for relatively high-speed operations that handle a largely random sized plurality of shipping items ($\mathbf{12}_{M+N}$), with the additional benefit of little to no down time, as container size changes are eliminated. System 10 provides a package with matched web sets of expanded (or unexpanded) packaging material economically or "right" sized to a series of shipping items $\mathbf{12}_{M+N}$.

It is to be appreciated that for operation for mode B), the calculation of indexing in step 212 may involve operations of the group of grippers and group of sealers to be similar, but not dependent on a scan for a next shipping item $\mathbf{12}_{M+1}$.

In both modes A) and B) after step 212 of indexing is complete, a shipping item $\mathbf{12}_M$ has been indexed from fill zone 30_h_ to finish zone 30_j_ and web set 20_e_ throughout fill zone 30_h_ has been treated (stretched). At this point, method 200B proceeds in the same manner for both mode A) and mode B).

At a step 222 of method 200B, the web set 20_e_ that has been indexed into finish zone 30_j_ and the web 20_c_ above the indexed web set 20_e_ (for example web set 20_e_ associated with shipping item $\mathbf{12}_M$) will have a dual sealer applied, for example, top/bottom sealer 36_b_. The single action of the top/bottom sealer 36_b_ provides both a top seal to the web set 20_e_ into which shipping item $\mathbf{12}_M$ had been placed, as well as a bottom seal to a proceeding web set 20_e_ for proceeding shipping item $\mathbf{12}_{M+1}$. Next at step 224 of method 200B, a front sealer, for example front sealer 36_c_ seals the remaining open portion of web set 20_e_ forming a finished package 14. At this stage, the finished package 14 is still attached above to web 20_c_.

At step 226 of method 200B, a separator set, for example separator set 42, acts to separate a finished package 14 from web 20_c_, splitting the seal area provided by top/bottom sealer 36_b_. It is to be appreciated that the separation leaves a tab of material of web 20_c_ below fourth gripper 34_d_ such that fifth gripper 34_e_ may translate and grip the tab, as discussed herein.

In some embodiments, the separation from web 20*c* of a completed package 14 may culminate the method 200B focusing on a system perspective on finish zone 30*j*.

In other embodiments, a quality/transport set 70 may enact a further step of evaluation step 230 in method 200B prior to separator set 42 acting in step 226. It is to be appreciated that evaluation step 230 is shown following step 228, but in some embodiments may occur after step 224 in which front sealer 36*c* seals web set 20*e* proximal to front 30*c* of package section 30. At that point, package 14 is effectively sealed, and a quality sensor 70*a* (not shown) of quality/transport set 70 may scan for appropriate quality parameters 70*b*. For a package that meets the predetermined quality parameters 70*b*, a transport or conveyor 70*c* moves the package 14 in a direction A (see FIG. 12G) to a specified location for shipping package 14. If the quality scan shows that the package does not meet appropriate quality parameters 70*b*, transport 70*c* may be altered or redirected in a separate direction B for further action. Alternatively, in embodiments, transport 70*c* alone may be provided. For simplicity, only one direction is shown.

Figure 12A:
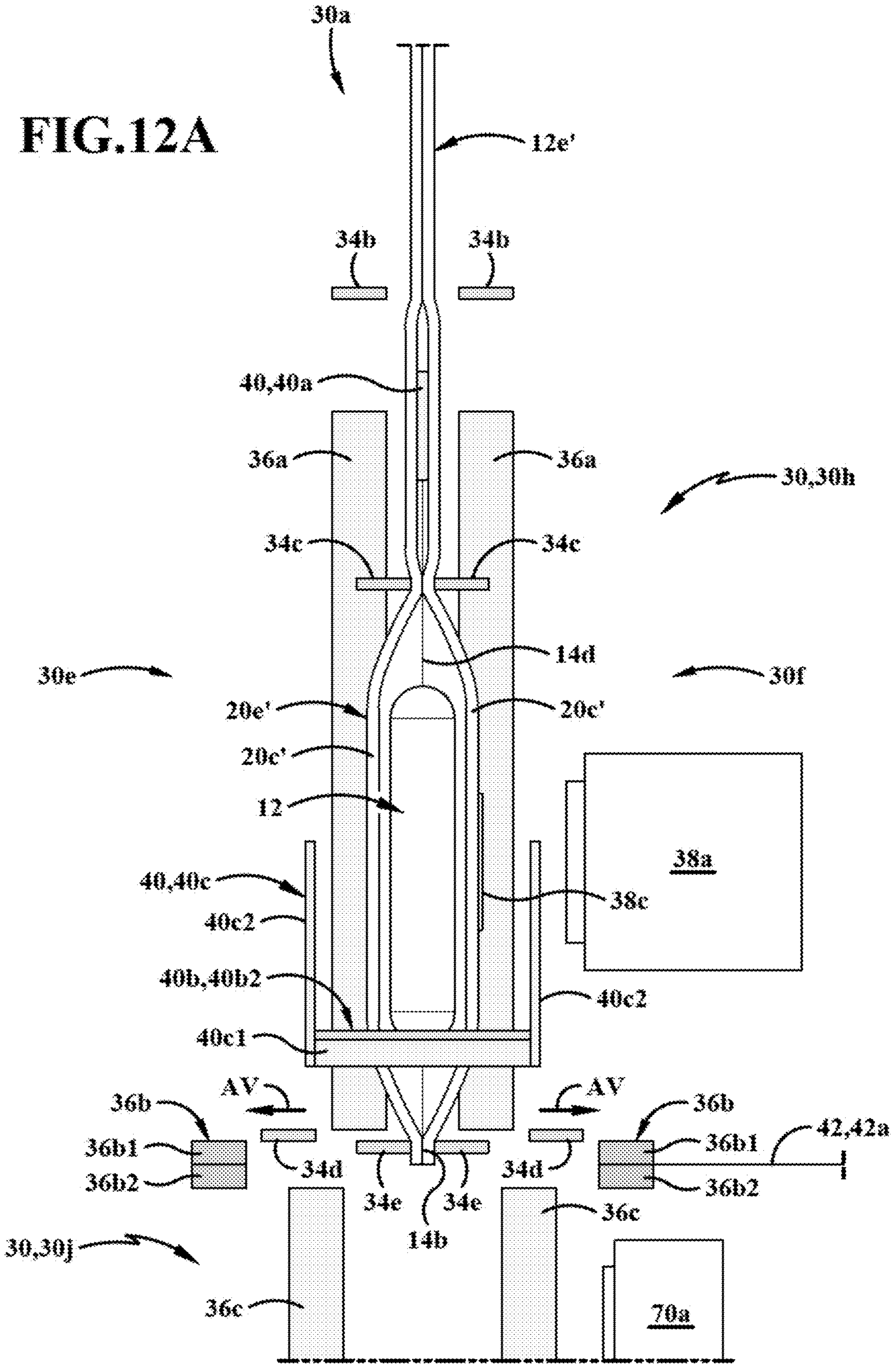
FIG. 12A is a diagrammatic front elevation view of the fill zone and the finish zone with the placed shipping item ready to be indexed according to aspects of the innovation.
Figure 12B:
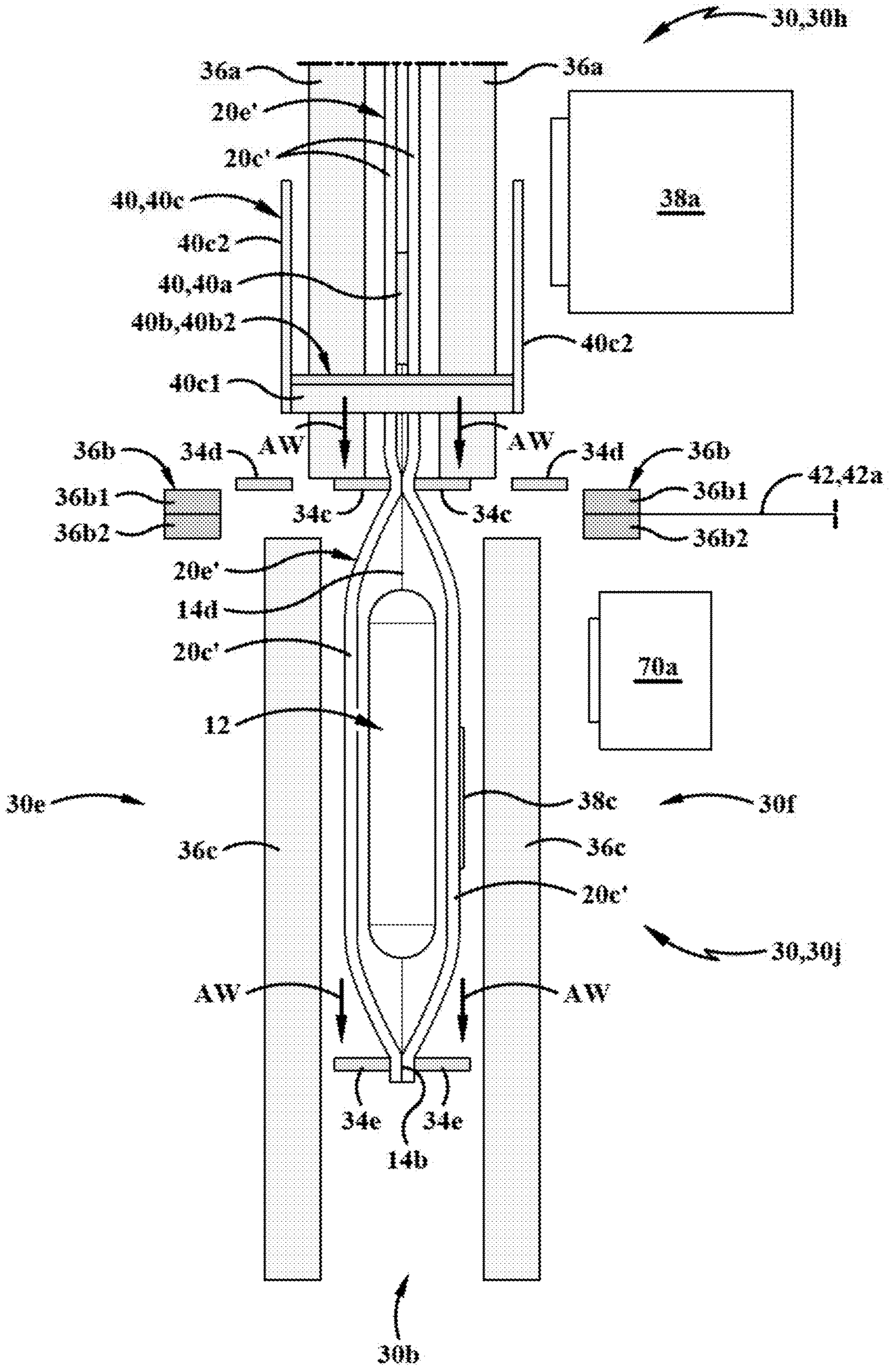
FIG. 12B is a diagrammatic front elevation view of the finish zone and the fill zone with the placed shipping item indexed to the finish zone and with the exemplary quality/transport set according to aspects of the innovation.

FIG. 12A provides a diagrammatic front elevation view of package section 30, viewing from front 30*c* towards rear 30*d* of package section 30. In this view, shipping item $\mathbf{12}_M$ has been secured in a pouch of web set 20*e* in fill zone 30*h*. This may reflect a first item in a A) Start/Continuous mode or last/only item in a B) End/One-off mode. From a system perspective, FIG. 12A may continue from FIG. 9C and FIG. 10E, reflecting that fifth gripper 34*e* had just closed and clamped on tab of web 20*c* below fourth gripper 34*d*, and fourth gripper 34*d* opens (arrow AV) in preparation for an index. It is to be appreciated that third gripper 34*c* is closed and the computed distance of an index is in relation to the calculated height of the web set 20*e* which is driven by the scan of the shipping item $\mathbf{12}_M$ that is securely within the pouch as disclosed herein above. FIG. 12B shows the index (arrow AW) as the secured shipping item translates from fill zone 30*h* to finish zone 30*j* (in the direction of top 30*a* towards bottom 30*b*), reflecting step 212 of method 200A. As noted herein, the maintaining throughout fill zone 30*h* with web set 20*e* that has been processed to be in an extended state, operates under the function of one or both of a selected mode and/or scan of a next shipping item $\mathbf{12}_{M+1}$. It is to be appreciated that motion AW and motion AK (as discussed herein above) reflect a same index motion. Each of actions of selected mode (particularly mode B) Stop/One-off) and/or scan of a next shipping $\mathbf{12}_{M+1}$ prompts action in form zone 30*g* such that the amount of stretched web set 20*e* of web 20*c* that is required to replenish the stretched web 20*e* of web 20*c* in fill zone 30*h* is accomplished.

Figure 12C:
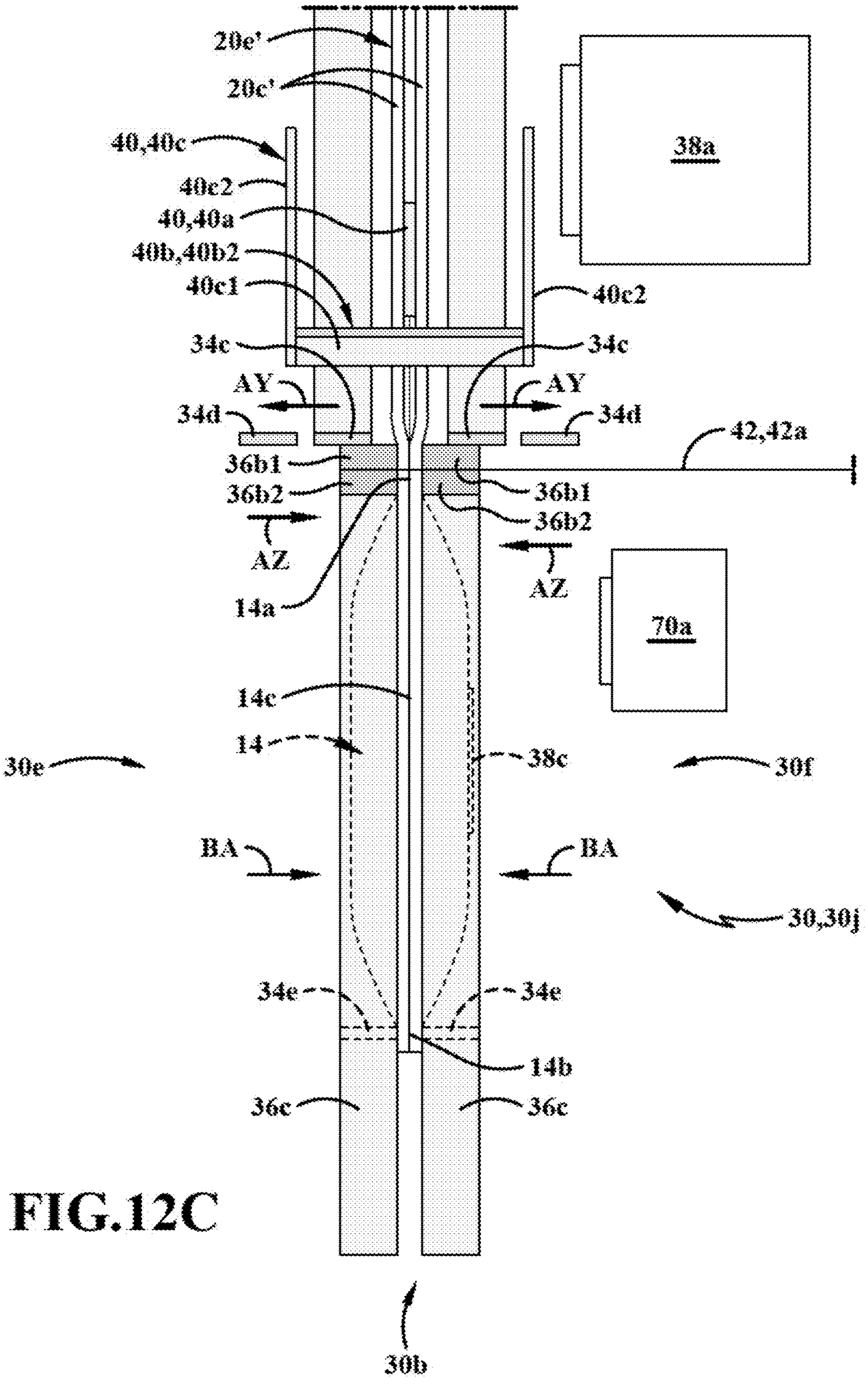
FIG. 12C is a diagrammatic front elevation view of the finish zone and the fill zone with a top/bottom sealer and a front sealer, and with the exemplary quality/transport set according to aspects of the innovation.
Figure 12D:
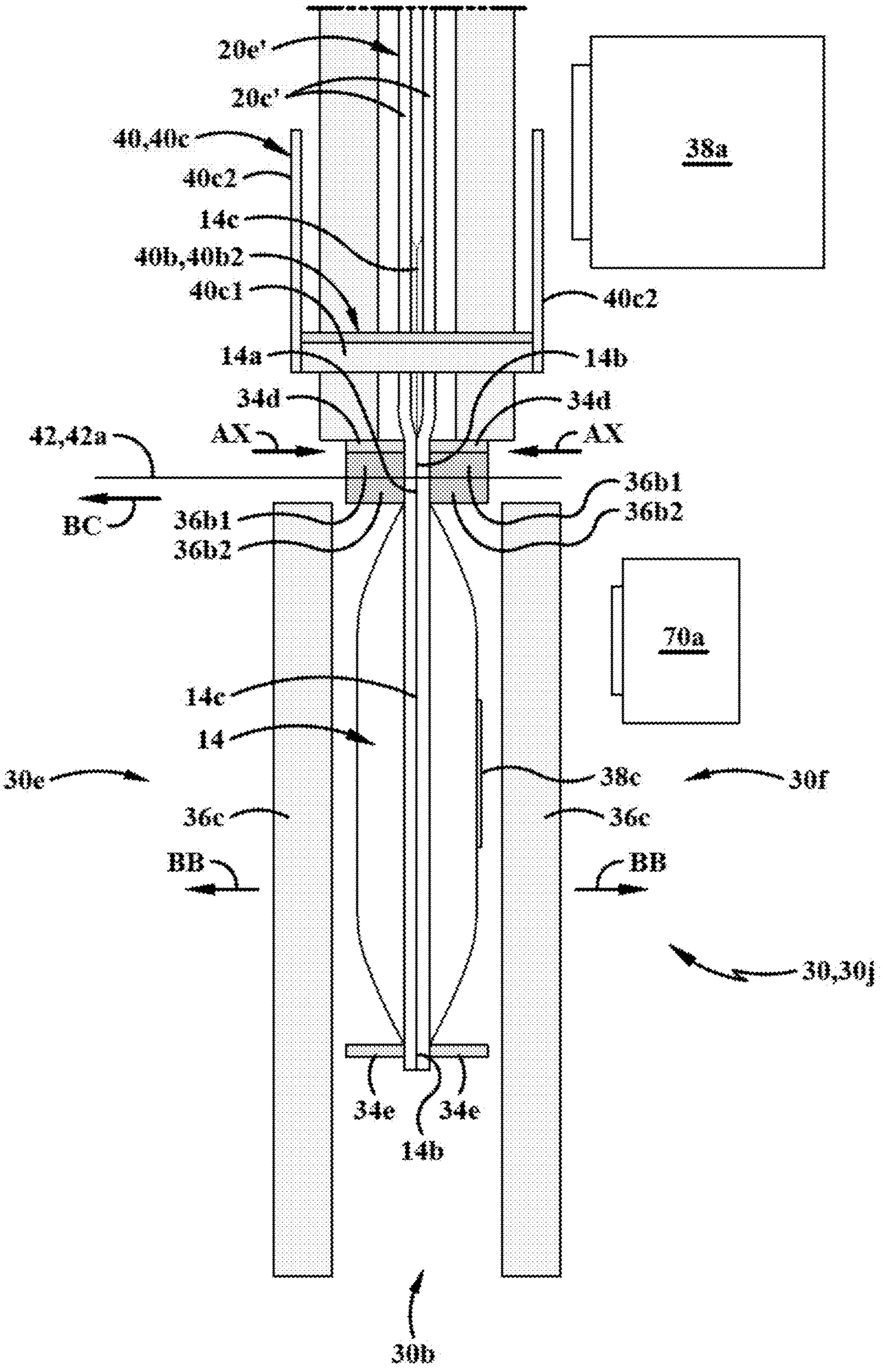
FIG. 12D is a diagrammatic front elevation view of the finish zone and the fill zone with the front sealer open, a separator set in motion, and with the exemplary quality/transport set according to aspects of the innovation.
Figure 12E:
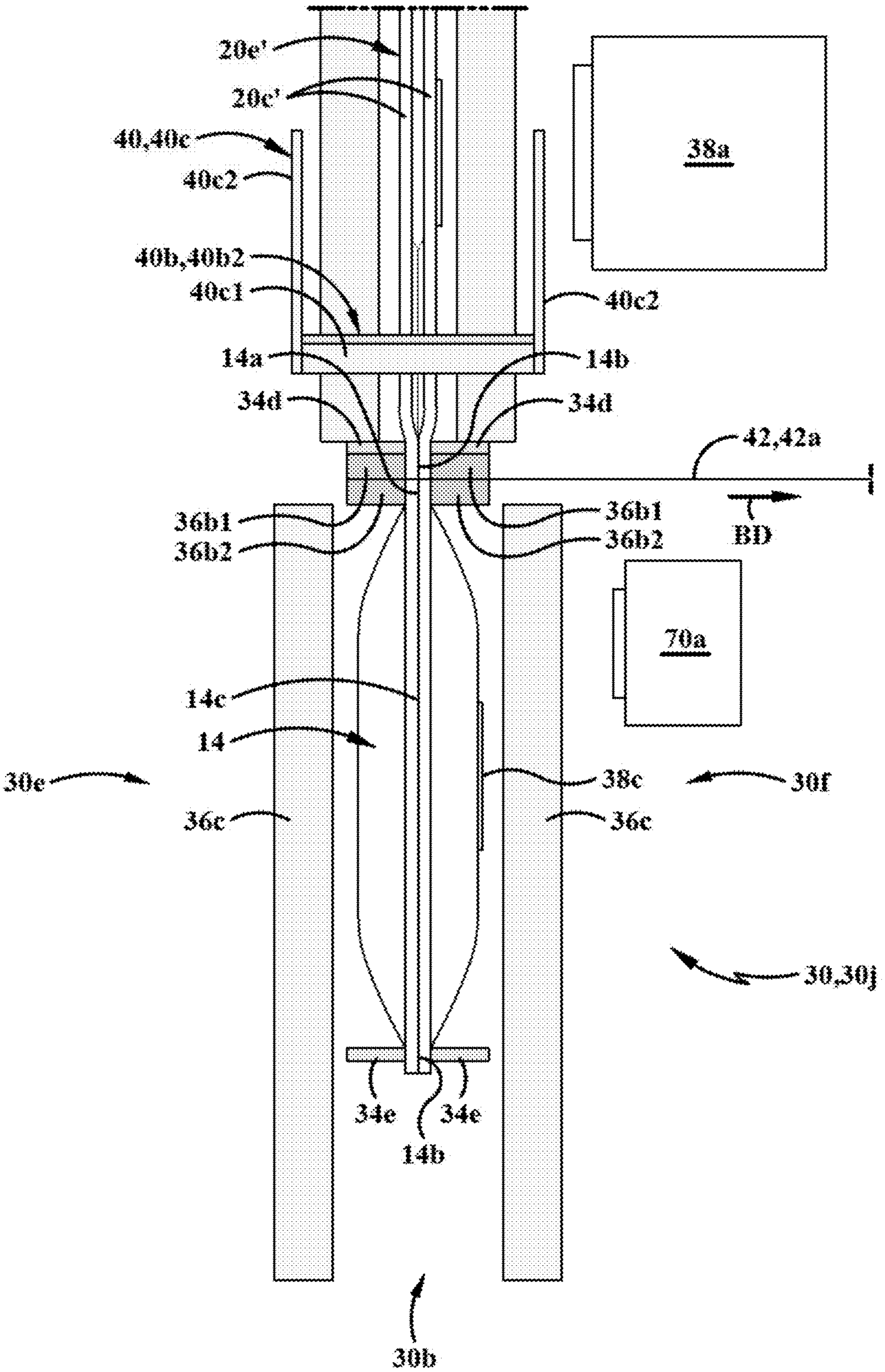
FIG. 12E is a diagrammatic front elevation view of the finish zone and the fill zone with the separator set retracting and with the exemplary quality/transport set according to aspects of the innovation.
Figure 12F:
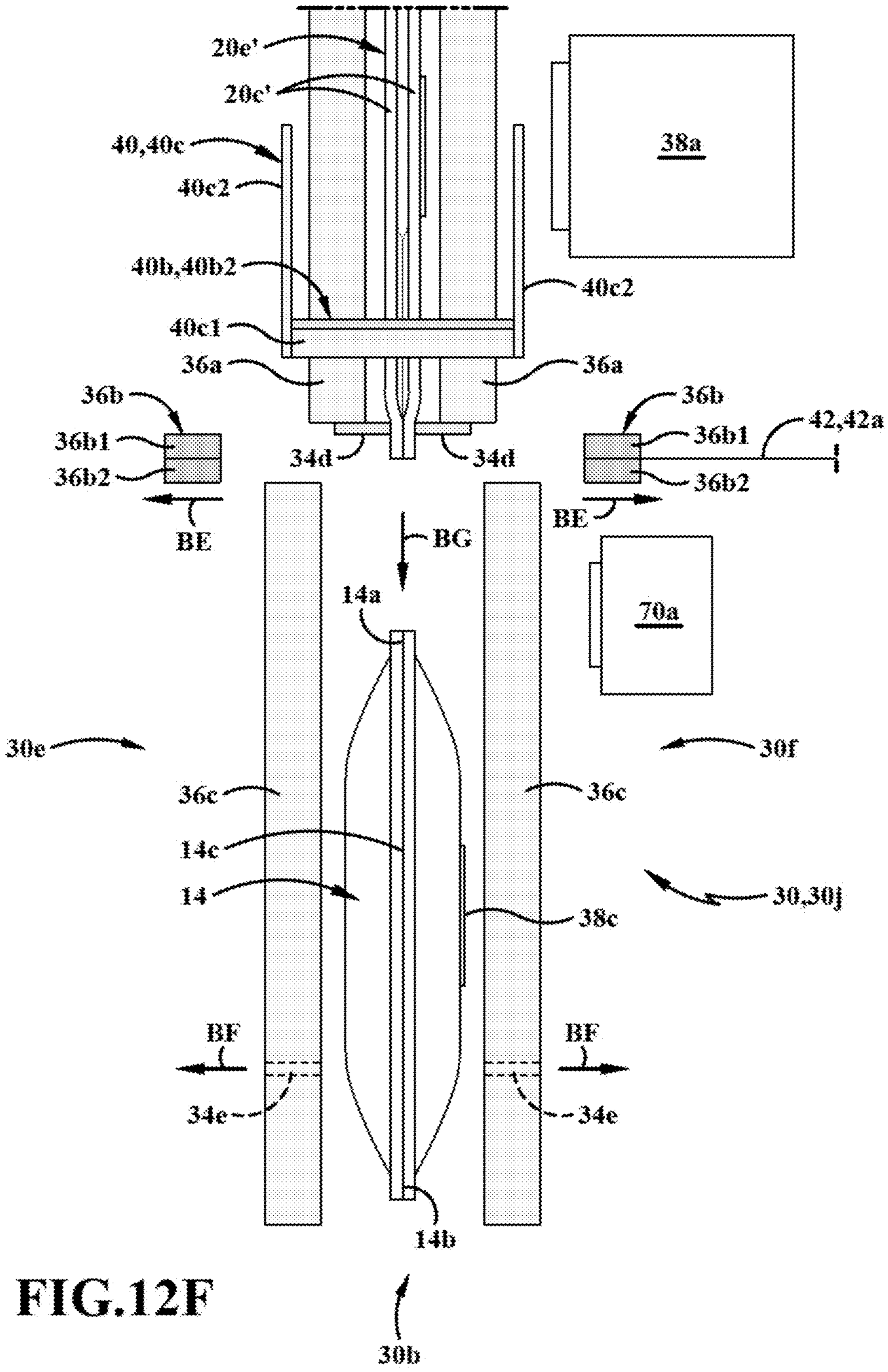
FIG. 12F is a diagrammatic front elevation view of the finish zone and the fill zone with the top/bottom sealer, the exemplary quality/transport set and a release of a finished package according to aspects of the innovation.
Figure 12G:
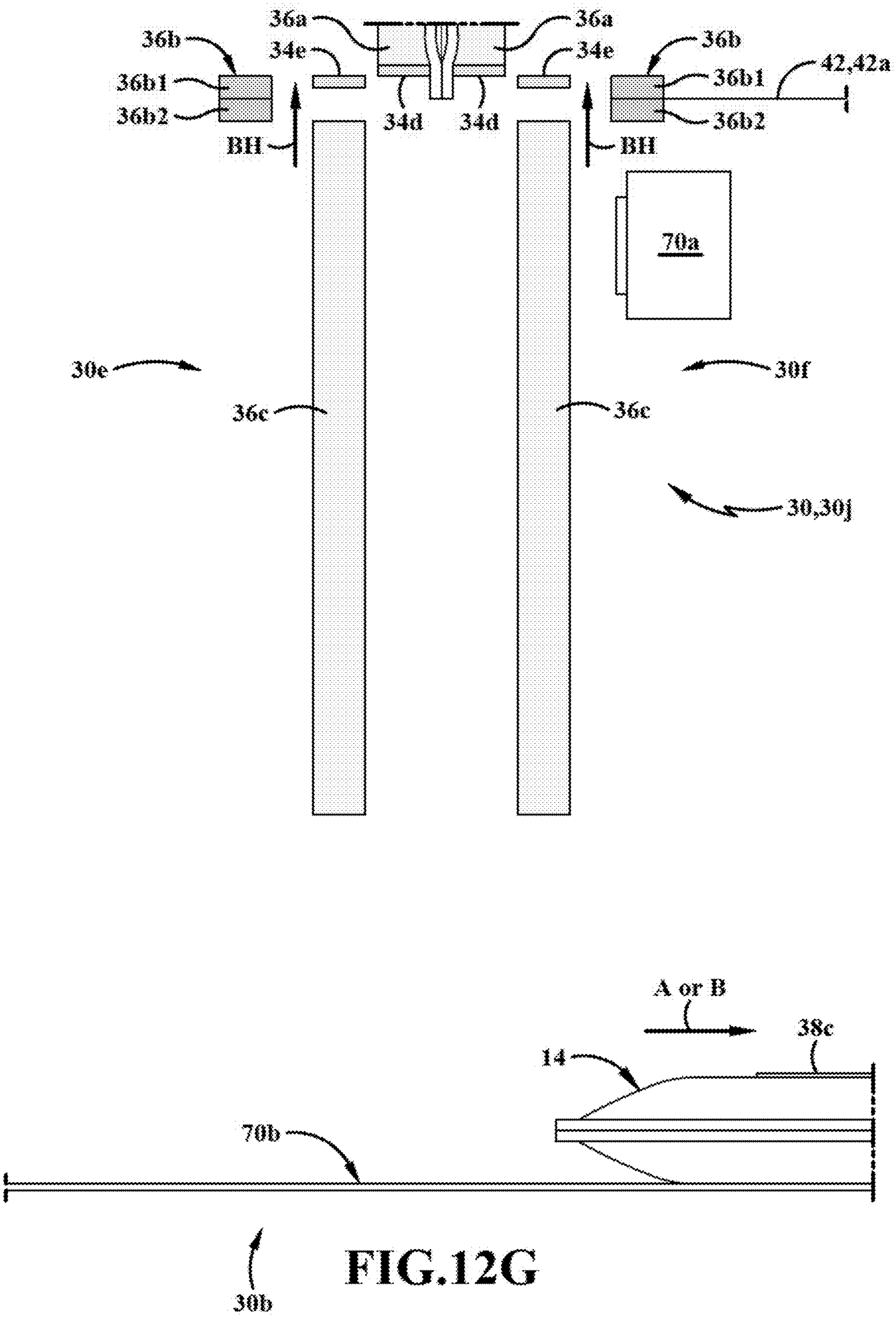
FIG. 12G is a diagrammatic front elevation view of the finish zone and the fill zone with one of the grippers moving to engage a tab below another gripper, and with the exemplary quality/transport set according to aspects of the innovation.
Figure 12H:
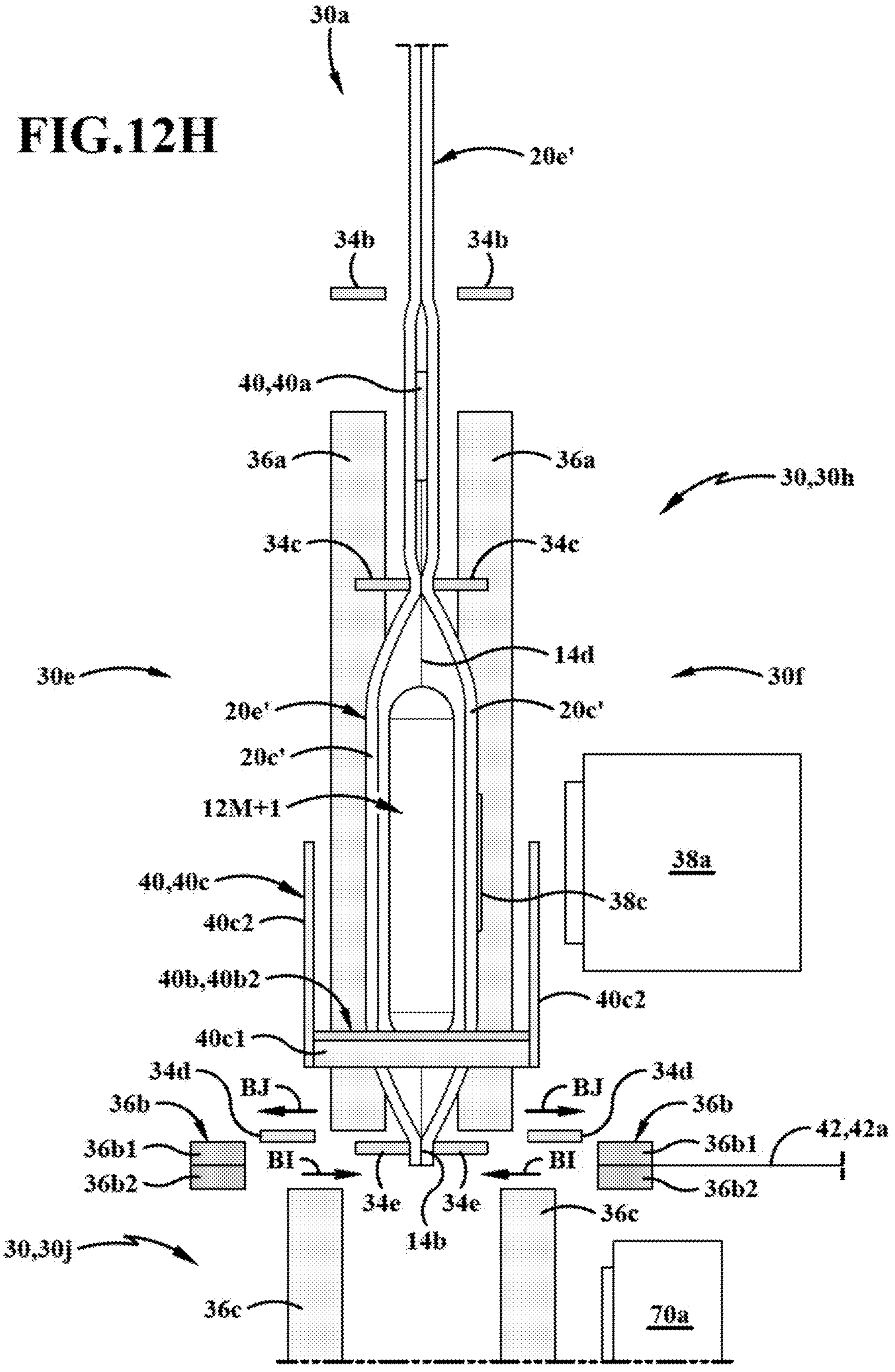
FIG. 12H is a diagrammatic front elevation view of the fill zone and the finish zone with one of the grippers engaging the tab and a next shipping item ready for a next index according to aspects of the innovation.

Turning to FIG. 12C, steps 222 and 224 from method 200B are executed with fourth gripper 34*d* closing on web set 20*e* of set 20*c*, thereby allowing third gripper 34*c* to open (arrows AX and AY respectively), and top/bottom sealer 36*b* and front sealer 36*c* close and seal, forming a fully sealed package 14 (arrows AZ and BA respectively). It is to be appreciated that embodiments that feature quality/transport set 70 may initiate at this time as the package 14 has now been fully sealed. FIG. 12D shows front sealer 36*c* opening (arrow BB) and separator set 42 beginning its operation to cut or separate package 14 from the web 20*c* (arrow BC). FIG. 12E shows separator set 42 completing the action of cutting and separating the package 14 from web 20*c* (arrow BD). It is to be appreciated that in embodiments with quality/transport set 70, the inspection has been completed prior to package 14 being separated from web 20*c*. FIG. 12F shows finish zone 30*j* and top/bottom sealer 36*b* opening away from package 14 (arrow BE) and fifth gripper 34*e* opening away from package 14 (arrow BF). This allows package 14 to descend (herein in this embodiment), towards bottom 30*b* of package section 30 (arrow BG). In FIG. 12G, package 14 is shown being transported onward (arrow A or B) along transport 70*c*. It is to be appreciated that "arrow A or B" may designate the result of the quality/transport set 70 (sensor results from 70*a* being evaluated against parameters 70*b*). For simplicity, only one direction or mode of transport is shown, but it is contemplated that other modes may be within the scope of the embodiment, including direction A and direction B being in different directions, or direction B being rerouted along a different path. It is contemplated that a different path may allow quality restitution to package 14. Fifth gripper 34*e*, in an open position translates toward 30*a* (arrow BH), and positions itself below fourth gripper 34*d* in order to grab the tab of web 20*c* below fourth gripper 34*d*. In FIG. 12E, fifth gripper 34*e* closes on the tab of web 20*c* (arrow BI), and fourth gripper 34*d* opens (arrow BJ). In this manner, an index by the system (as discussed herein above) is ready and web set 20*e* of web 20*c* may be indexed from each of form zone 30*g* into fill zone 30*h* and from fill zone 30*h* into finish zone 30*j*.

Also not shown for brevity, but contemplated in some embodiments, and as best seen in FIG. 13, separator set 42 may provide a feature in addition to a separation of package 14 from web 20*c* in finish zone 30*j*. FIG. 13 is a diagrammatic side elevation view of finished package 14 according to aspects of the innovation. That is, separator set 42 separates a prior placed shipping item $\mathbf{12}_{M-1}$ creating an end to web 20*c* in system 10 near bottom 30*b*. It is to be appreciated that this may also reflect a state of system 10 prior to engaging. This may be reflected as sealed package edge 14*b*1. In embodiments, a processing separation may occur at a second stage, after having shipping item $\mathbf{12}_M$ placed and indexed into finish zone 30*j*. For this step, the separator separating a completed package provides a sealed edge 14*a*1 of package 14. It is to be appreciated that this also provides a sealed bottom edge 14*b*1 of a next shipping item $\mathbf{12}_{M+1}$. It is contemplated that a spaced serration 42*b* may be imparted to package 14 along one of the edges of the package. This serration is contemplated to be provided prior to separator set 42 separating a completed package from web 20*c* and may be provided at any one or more edges 14*a*, 14*b*, 14*c*, and/or 14*d*. In the embodiment shown, the serration 42*b* has been made along edge 14*c*.

Continuing with FIG. 13, the finished package 14 according to aspects of the disclosure is shown. As discussed herein, while processing, an incomplete package may be understood to have a side 14*c* that during loading of a shipping item 12 will be open to a user (or automated loader) of system 10 (front 30*c*), and that a length of sides 14*a* and 14*b* may designate a width of web 20*c* of rolls 20*b*. The side opposite of 14*c* (at the termination of the width of web 20*c* of rolls 20*b*) is considered to be the side 14*d*. Finished package 14 will have a bottom 14*b* that is sealed prior to deposit of shipping item 12 (as discussed herein above), and a top 14*a* that is closed or clamped during insertion of shipping item 12 and sealed afterwards. Package 14 will also have a label side 14*f* upon which label 38*c* has been applied. It is to be appreciated that a benefit of the present innovation is in obtaining a continuous and right-sized height of final package (height of sides 14*c* and 14*d*) results in reducing waste of packaging material at the same time eliminating most all of a need for inventory of pre-set package sizes. It is to be appreciated that a sealed final package 14 with the shipping item 12 safely retained therein and surrounded by the expanded packaging material of web set 20*e* gives structural strength to the final package 14 to protect shipping item 12 retained therein. The expanded packaging material generally absorbs impacts that are typically experienced by packages which are mailed or delivered by a courier service. The package 14 therefore protects the enclosed shipping item 12 from typically experienced impacts during delivery.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. Also, various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Any flowchart and/or block diagrams in the Figures illustrate some exemplary architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include label applicators or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, Universal Serial Bus (USB) flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The device, assembly, or system of the present disclosure may include wireless communication logic coupled to sensors on the device, assembly, or system. The sensors gather data and provide the data to the wireless communication logic. Then, the wireless communication logic may transmit the data gathered from the sensors to a remote device. Thus, the wireless communication logic may be part of a broader communication system, in which one or several devices, assemblies, or systems of the present disclosure may be networked together to report alerts and, more generally, to be accessed and controlled remotely. Depending on the types of transceivers installed in the device, assembly, or system of the present disclosure, the system may use a variety of protocols (e.g., Wi-Fi®, ZigBee®, MIWI, BLUETOOTH®) for communication. In one example, each of the devices, assemblies, or systems of the present disclosure may have its own IP address and may communicate directly with a router or gateway. This would typically be the case if the communication protocol is Wi-Fi®. (Wi-Fi® is a registered trademark of Wi-Fi Alliance of Austin, TX, USA; ZigBee® is a registered trademark of ZigBee Alliance of Davis, CA, USA; and BLUETOOTH® is a registered trademark of Bluetooth Sig, Inc. of Kirkland, WA, USA).

In another example, a point-to-point communication protocol like MiWi or ZigBee® is used. One or more of the device, assembly, or system of the present disclosure may serve as a repeater, or the devices, assemblies, or systems of the present disclosure may be connected together in a mesh network to relay signals from one device, assembly, or system to the next. However, the individual device, assembly, or system in this scheme typically would not have IP addresses of their own. Instead, one or more of the devices, assemblies, or system of the present disclosure communicates with a repeater that does have an IP address, or another type of address, identifier, or credential needed to communicate with an outside network. The repeater communicates with the router or gateway.

In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

The system that receives and processes signals from the device, assembly, or system of the present disclosure may differ from embodiment to embodiment. In one embodiment, alerts and signals from the device, assembly, or system of the present disclosure are sent through an e-mail or simple message service (SMS; text message) gateway so that they can be sent as e-mails or SMS text messages to a remote device, such as a smartphone, laptop, or tablet computer, monitored by a responsible individual, group of individuals, or department, such as a maintenance department. Thus, if a particular device, assembly, or system of the present disclosure creates an alert because of a data point gathered by one or more sensors, that alert can be sent, in e-mail or SMS form, directly to the individual responsible for fixing it. Of course, e-mail and SMS are only two examples of communication methods that may be used; in other embodiments, different forms of communication may be used.

In other embodiments, alerts and other data from the sensors on the device, assembly, or system of the present disclosure may also be sent to a work tracking system that allows the individual, or the organization for which he or she works, to track the status of the various alerts that are received, to schedule particular workers to repair a particular device, assembly, or system of the present disclosure, and to track the status of those repair jobs. A work tracking system would typically be a server, such as a Web server, which provides an interface individuals and organizations can use, typically through the communication network. In addition to its work tracking functions, the work tracker may allow broader data logging and analysis functions. For example, operational data may be calculated from the data collected by the sensors on the device, assembly, or system of the present disclosure, and the system may be able to provide aggregate machine operational data for a device, assembly, or system of the present disclosure or group of devices, assemblies, or systems of the present disclosure.

The system also allows individuals to access the device, assembly, or system of the present disclosure for configuration and diagnostic purposes. In that case, the individual processors or microcontrollers of the device, assembly, or system of the present disclosure may be configured to act as Web servers that use a protocol like hypertext transfer protocol (HTTP) to provide an online interface that can be used to configure the device, assembly, or system. In some embodiments, the systems may be used to configure several devices, assemblies, or systems of the present disclosure at once. For example, if several devices, assemblies, or systems are of the same model and are in similar locations in the same location, it may not be necessary to configure the devices, assemblies, or systems individually. Instead, an individual may provide configuration information, including baseline operational parameters, for several devices, assemblies, or systems at once.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "element A and/or element B", when used in conjunction with open-ended language such as "comprising" can refer, in one embodiment, to element A only (optionally including elements other than element B); in another embodiment, to element B only (optionally including elements other than element A); in yet another embodiment, to both element A and element B (optionally including other elements); etc. As used herein in the specification and in the claims, "or" should be understood to have the same meaning as "and/or" as defined above. For example, when separating articles in a list, "or" or "and/or" shall be interpreted as being inclusive, i.e., the inclusion of at least one, but also including more than one, of a number or list of elements, and, optionally, additional unlisted articles. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features may then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms “upwardly”, “downwardly”, “vertical”, “horizontal”, “lateral”, “transverse”, “longitudinal”, and the like are used herein for the purpose of explanation only unless specifically indicated otherwise.

Although the terms “first” and “second” may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present innovation.

An embodiment is an implementation or example of the present disclosure. Reference in the specification to “an embodiment,” “one embodiment,” “some embodiments,” “one particular embodiment,” or “other embodiments,” or the like, means that a particular feature, structure, or characteristic described in connection with the embodiments is included in at least some embodiments, but not necessarily all embodiments, of the innovation. The various appearances “an embodiment,” “one embodiment,” “some embodiments,” “one particular embodiment,” or “other embodiments,” or the like, are not necessarily all referring to the same embodiments.

If this specification states a component, feature, structure, or characteristic “may”, “might”, or “could” be included, that particular component, feature, structure, or characteristic is not required to be included. If the specification or claim refers to “a” or “an” element, that does not mean there is only one of the element. If the specification or claims refer to “an additional” element, that does not preclude there being more than one of the additional element.

As used herein in the specification and claims, including as used in the examples and unless otherwise expressly specified, all numbers may be read as if prefaced by the word “about” or “approximately,” even if the term does not expressly appear. The phrase “about” or “approximately” may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively.

In the foregoing description, certain terms have been used for brevity, clarity, and understanding. No unnecessary limitations are to be implied therefrom beyond the requirement of the prior art because such terms are used for descriptive purposes and are intended to be broadly construed. To the extent that the present disclosure has utilized the term “invention” in various titles or sections of this specification, or in the context of those sections, this term has been included as required by the formatting requirements of word document submissions (i.e., docx submissions) pursuant the guidelines/requirements of the United States Patent and Trademark Office and shall not, in any manner, be considered a disavowal of any subject matter.

Moreover, the description and illustration of various embodiments of the disclosure are examples and the disclosure is not limited to the exact details shown or described.

What is claimed:

1. A system for custom packaging a set of items to be shipped, comprising:

a roll section that provides support for a pair of rolls of prefabricated expandable packaging material that are unrolled into webs and matched into a web set; and a package section that provides a form zone, a fill zone and a finish zone, the web set traversing the package section along a web path;

wherein the matched web set from the roll section is expanded in the form zone, receives a shipping item in the fill zone, and is finish-sealed and separated from the webs in the finish zone to comprise a finished package;

wherein the package section further comprises a set of grippers, the set of grippers including at least one first gripper and at least one second gripper, the at least one first gripper and the at least one second gripper being distinctly movable relative to one another in a direction parallel to the web path, the set of grippers being configured to expand a determined amount of the web set in the form zone and further configured to index the expanded amount of web set from the form zone to the fill zone.

2. The system of claim 1, wherein the roll section further comprises:

a pair of support rollers configured to support the pair of rolls of prefabricated expandable packaging material;

a mating roller downstream of the pair of support rollers configured to match the webs into the matched web set; and a plurality of feed rollers downstream of the mating roller configured to feed the matched web set to the package section.

3. The system of claim 2 further comprising:

a scan device configured to obtain data from the shipping item; and a controller communicatively connected with the scan device, the roll section and the package section, wherein the controller is configured to control a set of movements of the matched web set through the roll section and through the package section based at least in part on the data scanned from the shipping item and at least in part on a selected mode.

4. The system of claim 3, wherein:

the controller provides alignment to the pair of rolls of prefabricated expandable packaging material and controls the matching of the webs into the web set by way of the mating roller.

5. The system of claim 1, wherein alignment of the pair of rolls of prefabricated expandable packaging material and matching of the webs into the web set is completed in the roll section.

6. The system of claim 5, wherein at least one of the at least one first gripper or the at least one second gripper of the set of grippers is configured to expand the determined amount of the web set in the form zone based at least in part on one or more of:

a data from a scan of the shipping item, maintaining an expanded web set throughout the fill zone upon index of the expanded amount of web set from the form zone to the fill zone, or a second data of the pair of rolls of prefabricated expandable packaging material.

7. The system of claim 5, further comprising:

a back sealer configured to seal a back portion of the web set in the fill zone; and a labeler configured to label an outer side of a portion of the expanded matched web set in the fill zone.

8. The system of claim 5, further comprising:

an insertion assistance set configured to assist in spreading the webs of the expanded matched web set for receiving the shipping item;

the insertion assistance set comprising:

a spacer and a tab configured to transition into a spreader;

wherein the spacer is configured to protrude into the webs of the web set and the tab is configured to translate between the webs of the web set in the fill zone prior to the system receiving the shipping item in the fill zone.

9. The system of claim 8, wherein the insertion assistance set further comprises:

a loading chute configured to insert and withdraw between the webs of the web set in the fill zone having a pair of sides and a platform;

wherein the platform is matingly sized to the spreader; and wherein the pair of sides is configured such that upon insertion of the loading chute and prior to the system receiving the shipping item in the fill zone, the pair of sides protects against a collision of the web set with the shipping item or of the web set with a user or both.

10. The system of claim 5, further comprising:

a quality/transport set that examines the package based on predetermined criteria including at least sealing and labeling; and the package is transported according to a result of the examination.

11. The system of claim 1, wherein the at least one first gripper is movable parallel to the web path, the at least one second gripper being movable orthogonal thereto.

12. A system for packaging a set of items to be shipped, comprising:

a scan device configured to obtain data from a shipping item;

a roll section that provides support for a pair of rolls of prefabricated expandable packaging material that are unrolled into webs and matched into a web set, the roll section comprising:

a mating roller to match the webs into the matched web set; and a plurality of feed rollers downstream of the mating roller configured to feed the matched web set to the package section;

a package section that provides a form zone, a fill zone and a finish zone;

wherein the matched web set from the roll section is expanded in the form zone, receives the shipping item in the fill zone, and is finish-sealed and separated from the webs in the finish zone to comprise a finished package;

wherein the system further comprises a controller communicatively connected with the scan device, the controller being configured to control a set of movements of the matched web set through the roll section and through the package section based at least in part on the data scanned from the shipping item; and wherein the package section further comprises a set of grippers that are communicatively connected with the controller;

wherein the set of grippers comprises:

at least one gripper of the set of grippers that is configured to expand a determined amount of the web set in the form zone based at least in part on the data from the shipping item; and at least another gripper of the set of grippers and the at least one gripper that are configured to index the expanded amount of web set from the form zone to the fill zone.

13. The system of claim 12, wherein the determined amount of web set is based at least in part on maintaining an expanded web set throughout the fill zone upon index of the expanded amount of web set from the form zone to the fill zone.

14. The system of claim 12, wherein the determined amount of web set is based at least in part on a data associated with the pair of rolls of prefabricated expandable packaging material.

15. The system of claim 12, wherein the package section further comprises:

a labeler configured to label an outer side of a portion of the expanded matched web set in the fill zone; and the controller is communicatively connected with the labeler.

16. The system of claim 15, wherein the package section further comprises:

an insertion assistance set configured to assist in spreading the webs of the expanded matched web set for receiving the shipping item; and the controller is communicatively connected with the insertion assistance set.

17. The system of claim 16, wherein the insertion assistance set comprises:

a spacer and a tab configured to transition into a spreader;

wherein the spacer is configured to protrude into the webs of the web set and the tab is configured to translate between the webs of the web set in the fill zone prior to the system receiving the shipping item in the fill zone;

a loading chute having a platform matingly sized to the spreader and a pair of sides;

wherein the loading chute and the tab are communicatively connected to the controller; and the controller provides control over insertion and withdrawal of the loading chute to provide the pair of sides to a depth between the webs of the web set in the fill zone prior to the system receiving the shipping item in the fill zone such that the pair of sides protect against a collision of the web set and the shipping item or of the web set and a user or both.

18. The system of claim 15, further comprising:

a quality/transport set that examines the package based on predetermined criteria including at least sealing and proper labeling;

the controller communicatively connected with the quality/transport set; and the package is transported according to a result of the examination.

19. A system for packaging of one or more of a shipping item, comprising:

a controller provided with programming to control production of the packaging;

a roll section that provides support for a pair of rolls of prefabricated expandable packaging material that are unrolled into webs and matched into a web set;

a package section including a tension roller;

a set of grippers of the package section positioned downstream of the tension roller and being communicatively connected with the controller, the set of grippers including at least one first gripper and at least one second gripper, the at least one first gripper and the at least one second gripper being distinctly movable relative to one another in a direction parallel to the web path to expand the web set a determined amount; and a set of sealers of the package section positioned downstream of the tension roller and being communicatively connected with the controller;

wherein the programming determines a set of movements of the matched web set through the roll section and through the package section based at least in part on a data associated with the shipping item.

20. The system of claim 19, wherein the at least one first gripper is movable parallel to the web path, the at least one second gripper being movable orthogonal thereto.

21. A system for custom packaging a set of items to be shipped, comprising:

a scan device configured to obtain data from a shipping item;

a roll section that provides support for a pair of rolls of prefabricated expandable packaging material that are unrolled into webs and matched into a web set, the roll section comprising:

a mating roller to match the webs into the matched web set; and a plurality of feed rollers downstream of the mating roller configured to feed the matched web set to the package section; and a package section that provides a form zone, a fill zone and a finish zone;

wherein the matched web set from the roll section is expanded in the form zone, receives the shipping item in the fill zone, and is finish-sealed and separated from the webs in the finish zone to comprise a finished package;

wherein the system further comprises a controller, the controller communicatively connected with the scan device, wherein the controller is configured to control a set of movements of the matched web set through the roll section and through the package section based at least in part on the data scanned from the shipping item; and wherein the package section further comprises a set of grippers that are communicatively connected with the controller;

wherein the set of grippers comprises grippers that are movable relative to one another along a web path of the matched web set; and wherein the set of grippers is configured to translate relative to the web set, to grip the web set, to expand a determined amount of the web set in the form zone based at least in part on the data from the shipping item, and to index the expanded amount of web set from the form zone to the fill zone.

* * * * *